US007512098B2

(12) United States Patent
Jiang et al.

(10) Patent No.: US 7,512,098 B2
(45) Date of Patent: *Mar. 31, 2009

(54) METHOD AND SYSTEM FOR WIRELESS VOICE CHANNEL/DATA CHANNEL INTEGRATION

(75) Inventors: Yuen Jun Jiang, Danville, CA (US); Hisso M. Chang, Austin, TX (US)

(73) Assignee: Roamware, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/503,301

(22) Filed: Aug. 14, 2006

(65) Prior Publication Data

US 2006/0276196 A1 Dec. 7, 2006

Related U.S. Application Data

(63) Continuation of application No. 09/932,439, filed on Aug. 16, 2001, now Pat. No. 7,092,370.

(60) Provisional application No. 60/226,255, filed on Aug. 17, 2000, provisional application No. 60/226,855, filed on Aug. 22, 2000, provisional application No. 60/242,730, filed on Oct. 23, 2000, provisional application No. 60/253,978, filed on Nov. 29, 2000, provisional application No. 60/261,572, filed on Jan. 12, 2001, provisional application No. 60/226,363, filed on Aug. 18, 2000.

(51) Int. Cl.
*H04Q 7/00* (2006.01)
*H04Q 7/20* (2006.01)
*H04L 12/66* (2006.01)

(52) U.S. Cl. .................... 370/329; 370/352; 455/450; 455/464

(58) Field of Classification Search ................ 370/329, 370/352–357; 709/232, 246; 455/450, 464, 455/451
See application file for complete search history.

(56) References Cited

U.S. PATENT DOCUMENTS 3,701,851 A * 10/1972 Starrett ..................... 370/430
5,353,328 A    10/1994 Jokimies
5,586,166 A    12/1996 Turban
5,742,910 A     4/1998 Gallant et al.
5,818,824 A    10/1998 Lu et al.

(Continued)

FOREIGN PATENT DOCUMENTS

CA      2281041 A1    2/2001

(Continued)

OTHER PUBLICATIONS

Digital cellular telecommunications system (Phase 2+); Specification of the SIM Application Toolkit for the Subscriber Identity Module-Mobile Equipment (SIM-ME) Interface (GSM 11, 14 version 8.3.0 Release 1999) STSI TS 101 267 V8.3.0, XX, XX, Aug. 2000, pp. 1-69 and pp. 114-115 (XP-002222021).

(Continued)

*Primary Examiner*—Hong Cho
(74) *Attorney, Agent, or Firm*—Arent Fox LLP

(57) ABSTRACT

A system and method for wireless communication is disclosed. In one embodiment of a method, a user of a wireless device initiates a communication session during which a wireless data session can be triggered from a voice session and a voice session can be triggered from a wireless data session. During the communication session, data is shared between the wireless data channel and the voice channel.

23 Claims, 52 Drawing Sheets

U.S. PATENT DOCUMENTS

| | | |
|---|---|---|
| 5,854,982 A | 12/1998 | Chambers et al. |
| 5,901,359 A | 5/1999 | Malmstrom |
| 5,903,832 A | 5/1999 | Seppanen et al. |
| 5,930,701 A | 7/1999 | Skog |
| 5,940,490 A | 8/1999 | Foster et al. |
| 5,943,620 A | 8/1999 | Boltz et al. |
| 5,987,318 A | 11/1999 | Alperovich et al. |
| 5,987,323 A | 11/1999 | Huotori |
| 5,987,325 A | 11/1999 | Tayloe |
| 6,009,325 A * | 12/1999 | Retzer et al. ............ 455/434 |
| 6,014,561 A | 1/2000 | Mölne |
| 6,052,604 A | 4/2000 | Bishop et al. |
| 6,055,441 A * | 4/2000 | Wieand et al. ............ 455/557 |
| 6,058,309 A | 5/2000 | Huang et al. |
| 6,075,855 A | 6/2000 | Christiansen et al. |
| 6,085,084 A | 7/2000 | Christmas |
| 6,138,005 A | 10/2000 | Park |
| 6,138,009 A | 10/2000 | Birgerson |
| 6,148,197 A | 11/2000 | Bridges et al. |
| 6,163,701 A | 12/2000 | Saleh et al. |
| 6,185,295 B1 | 2/2001 | Frederiksen et al. |
| 6,185,436 B1 | 2/2001 | Vu |
| 6,192,255 B1 | 2/2001 | Lewis et al. |
| 6,195,532 B1 | 2/2001 | Bamburak et al. |
| 6,208,864 B1 | 3/2001 | Agrawal et al. |
| 6,356,756 B1 | 3/2002 | Koster |
| 6,424,945 B1 * | 7/2002 | Sorsa ............ 704/270.1 |
| 6,456,845 B1 | 9/2002 | Drum et al. |
| 6,456,859 B1 | 9/2002 | Desblancs et al. |
| 6,463,298 B1 | 10/2002 | Sorenson et al. |
| 6,466,786 B1 | 10/2002 | Wallenius |
| 6,505,050 B1 | 1/2003 | Brudos et al. |
| 6,574,481 B1 | 6/2003 | Rathnasapathy et al. |
| 6,603,761 B1 | 8/2003 | Wang et al. |
| 6,603,968 B2 | 8/2003 | Anvekar et al. |
| 6,611,516 B1 | 8/2003 | Pirkola et al. |
| 6,628,934 B2 | 9/2003 | Rosenberg et al. |
| 6,671,523 B1 | 12/2003 | Niepel et al. |
| 6,684,073 B1 | 1/2004 | Joss et al. |
| 6,693,586 B1 | 2/2004 | Walters et al. |
| 6,725,031 B2 * | 4/2004 | Watler et al. ............ 455/405 |
| 6,738,622 B1 | 5/2004 | Stadelmann et al. |
| 6,738,636 B2 | 5/2004 | Lielbridis |
| 6,764,003 B1 | 7/2004 | Martshitsch et al. |
| 6,782,264 B2 | 8/2004 | Anderson |
| 6,795,444 B1 | 9/2004 | Vo et al. |
| 6,856,818 B1 | 2/2005 | Ford |
| 6,876,860 B1 | 4/2005 | Berg et al. |
| 6,920,487 B2 | 7/2005 | Sofer et al. |
| 6,925,299 B1 | 8/2005 | Sofer et al. |
| 6,947,738 B2 * | 9/2005 | Skog et al. ............ 455/426.1 |
| 6,961,559 B1 | 11/2005 | Chow et al. |
| 6,963,543 B2 | 11/2005 | Diep et al. |
| 6,968,383 B1 | 11/2005 | Heutschi et al. |
| 6,975,852 B1 | 12/2005 | Sofer et al. |
| 6,978,156 B1 | 12/2005 | Papadopoulos et al. |
| 7,020,479 B2 | 3/2006 | Martschitsch |
| 7,139,570 B2 | 11/2006 | Elkarat et al. |
| 7,184,764 B2 | 2/2007 | Raviv et al. |
| 7,231,431 B2 | 6/2007 | Sofer et al. |
| 2001/0034225 A1 * | 10/2001 | Gupte et al. ............ 455/412 |
| 2002/0009199 A1 | 1/2002 | Ala-Laurila et al. |
| 2002/0012351 A1 | 1/2002 | Sofer et al. |
| 2002/0019246 A1 * | 2/2002 | Forte ............ 455/555 |
| 2002/0037708 A1 | 3/2002 | McCann et al. |
| 2002/0055350 A1 * | 5/2002 | Gupte et al. ............ 455/412 |
| 2002/0087631 A1 | 7/2002 | Sharma |
| 2002/0099799 A1 * | 7/2002 | Kolsky ............ 709/219 |
| 2002/0101858 A1 | 8/2002 | Stuart et al. |
| 2002/0101859 A1 | 8/2002 | Maclean |
| 2002/0160763 A1 | 10/2002 | Mittal et al. |
| 2002/0187780 A1 | 12/2002 | Souissi |
| 2002/0191575 A1 | 12/2002 | Kalavade et al. |
| 2002/0196775 A1 | 12/2002 | Tuohino et al. |
| 2003/0017843 A1 | 1/2003 | Noblins |
| 2003/0050047 A1 | 3/2003 | Ala/Luukko |
| 2003/0051041 A1 | 3/2003 | Kalavade et al. |
| 2003/0064723 A1 | 4/2003 | Thakker |
| 2003/0069922 A1 | 4/2003 | Arunachalam |
| 2003/0129991 A1 | 7/2003 | Allison et al. |
| 2003/0133421 A1 | 7/2003 | Sundar et al. |
| 2003/0139180 A1 | 7/2003 | McIntosh et al. |
| 2003/0208560 A1 | 11/2003 | Inoue |
| 2003/0224795 A1 | 12/2003 | Wilhoite et al. |
| 2003/0229791 A1 | 12/2003 | De Jong |
| 2004/0053610 A1 | 3/2004 | Kim |
| 2004/0087305 A1 | 5/2004 | Jiang |
| 2004/0120552 A1 | 6/2004 | Borngraber et al. |
| 2004/0131023 A1 | 7/2004 | Auterinen |
| 2004/0132449 A1 | 7/2004 | Kowarch |
| 2004/0196858 A1 | 10/2004 | Tsai et al. |
| 2004/0229601 A1 | 11/2004 | Zabawskyj et al. |
| 2004/0236836 A1 | 11/2004 | Appelman |
| 2005/0021834 A1 | 1/2005 | Coulombe |
| 2005/0047378 A1 | 3/2005 | Wuschke et al. |
| 2005/0064883 A1 | 3/2005 | Heck et al. |
| 2005/0186939 A1 | 8/2005 | Barnea et al. |
| 2005/0186979 A1 | 8/2005 | McCann et al. |
| 2005/0215250 A1 | 9/2005 | Chava et al. |
| 2005/0232282 A1 | 10/2005 | Silver et al. |
| 2005/0250493 A1 | 11/2005 | Elkarat et al. |
| 2006/0003775 A1 | 1/2006 | Bull et al. |
| 2006/0009204 A1 | 1/2006 | Ophir |
| 2006/0025129 A1 | 2/2006 | Wolfman et al. |
| 2006/0052113 A1 | 3/2006 | Ophir et al. |
| 2006/0068778 A1 | 3/2006 | Della-Torre |
| 2006/0068786 A1 | 3/2006 | Florence |
| 2006/0079225 A1 | 4/2006 | Wolfman et al. |
| 2006/0079236 A1 | 4/2006 | Del Pino et al. |
| 2006/0148459 A1 | 7/2006 | Wolfman et al. |
| 2006/0205404 A1 | 9/2006 | Gonen et al. |
| 2006/0211420 A1 | 9/2006 | Ophir et al. |
| 2007/0021118 A1 | 1/2007 | Ophir et al. |
| 2007/0044010 A1 * | 2/2007 | Sull et al. ............ 715/500.1 |
| 2007/0049269 A1 | 3/2007 | Ophir et al. |
| 2007/0054665 A1 | 3/2007 | Elkarat et al. |
| 2007/0072587 A1 | 3/2007 | Della-Torre et al. |
| 2007/0178885 A1 | 8/2007 | Lev et al. |

FOREIGN PATENT DOCUMENTS

| | | |
|---|---|---|
| EP | 0899 974 A2 | 3/1999 |
| GB | 2322998 | 9/1998 |
| WO | WO 98/26621 A2 | 6/1998 |
| WO | WO 98/26626 A2 | 6/1998 |
| WO | WO 00/18156 A1 | 3/2000 |
| WO | WO 00/51375 A | 8/2000 |
| WO | WO 00/79761 A | 12/2000 |
| WO | WO 00/79825 A | 12/2000 |
| WO | WO 01/22750 | 3/2001 |
| WO | WO 01/65884 | 9/2001 |
| WO | WO 02/41641 A2 | 5/2002 |
| WO | WO 02/019667 | 7/2002 |
| WO | WO 03/019960 A1 | 3/2003 |
| WO | WO 03/043367 A | 5/2003 |
| WO | WO 03/065660 A | 8/2003 |
| WO | WO 2004/081802 | 9/2004 |

OTHER PUBLICATIONS

"Digital Cellular Telecommunications system (Phase 2+); Universal Mobile Telecommunications system (UMTS); General Packet Radio Service (GPRS) Service description; Stage 2 (3GPP TS 23.060 Version 5.4.0 Release 5)" ETSI TS 123 060 V5.4.0, Dec. 2002, pp. 1-207 (XP-014007573).

"Digital Cellular Telecommunications system (Phase 2+); Universal Mobile Telecommunications system (UMTS); General Packet Radio Service (GPRS); GPRS Tunnelling Protocol (GTP) across the Gn and Gp Interface (3GPP TS 29.060 version 5.4.0 Release 5)" ETSI TS 129 060 V5.4.0, Dec. 2002. pp. 1-102 (XP-002298277).

SMPP Forum: SMPP Protocol Document Version:—Oct. 12, 1999 Issue 1.2.

Universal Mobile Telecommunications System (UMTS); Multimedia Messaging Service (MMS), Functional description; Stage 2 (3GPP TS 23. 140 version 4.2.0 Release 4).

GSM 379 on CAMEL Digital cellular telecommunications system (Phase 2+); Customized Applications for Mobile network Enhanced Logic (CAMEL); CAMEL Application Part (CAP) specification (GSM 09.78 version 7.1.0 Release 1998).

Technical Specification 3rd Generation Partnership Project; Technical Specification Group Services and System Aspects; Service accessibility (Release 1999).

Signaling procedure and the Mobile Application Part (MAP) (Release 1999).

Q1214-Q1218 on Intelligent Networks IMS architectures, 3GPP, and 3GPP2.

GMS 408 on radio interface layer 3; Digital cellular telecommunications system (Phase 2+); Mobile radio interface layer 3 specification (GSM 04.08 version 7.4.2 Release 1998).

GSM 322 network selection Digital cellular telecommunications system (Phase 2+); functions related to Mobile Station (MS) in idle mode and group receive mode (GSM 03.22 version 8.3.0 Release 1999).

GSM 23122 network selection 3GPP TS 23.122 V3.9.0 (Dec. 2002) Technical Specification; 3rd Generation Partnership Project; Technical Specification Group Core Network; NAS Functions related to Mobile Station (MS) in idle mode (release 1999).

GSM 22011 service accessibility; 3 GPP TS 22.011 V3.8.0 (Sep. 2002) Technical Specification; 3rd Generation Partnership Project; Technical Specification Group Services and System Aspects; Service accessibility (Release 1999).

3 GPP 29010; 3 GPP TS 29.010 V3.10.0 (Dec. 2002); Technical Specification; 3rd Generation Partnership Project; Technical Specification Group Core Network; Information element mapping between Mobile Station—Base Station System (MS-BSS) and Base Station System—Mobile-services Switching Centre (BSS-MSC).

GSM 318 on CAMEL Basic Call Handling; Digital cellular telecommunications system (Phase 2+) Basic call handling; Technical realization (GSM 03.18 version 6.6.0 Release 1997).

ITU-T Recommendation Q. 766 (1993), Performance objectives in the integrated services digital network application.

ITU-T Recommendation Q. 765 (1998), Signaling system No. 7—Application transport mechanism.

ITU-T Recommendation Q. 769.1 (1999), Signaling system No. 7—ISDN user part enhancements for the support of Number Portability.

Q771-775X TCAP, Aug. 2006.
GSM 1111 SIM and Mobile Interface, Aug. 2006.
GSM 1114 SIM Toolkit, Aug. 2006.
IR 7320 Steering of Roaming, Aug. 2006.
GSM 348 Security and OTA, Aug. 2006.
GSM 31048 Security and OTA, Aug. 2006.
GSM 23119 Gateway Location Register, Aug. 2006.
GSM 408 Mobile Radio Interface Network Layer, Aug. 2006.
GSM 23122 Mobile Station Procedure, Aug. 2006.
GSM 24008 Mobile Radio Interface Network Layer, Aug. 2006.
GSM 25304 Idle Mode Selection, Aug. 2006.
GSM 29010 Error Network Mapping, Aug. 2006.
GSM 29002 MAP Protocol, Aug. 2006.
3G TS 22.078 version 3.2.0 Release 1999 UMTS CAMEL.
3G TS 23.278 version 6.0.0. Release 6 UMTS CAMEL-IMS interworking.
GSM 360 GPRS, Aug. 2006.
GSM 960 GPRS Tunneling Protocol, Aug. 2006.
GSM 23060 GPRS, Aug. 2006.
GSM 29060 GPRS Tunneling Protocol, Aug. 2006.
GSM 23012 Location Update , Aug. 2006.
Q701-705 on SS7 MTP, Aug. 2006.

* cited by examiner

| | |
|---|---|
| Element: | Incall Service |
| Attributes: | title |
| Children: | Service |
| Description: | A container. A high level tag that marks the start and end of the XML file. Required. |
| | |
| Element: | Service |
| Attributes: | name |
| Parents: | Incall Service |
| Children: | DNIS \| Service_description \| Multicall \| Percall \| Reset |
| Description: | A container. The parameters in this container describe a service running on a particular phone line (DNIS). Each line running Incall Service must have a service described for that line. Required. |
| | |
| Element: | DNIS |
| Parents: | Service |
| Description: | The number the caller dialed to reach the application. Required. |
| | |
| Element: | Service_description |
| Parents: | Service |
| Description: | Audio. The description of the service. This audio is played to reassure the caller that they have dialed the right number. Fits the carrier phrase, "Hello. You have reached <System_description>." Required. |
| | |
| Element: | Multicall |
| Parents: | Service |
| Children: | Call_info \| Authentication \| Content \| Choices Value_entry |
| Description: | A container. The parameters specified in Multicall are to be used as default values for all the calls for the service specified in Service. Any tag may be specified in Multicall. Parameters set here act as default values for all calls for that service until another Multicall file for that service is specified. Optional. |
| | |
| Element: | Percall |
| Parents: | Service |
| Children: | Call |
| Description: | A container. Contains the list of calls to be made, one call per Call tag. Required if no Multicall tag specified. |
| | |
| Element: | Call |
| Attributes: | id |
| Parents: | Percall |
| Children: | Call_info \| Authentication \| Content \| Choices \| Value_entry \| Reset |
| Description: | A container. Contains information for a specific call. Required if there is a Percall tag. |

FIG. 9A

| Element: | Reset |
|---|---|
| Parents: | Service \| Call |
| Description: | Resets/Cancels a particular call (if used as a child for Call) or all potential call for a particular service (if used as a child for Service). Optional. |

| Element: | Call_info |
|---|---|
| Parents: | Multicall \| Call |
| Children: | Phone_number \| Response_url |
| Description: | A container. Contains information about the call, beyond the dialog. Required in either Multicall or Call or both. |

| Element: | Authentication |
|---|---|
| Parents: | Multicall \| Call |
| Children: | Authentication_code_description \| Authentication_code \| Expected_caller |
| Description: | A container. Contains tags that specify the information necessary for ensuring that the caller is authorized to use the service. Authentication is indicated if there is an Authentication_code passed in from the customer's application. If there is an authentication_code, there must also be a description of that code. Optional. |

| Element: | Content |
|---|---|
| Parents: | Multicall \| Call |
| Description: | Audio. The content message to be played to the caller. The content may be an audio file (*.wav), a text file (*.txt), or raw text (enclosed in double quotes). Optional. |

| Element: | Value_entry |
|---|---|
| Parents: | Multicall \| Call |
| Attributes: | mindigits \| maxdigits |
| Description: | Audio. A description of the entry to be entered by the called party. Must fit carrier phrase, "Please enter..." and "You will be asked for..." Either Choices or Value_entry, but not both, may be specified. Optional. |

| Element: | Choices |
|---|---|
| Parents: | Multicall \| Call |
| Children: | Choice \| Transfer |
| Description: | A container. Contains information about the list of choices that will be presented to the caller during the call. Optional. |

| Element: | Phone_number |
|---|---|
| Parents: | Call_info |
| Description: | Phone number from which Expected_caller is expected to call. Required. |

FIG. 9B

| | |
|---|---|
| Element: | Expected_caller |
| Parents: | Authentication |
| Description: | Audio. The name of the person expected to be calling from a given phone number. Optional. |

| | |
|---|---|
| Element: | Response_url |
| Parents: | Call_info |
| Description: | URL that Incall Service is to use to return status information about the call to the customer application. Optional. |

| | |
|---|---|
| Element: | Authentication_code_description |
| Parents: | Authentication |
| Description: | Audio. Description of the authentication code the caller will be asked to enter. Fits the carrier phrase, "Please enter <authentication_code_description>." For example, "Please enter your account number." Required for each Authentication tag. |

| | |
|---|---|
| Element: | Authentication_code |
| Parents: | Authentication |
| Description: | The digit string value of the caller's authentication_code_description. That is, the Authentication_code is the value that the caller must enter in order to continue with the call. Required for each Authentication tag. |

| | |
|---|---|
| Element: | Choice |
| Parents: | Choices |
| Children: | Choice_description \| Choice_value |
| Description: | A container. Describes the choices that are available to the caller. There is usually more than one Choice tag per Choices tag. Optional. |

| | |
|---|---|
| Element: | Transfer |
| Parents: | Choices |
| Children: | Transfer_description \| Transfer_number |
| Description: | A container. Describes the transfer option available to the caller. If there is a transfer option, the value that the caller presses is "0" in order to transfer. Only one Transfer tag is allowed per Choices tag. Optional. |

| | |
|---|---|
| Element: | Choice_description |
| Parents: | Choice |
| Description: | Audio. Describes the option the caller may choose. Fits the carrier phrase, "If you would like <choice_description>, press one." Required for each Choice tag. |

FIG. 9C

| Element: | Choice_value |
|---|---|
| Parents: | Choice |
| Description: | A single digit number that indicate the touch-tone that the caller should press in order to select the associated choice. Note that if there is a Transfer tag, "0" cannot be used for a Choice_value. Required for each Choice tag. |
| | |
| | |
| Element: | Transfer_description |
| Parents: | Transfer |
| Description: | Audio. Describes the person or thing (e.g., IVR) the caller would be transferred to should they press zero. Required for each Transfer tag. |
| | |
| Element: | Transfer_number |
| Parents: | Transfer |
| Description: | The phone number to which the caller would be transferred, if they press zero. Required for each Transfer tag. |

1.  Incall_Mfile_SC1_1.xml

```xml
<?xml version='1.0'?>
<Incall Service title="Joe's Sales M file">

<Service name="movie sales">
  <DNIS>5122900001</DNIS>
  <Service_description>"Joe's Movie Sales"</Service_description>

<Multicall>
    <Authentication>
      <Authentication_code_description>"movie pin"</Authentication_code_description>
    </Authentication>

<Choices>
      <Choice>
        <Choice_description>C:\Mob\purchase_DVD.wav</Choice_description>
        <Choice_value>1</Choice_value>
      </Choice>
      <Choice>
        <Choice_description>c:\Mob\purchase_movie_video.wav</Choice_description>
        <Choice_value>2</Cjoice_value>
      </Choice>

<Choice>
        <Choice_description>C:\Mob\purchase_soundtrack.wav</Choice_description>
        <Choice_value>3</Choice_value>
      </Choice>

<Transfer>
        <Transfer_description>"Kathy's phone"</Transfer_description>
        <Transfer_number>460</Transfer_number>
      </Transer>

</Choices>
  </Multicall>
</Service>

<Service name="theater sales">
  <DNIS>5122900003</DNIS>
  <Service_description>"Joe's Stage Productions Stuff Sales"</Service_description>

<Multicall>
```

CONTINUED FROM FIG.10A

```xml
<Authentication>
   <Authentication_code_description>"theater pin"</Authentication_code_description>
</Authentication>

<Choices>
   <Choice>
      <Choice_description>C:\Mob\purchase_theater_video.wav</Choice_description>
      <Choice_value>1</Choice_value>
   </Choice>

<Choice>
      <Choice_description>C:\Mob\purchase_playbill.wav</Choice_description>
      <Choice_value>2</Choice_value>
   </Choice>
  </Choices>
 </Multicall>
</Service>

</Incall Service>
```

FIG. 10B

| Element: | Outcall Service |
|---|---|
| Attributes: | title |
| Children: | Multicall \| Percall |
| Description: | A container. A high level tag to mark the start and end of the XML file. Required. |

| Element: | Service |
|---|---|
| Attributes: | name |
| Parents: | Outcall Service |
| Children: | Service_description \| Multicall \| Percall \| Reset |
| Description: | A container. The parameters in this container describe a service. There can be several services set up for Outcall. This tag allows the developer to group Multicall values. Required. |

| Element: | Multicall |
|---|---|
| Parents: | Service |
| Children: | Call_info \| Introduction \| Authentication \| Content \| Value_entry \| Choices |
| Description: | A container. Indicates the parameters specified are to be used as default values for all the calls. Parameters set here act as default values for all calls until another multicall file is specified. Optional. |

| Element: | Percall |
|---|---|
| Parents: | Service |
| Children: | Call |
| Description: | A container. Contains the list of calls to be made, one call per Call tag. Required if no Multicall tag specified. |

| Element: | Reset |
|---|---|
| Parents: | Service \| Call |
| Description: | Resets values for parent tag and all its children tags already specified. Useful for canceling queued calls before they're made. Optional. |

| Element: | Call |
|---|---|
| Attributes: | id |
| Parents: | Percall |
| Children: | Call_info \| Introduction \| Authentication \| Content \| Value_entry \| Choices \| Reset |
| Description: | A container. Contains information for a specific call. Required if there is a Percall tag. |

| Element: | Call_info |
|---|---|
| Parents: | Multicall \| Call |
| Children: | Phone_number \| Response_url \| Ensure_completion |
| Description: | A container. Contains information about the call, beyond the dialog. Required in either Multicall or Call or both. |

FIG. 12A

| Element: | Introduction |
|---|---|
| Parents: | Multicall \| Call |
| Children: | Recipient \| Sender |
| Description: | A container. Contains the information for the introduction portion of the call, the sender and the desired recipient. Required in either Multicall or Call or both. |

| Element: | Authentication |
|---|---|
| Parents: | Multicall \| Call |
| Children: | Authentication_code_description \| Authentication_code |
| Description: | A container. Contains tags that specify the information necessary for ensuring that the called party is the intended recipient of the call. Optional. Authentication is indicated if there is an authentication_code passed in from the customer's application. If there is an authentication_code, there must also be a description of that code and a recipient. |

| Element: | Content |
|---|---|
| Parents: | Multicall \| Call |
| Description: | Audio. The content message to be played to the called party. The content may be an audio file (*.wav), a text file (*.txt), or raw text (enclosed in double quotes). Optional. |

| Element: | Value_entry |
|---|---|
| Parents: | Multicall \| Call |
| Attributes: | mindigits \| maxdigits |
| Description: | Audio. A description of the entry to be entered by the called party. Must fit carrier phrase, "Please enter..." and "You will be asked for..." Either Choices or Value_entry, but not both, may be specified. |

| Element: | Choices |
|---|---|
| Parents: | Multicall \| Call |
| Children: | Choice \| Transfer |
| Description: | A container. Contains information about the list of choices that will be presented to the user during the call. Either Choices or Value_entry, but not both, may be specified. Optional. |

| Element: | phone_number |
|---|---|
| Parents: | Call_Info |
| Description: | Phone number to be called. Must include every digit that is to be dialed. (e.g., 9 to get an outside line, 1 for long distance). Required. |

| Element: | Response_url |
|---|---|
| Parents: | Call_Info |
| Description: | URL that Outcall service is to use to return status information about the call to the customer application. Optional. |

FIG. 12B

| Element: | Ensure_completion |
|---|---|
| Parents: | Call_info |
| Description: | The number of times that Outcall service will call a person back, if the person has authenticated. These callbacks increase the likelihood of the completion of a desired call that was dropped accidentally (for instance, by the network). Optional. Default is 0. |

| Element: | Recipient |
|---|---|
| Parents: | Introduction |
| Description: | Audio. Usually text to be converted to speech. Fits the carrier phrase, "This is an automated call for <Recipient> from <Sender>." If Recipient is omitted from the XML, no authentication is done; rather, the called party is asked to press 1 to continue. Optional. |

| Element: | Sender |
|---|---|
| Parents: | Introduction |
| Description: | Audio. Fits the carrier phrase, "This is an automated call from <Sender>." Required. |

| Element: | Authentication_code_description |
|---|---|
| Parents: | Authentication |
| Description: | Audio. Description of the authentication code the party called will be asked to enter. Fits the carrier phrase, "Please enter <authentication_code_description>." For example. "Please enter your account number." Required for each Authentication tag. |

| Element: | Authentication_code |
|---|---|
| Parents: | Authentication |
| Description: | The digit string value of the called party's authentication_code description. That is, the Authentication_code is the value that the called party must enter in order to continue with the call. Required for each Authentication tag. |

| Element: | Choice |
|---|---|
| Parents: | Choices |
| Children: | Choice_description | Choice_value |
| Description: | A container. Describes the choices that are available to the called party. There is usually more than one Choice tag per Choices tag. Optional. |

| Element: | Transfer |
|---|---|
| Parents: | Choices |
| Children: | Transfer_description | Transfer_number |
| Description: | A container. Describes the transfer option to the called party. If there is a transfer option, the value that the called party presses is "0" in order to transfer. Only one Transfer tag is allowed per Choices tag. Optional. |

FIG. 12C

| Element: | Choice_description |
|---|---|
| Parents: | Choice |
| Description: | Audio. Describes the option the called party may choose. Fits the carrier phrase, "If you would like <choice_description>, press 1." Required for each Choice tag. |
| Element: | Choice_value |
| Parents: | Choice |
| Description: | A single digit number that indicates the touch-tone that the called party should press in order to select the associated choice. Not that if there is a Transfer tag, "0" cannot be used for a Choice_value. Required for each Choice tag. |
| Element: | Transfer_description |
| Parents: | Transfer |
| Description: | Audio. Describes the person or thing the called party would be transferred to should they press zero. Required for each Transfer tag. |
| Element: | Transfer_number |
| Parents: | Transfer |
| Description: | The phone number to which the called party would be transferred, if they press zero. Required for each Transfer tag. |

FIG. 12D

1. Multi-call content definition file: OM1_short.xml
   This XML file defines a hypothetical outcall use case where ever called party will be presented with a short audio review of a movie. Then, users will be presented with a menu of two choices (purchase the DVD or purchase the video) or transferring to a call center.

```xml
<?xml version='1.0'?>
<Outcall service title="Outcall Test M file">
<Multicall>
    <Call_info>
        <Response_url>http://vpl-mars/servlet/Outcall_serviceResponse</Response_url>
    </Call_info>
    <Content>C:\SmartOutcall\Sounds\princess_bride_x2.wav</Content>
    <Choices>
        <Choice>
            <Choice_description>
                C:\SmartOutcall\Sounds\purchase_DVD.wav
            </Choice_description>
            <Choice_value>1</Choice_value>
        </Choice>
        <Choice>
            <Choice_description>
                C:\SmartOutcall\Sounds\purchase_movie_video.wav
            </Choice_description>
        </Choice>
        <Transfer>
            <Transfer_description>"Kathy's phone"</Transfer_description>
            <Transfer_number>4939880</Transfer_number>
        </Transfer>
    </Choices>
</Multicall>
</Outcall service>
```

FIG. 13A

2. Per-call IVR definition file: OP1_short.xml
This XML file defines an outcall request using the current content definition (see the previous XML file)
by specifying a 10-digit phone number to be called (9252517200) and the 4-digit passcode (4321) to
determine if the person who answers the call is really "John Smith" as authorized to hear subsequent audio content.

```xml
<?xml version='1.0'?>
<Outcall service title="Outcall Test P file">
<Percall>
        <Call id="12345">
                <Call_info>
                    <Phone_number>95252517200</Phone_number>
                </Call_info>
                <Authentication>
                        <Authentication_code_description>
                            "your authentication code"
                        </Authentication_code_description>
                        <Authentication_code>4321</Authentication_code>
                </Authentication>
                <Introduction>
                        <Sender> "Test system"</Sender>
                        <Recipient> "John Smith" </Recipient>
                </Introduction>
        </Call>
</Percall>
</Outcall service>
```

GENERIC DIALOG SAMPLE

| | |
|---|---|
| User: | Hello |
| System: | Hello. This is an automated call for <Recipient> from <Sender>. If you are <Recipient>, please enter <Authentication_code_description> followed by the pound key. |
| User: | Enters <Authentication_code> |
| System: | I heard digits_entered If this is correct, press one. |
| User: | Presses 1 |
| System: | Thank you. A message from <Sender> is next. Some important options follow the message. The message is less than one minute long. Beginning of message. <Content> End of message. That was your message. To hear the message again, press the star key. Please choose from one of the following #_choices choices. If you would like<Choice_description(1)>, press <Choice_value(1). If you would like <Choice_description(2), press <Choice_value(2)... If you would like to be transferred to <Transfer_description>, press 0. |
| User: | Enters 2 |
| System: | To confirm that you would like <Choice_description(2)>, press one. |
| User: | Enters 1 |
| System: | Your choices of <Choice_description(2)> has been confirmed. Thank you. Good-bye. |

FIG. 13B

```
SKI REPORTS:
1. ⊞ ANGEL FIRE
2. ▷⊞ ALTA
   BASE: 36"
   NEW: 12"
   PACKED ICE

OK                    MAIN
```

FIG. 32A

```
CHOOSE TOPPINGS:
1. ☐ PEPPERONI
2. ☒ SAUSAGE
3. ☐ MEATBALLS
4. ▷☒ CHICKEN
5. ☐ PEPPERS

PICK                 ORDER
```

FIG. 32B

```
RADIO BUTTONS:
1.  ⊕ BUY    ○ SELL
2. ▷○ DAY    ⊕ GTC

CHANGE              SUBMIT
```

FIG. 32C

```
CHOOSE TYPE OF PIZZA:
1. ○ DEEP DISH
2. ⊕ THIN
3. ○ HAND-TOSSED
CHOOSE SAUCE:
1. ▷⊕ RED

PICK                 ORDER
```

FIG. 32D

METHOD AND SYSTEM FOR WIRELESS VOICE CHANNEL/DATA CHANNEL INTEGRATION

CROSS-REFERENCE TO RELATED APPLICATION(S)

This is a Continuation of application Ser. No. 09/932,439 filed Aug. 16, 2001 now U.S. Pat. No. 7,092,370. The disclosure of the prior application is hereby incorporated by reference herein in its entirety.

This application claims priority from the following U.S. Provisional Patent Applications: Ser. No. 60/226,255, entitled Method and Apparatus for Integrated Data Management, filed Aug. 17, 2000; Ser. No. 60/226,363, entitled Method and Apparatus for Integrated Data Management, filed Aug. 18, 2000; Ser. No. 60/226,855, entitled Method and Apparatus for Integrated Data Management, filed Aug. 22, 2000; Ser. No. 60/242,730, entitled Wireless Location Proxy, filed Oct. 23, 2000; Ser. No. 60/253,978, entitled Wireless Device Registration, filed Nov. 29, 2000; and Ser. No. 60/261,572 entitled Smart Wireless Applications, filed Jan. 12, 2001, all of which are incorporated herein by reference.

TECHNICAL FIELD

Disclosed embodiments of the invention are in the field of wireless communication devices and associated software applications.

BACKGROUND

Access to data and services through electronic networks has become a necessary part of everyday personal and business life. Especially since the Internet became widely accessible, many people increasingly rely on accessing Internet data and services through a variety of devices. Businesses, or enterprises, also use networks to make specific data and services available to employees, partners, and customers. Traditionally, the devices used to access networks were wired to the network. Examples include wired computers and wired telephones. Increasingly, however, people want to be able to access network data and services anywhere using portable, wireless devices such as wireless telephones and hand-held personal data assistants (PDAs). Enterprises now seek the ability to provide wireless access to data and services that is just as complete and easy as wired access. The arrival of wireless Internet telephone devices makes it possible to integrate voice and data services that combine the advantages of either access method. Integration of multiple communication channels such as voice and wireless data has, however, proven challenging.

Traditional multi-channel integration approaches to, for example, customer relations management (CRM), only involve computer telephone integration/interactive voice response (CTI/IVR), web, email, chat, and voice over Internet protocol (IP). Existing integration approaches have the disadvantage of sharing multiple data sources that at best facilitate one channel process (e.g., voice channel with screen pops for a call agent). The lack of channel integration in traditional approaches hinders a satisfactory solution to wireless access to enterprise data and applications, or services.

Without effective integration, accessing a wireless applications protocol (WAP) site for the first time is difficult for several reasons. A standard web browser with a keyboard makes it relatively easy to locate a new web site or directly enter a uniform resource locator (URL). Mobile wireless devices have limited input and user interface capability, however, compared to a computer with a standard web browser. A WAP telephone, for example, doesn't easily allow the typical hyperlinking, searching, bookmarking, or URL entry required to effectively navigate. This creates a significant barrier to the use of a WAP site.

Another disadvantage of traditional techniques for accessing WAP sites is that access to homepages is complicated and inefficient. Typically, homepages in the WAP/HDTP world are controlled by the carrier or must to be manually entered by the user on a wireless device. In the former case, which is characteristic in the United States, to go to a URL for an enterprise site not on carrier's homepage, the user must go through the inconvenience of finding the "goto place" and entering the URL. To avoid this, a large enterprise (e.g. America Online™) might have to pay to be on the carrier's homepage. In the latter case, the user has to enter the URL using the awkward wireless device configuration. In either case, a new URL change results in an awkward data entry process.

Another disadvantage of traditional techniques for accessing WAP sites is inferior device location technology. For many applications, the current location of the wireless device is important. For example, map services or yellow page services may be keyed to the location of the wireless user in order to provide only pertinent information. While multiple location technologies exist, not all are expected to be available and operational in every network, for every device, and at each location within the network. Furthermore, the position measurements retrieved from the location networks may require further processing to obtain the desired data format or related information (e.g., directions to a site). Besides location processing, there is also a need to obtain proper authorization for locating a mobile device. Current approaches lack the ability to mediate among network entities, preferences, authorizations, and related functions.

Another disadvantage of traditional techniques for accessing WAP sites is a cumbersome method for handling sign-on processes for multiple, disparate applications. Some "single sign-on" services exist for providing a more uniform user experience when signing on to different applications. Existing single-sign-on services, however, typically impose a single authentication scheme to which all participating applications must conform.

Another disadvantage of traditional techniques for accessing WAP sites is the difficulty of moving between sites and managing the wireless sessions on each site. Existing systems may not allow a wireless user to maintain multiple sessions, including leaving one site for another, and returning to the original location at the original site.

Traditional techniques for accessing WAP sites rely on desktop-based or client-based cookie management. Some network-based cookie systems provide only cookie store and deliver mechanisms, but do not provide privacy management and security management. Current network-based cookie systems do not support multiple devices of the same user.

Current methods for registering a wireless device with a web site have several disadvantages. For example, to verify the phone number of the device entered by a user at registration, current methods send a short message service (SMS) message containing a code to the device. The user must enter the code in the registration process to continue. This verification process requires the user to switch between wireless device modes of WAP browsing and the wireless device's internal SMS message application. This increases the number of steps involved in completing the registration. On many wireless devices, the WAP browser will not maintain its state while the SMS message is being accessed. Therefore, the user must re-enter the WAP registration application to supply the code. Because use of the registration application in most cases will require the manual entry of a URL into a wireless device, re-entry involves repeating that manual entry, thus imposing a major barrier to use of the application.

Many wireless device users choose to receive messages and alerts of many different kinds on their devices. Existing wireless alert systems usually integrate the delivery of alerts with the generation of alerts. The delivery mechanism is normally one-way based and does not deal with two-way based actionable alerts. Furthermore, existing wireless alert systems do not handle escalation, which may be desirable when a message is not responded to within some time period.

BRIEF DESCRIPTION OF THE DRAWINGS

FIG. 9A is a list of XML tags in one embodiment.
FIG. 9B is a list of XML tags in one embodiment.
FIG. 9C is a list of XML tags in one embodiment.
FIG. 9D is a list of XML tags in one embodiment.
FIG. 10A is an XML file of one embodiment.
FIG. 10B is an XML file of one embodiment.
FIG. 12A is a list of XML tags in one embodiment.
FIG. 12B is a list of XML tags in one embodiment.
FIG. 12C is a list of XML tags in one embodiment.
FIG. 12D is a list of XML tags in one embodiment.
FIG. 13A is an XML file of one embodiment.
FIG. 13B is an XML file of one embodiment with a generic dialog sample.

FIG. 32A is an example of a user interface element created with an embodiment of an enhanced service.

FIG. 32B is an example of a user interface element created with an embodiment of an enhanced service.

FIG. 32C is an example of a user interface element created with an embodiment of an enhanced service.

FIG. 32D is an example of a user interface element created with an embodiment of an enhanced service.

DETAILED DESCRIPTION

Figure 1:
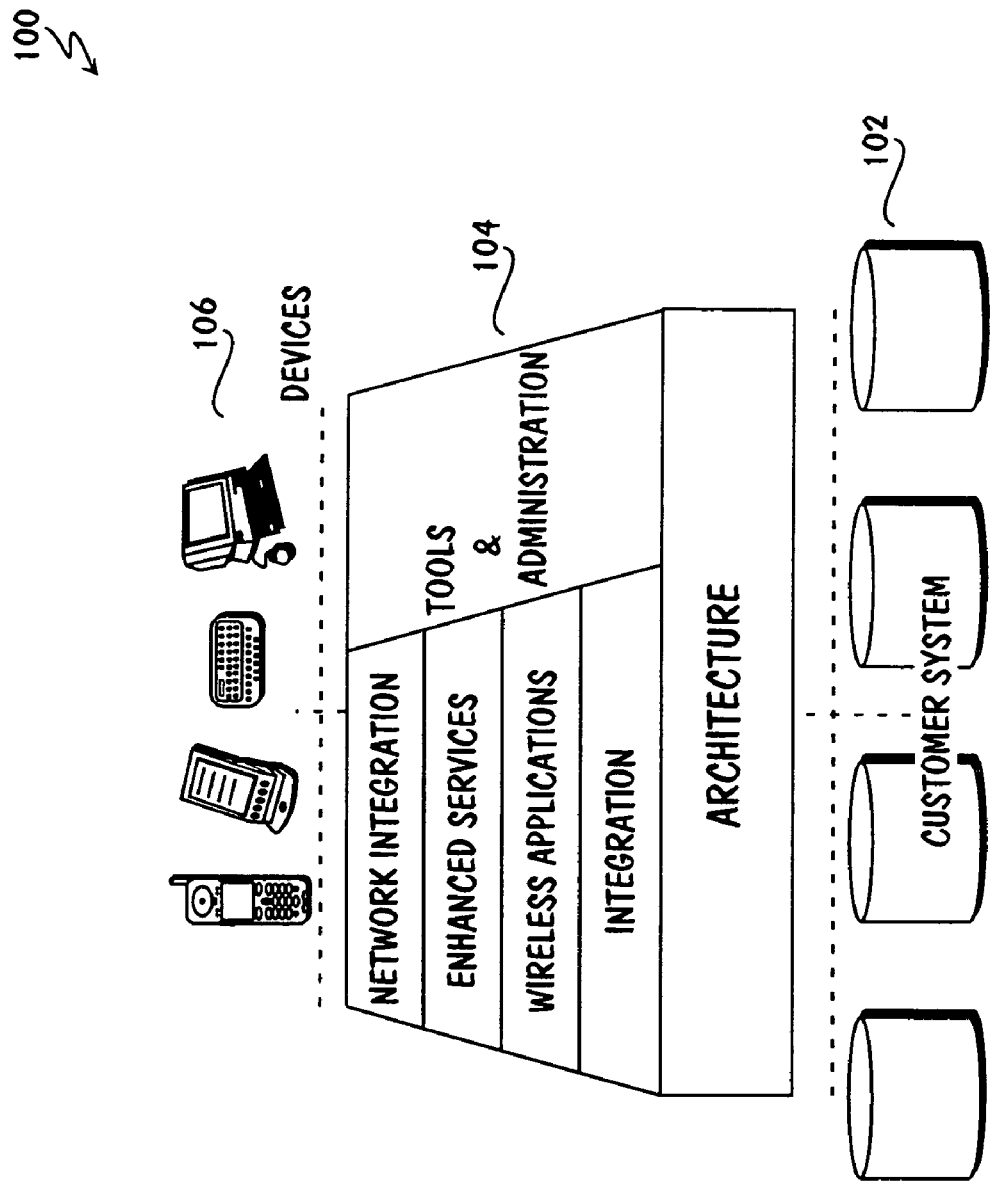
FIG. 1 is a block diagram of a system including an embodiment of a wireless network communication architecture platform.

The present invention overcomes the limitations of the prior art and provides additional benefits. A brief summary of some embodiments and aspects of the invention are first presented. Some simplifications and omissions may be made in the following summary; the summary is intended to highlight and introduce some aspects of the disclosed embodiments, but not to limit the scope of the invention. Thereafter, a detailed description of illustrated embodiments is presented, which will permit one skilled in the relevant art to make and use aspects of the invention. One skilled in the relevant art can obtain a full appreciation of aspects of the invention from the subsequent detailed description, read together with the Figures, and from the claims.

A system and method for integrating wireless data and voice calls that explores the advantages of both access methods are described. Embodiments include computer telephony integration/interactive voice response (CTI/IVR) integration including a wireless data and wireless voice channel that is wireless protocol independent. The CTI/IVR integration includes protocols with which voice calls can be triggered in a wireless data session and with which data sessions can be triggered by a voice call or by an actionable alert. Actionable data from the actionable alert allows the control of navigation from a wireless channel to a voice channel and vice versa during a communication session. Significantly, session data is shared between the voice channel and the data channel during a communication session. Voice data can trigger a data session in a push action or a pull action. Similarly, data can trigger a voice session in a push action or a pull action. One embodiment includes initiating a wireless applications protocol (WAP) session from a voice call, thus removing the problems that a traditional wireless user would have in navigating to a WAP site. A WAP session is presented to the user as a result of placing a normal telephone call. In one embodiment, initiating the wireless data WAP session comprises sending a message to a device, and receiving from the device a selection of a uniform resource locator (URL) within the message. In response to receiving the selection of the URL, a data session is initiated to a web server. In one embodiment, the message is a short message service (SMS) message.

One embodiment includes a central gateway through which wireless device users access multiple applications. These accessible applications could be hosted locally (in the same physical location or the same administration domain as the gateway), in the same Intranet behind the firewall, or anywhere on the Internet. In one embodiment, an apparatus architecture includes a tiered topology that supports large-scale, high performance, mission-critical wireless applications on a variety of devices. The method and system integrate various wireless applications with existing wireless network infrastructure, including wireless Internet infrastructure. The method and system further integrate multiple wired and wireless devices with the network, including providing a consistent user interface across multiple wireless devices. The method and system include numerous wireless applications that facilitate the wireless devices user's access to network services. One embodiment includes computer telephony integration/interactive voice response (CTI/IVR) integration. The CTI/IVR integration adds a wireless protocol independent wireless channel. The CTI/IVR integration presents actionable data that allows the control of navigation from a wireless channel to a voice channel and vice versa.

FIG. 1 is a high level block diagram of one embodiment 100 of a system for wireless network communication that includes an embodiment 104 of a wireless network communication architecture, or platform. In general, the architecture 104 components include tools and administration, integration with the customer system 102, wireless applications available to users of wireless devices 106, enhanced services available to users of wireless devices 106, and network integration with the wireless devices 106. The architecture 104 performs two-way communication with wireless devices 106 and also with customer system 102. Customer system 102 is any system that communicates internally and externally via networks, including wireless networks. For example, customer system 102 can be the communication and data system of a large or small enterprise. The architecture 104 provides a seamless, scalable interface between the customer system 102 and users who access the customer system 102 through wireless devices 106.

Figure 2:
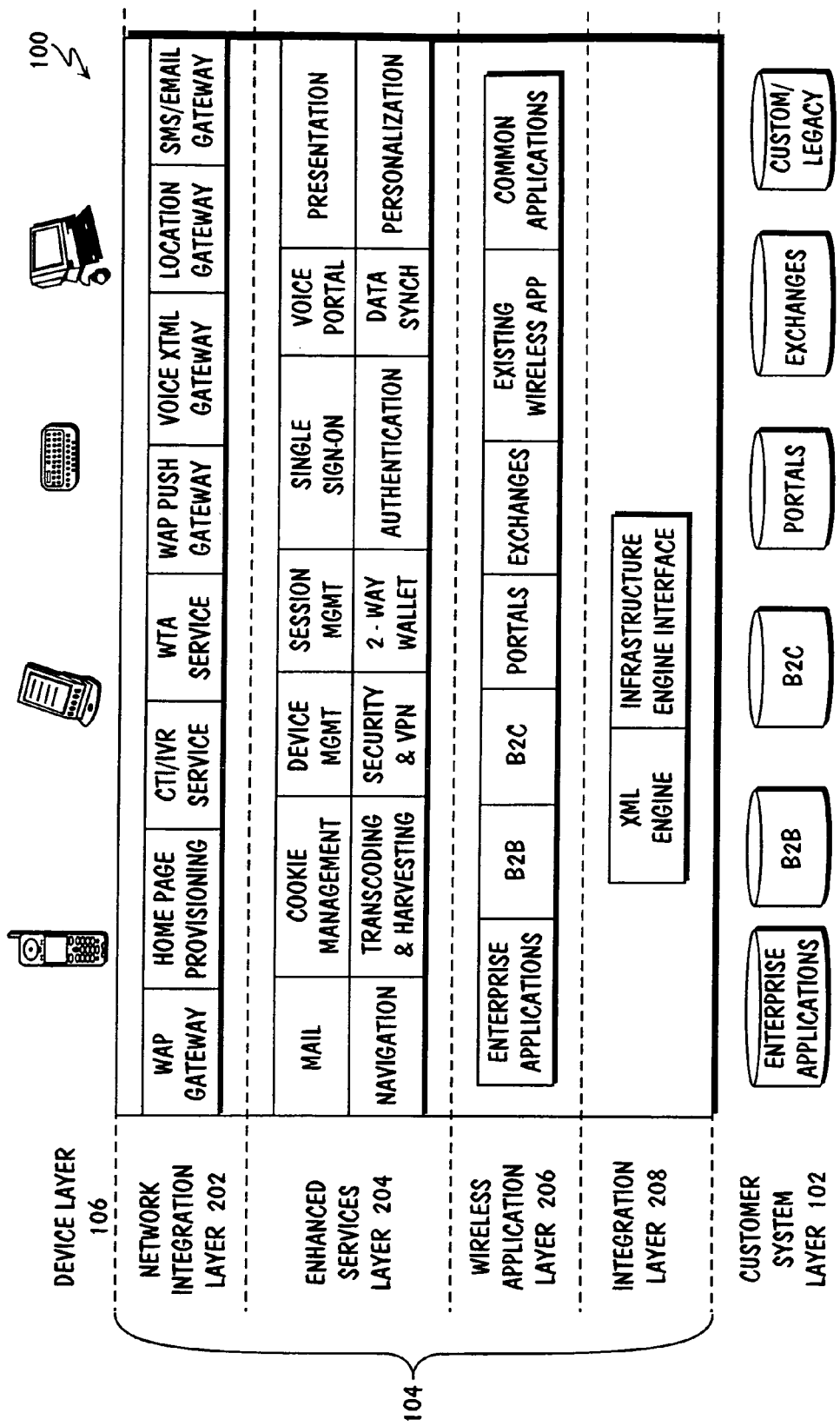
FIG. 2 is a block diagram of an embodiment of a wireless network communication architecture platform.

FIG. 2 is a block diagram showing more detail of the architecture 104. A network integration layer 202 components includes a wireless application protocol (WAP) gateway, homepage provisioning, a CTI/IVR service, a wireless telephony applications service, a WAP push gateway, a voice extensible markup language (voice XML) gateway, a location gateway, and a short message service (SMS)/email gateway. Various components of the network integration layer will be described in more detail herein. An enhanced services layer 204 includes a messaging service, a navigation service, a cookie management service, a two-way wallet service, a device management service, a session management service, a single sign-on service, a voice portal, a presentation service, and a personalization service, some of which are described in more detail below. A wireless application layer 206 includes enterprise applications, portals, exchanges, existing wireless applications, etc., as shown. The integration layer 208 includes an XML engine and an infrastructure engine interface.

Figure 3:
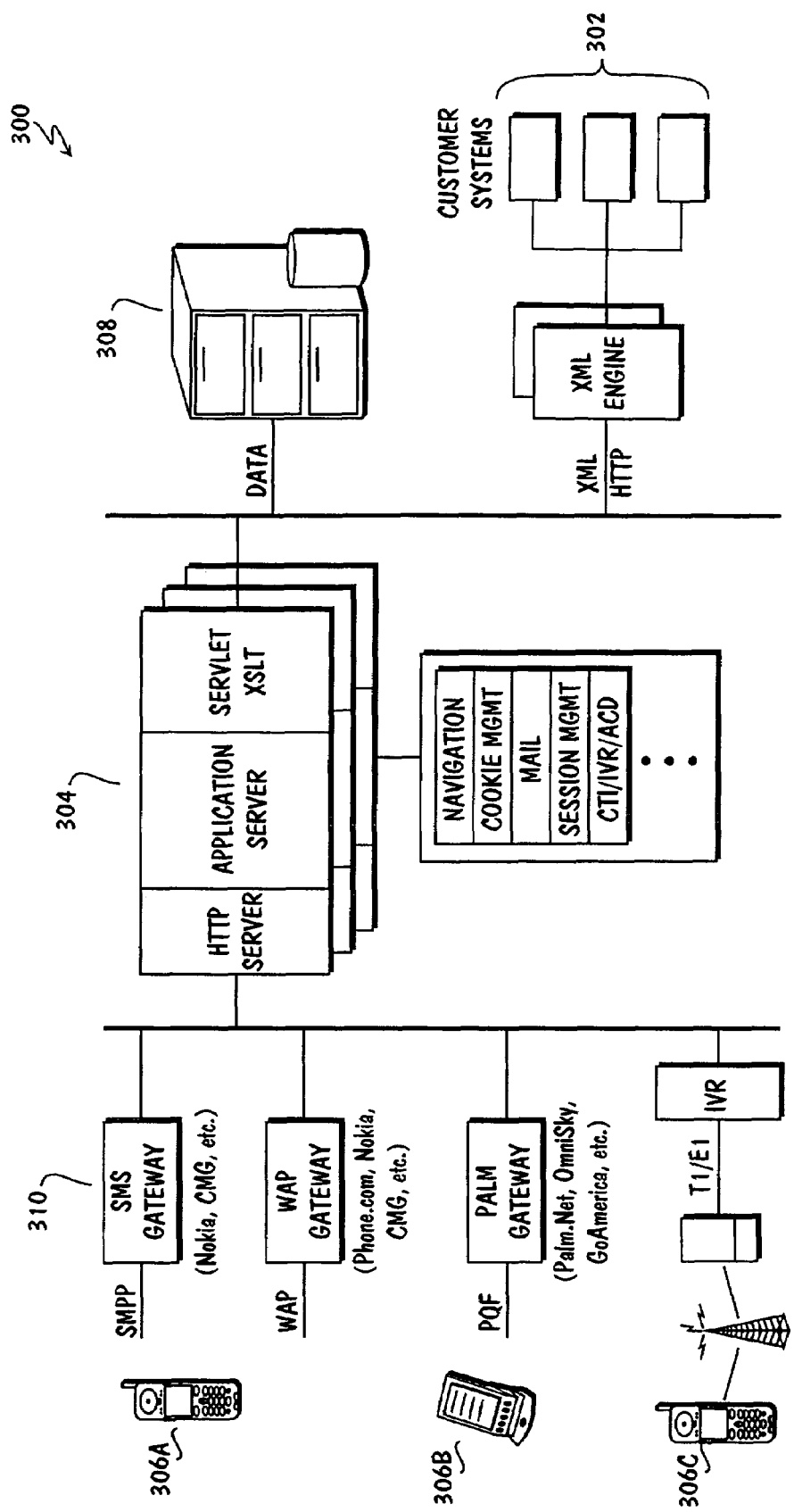
FIG. 3 is a block diagram of an embodiment of a communication system.

FIG. 3 is a block diagram of an embodiment of a communication system 300 showing a relative position of an architecture 304. Wireless devices 306 communicate with customer systems 302 through various gateways 310 and the architecture 304, which includes the various integration and application layers as described with reference to architecture 104. For example, a wireless telephone 306A communicates using a short messaging protocol with the SMS gateway. The architecture 304 includes a hypertext transfer protocol server and an application server. The architecture 304 further includes extensible style-sheet language templates (XSLTs), which are explained more fully below. The architecture 304 includes the enhanced services as shown in FIG. 2. The enhanced services facilitate the wireless device user's access to data 308 and customer systems 302. Examples of customer systems 302 are the systems provided by SAP™, Siebel™, TIBCO™, and others.

Figure 4:
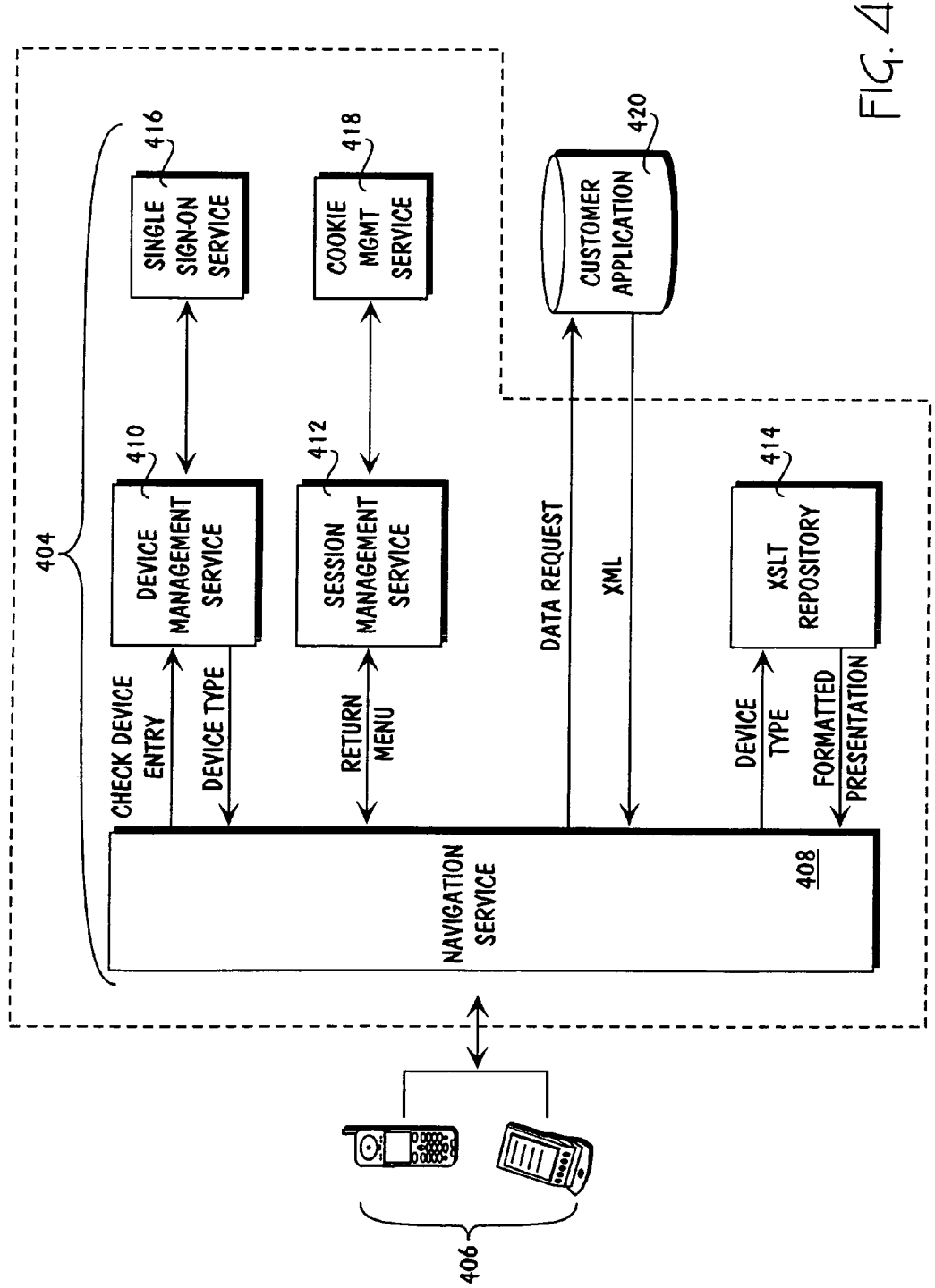
FIG. 4 is a block diagram showing the interaction between wireless devices and customer systems.

FIG. 4 is another view of the interaction between the wireless devices and the customer systems. The dotted line indicates that the items excluding the wireless devices 406 and the customer applications 420 are included in the architecture. The wireless devices 406 communicate with a navigation service 408, which routes data in two directions. The navigation service 408 communicates with a device management service 410 and a session management service 412, which are each enhanced services of one embodiment. The device management service 410 verifies the identity of the wireless device and its type. The session management service 412, which will described in more detail below, returns a menu to the wireless device 406. The menu is part of a configurable, consistent user interface that facilitates the wireless device user's network access. A single sign-on service 416 and the cookie management service 418 are further enhanced services that will each be described in more detail. In general, however, the single sign-on service 416 allows the wireless device user to sign on once, with minimum actions on the user's part, to access a wireless network session that may include communication with many sites and applications. The cookie management system facilitates the maintenance, storage, and control of consistent user information, which normally cannot be stored on the wireless device 406. The navigation service 408 transmits a device type to the extensible style-sheet language template (XSLT) repository 414, and a specially formatted presentation appropriate for the particular wireless device 406 is returned. XSL templates will be discussed in more detail below. The menu and the specially formatted presentation facilitate the user's data request to the customer application 420.

Figure 5:
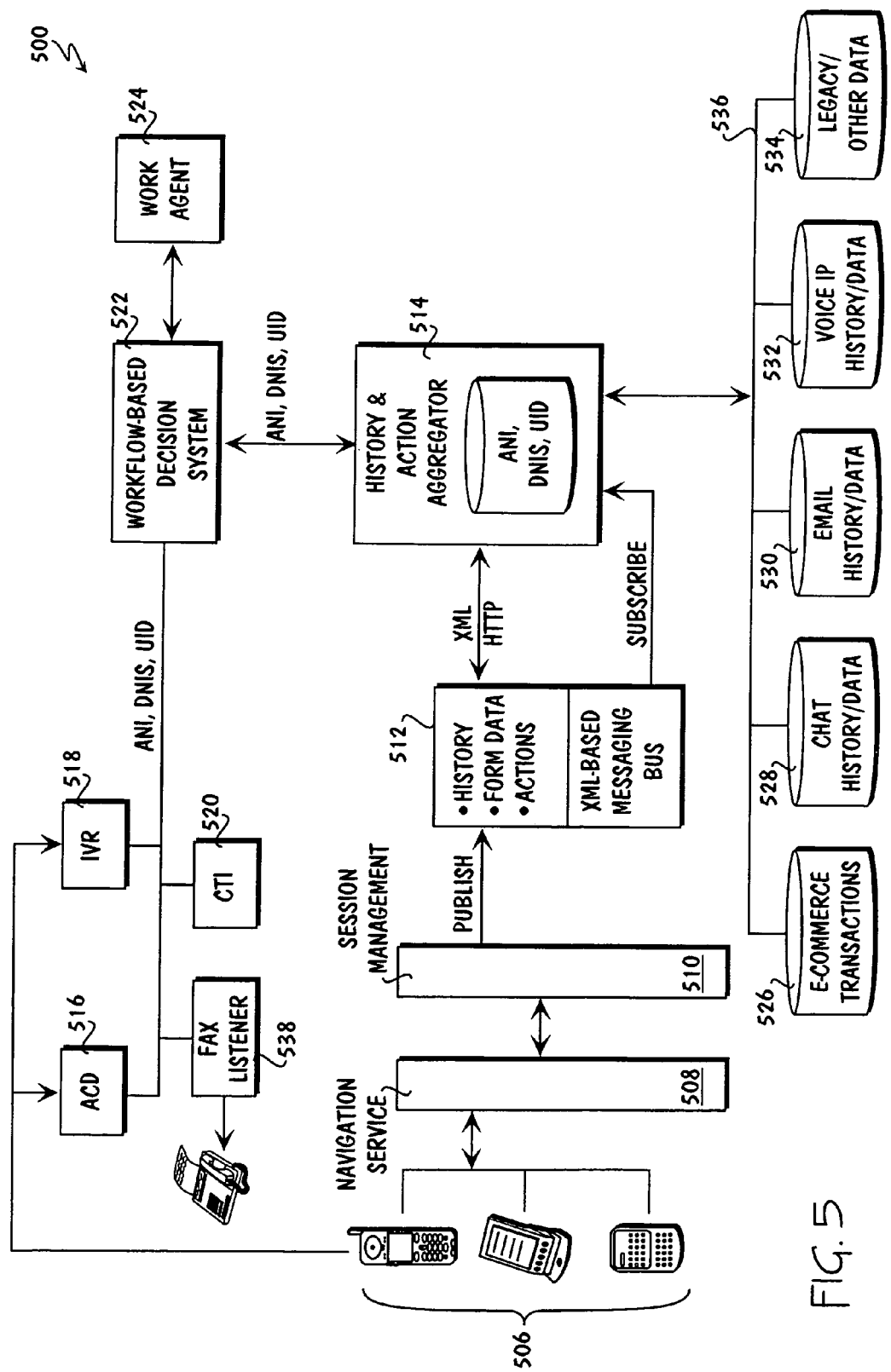
FIG. 5 is a block diagram of an embodiment of a computer telephony integration/interactive voice response (CTI/IVR) service.

FIG. 5 is a block diagram of an embodiment of a CTI/IVR service 500, which includes a wireless protocol independent wireless channel. IVR applications use the telephone as the primary input/output device to communicate with the end user where the user input may be provided either using a dual tone multi frequency (DTMF) based touch-tone keypad (or soft keys on a PDA with telephone interface) or by speaking a voice command. DTMF is the signal to the phone company that is generated when the key on an ordinary telephone touch pad is pressed. This is commonly known as touchtone dialing on a "Touchtone" phone (formerly a registered trademark of AT&T). DTMF has generally replaced loop disconnect ("pulse") dialing. With DTMF, each key pressed on the telephone generates two tones of specific frequencies.

IVR applications typically run on an IVR system with appropriate hardware components that interface with wireline or wireless telephone networks.

The CTI/IVR service 500 controls navigation from a wireless data channel to a voice channel and vice versa. In one embodiment, the CTI/IVR service 500 operates where telephone calls can be triggered in a wireless data session. Automatic number identification (ANI) data, dialed number identification service (DNIS) data, and unique identifier (UID) data is sent to a workflow-based decision system 522 and a work agent 524, and is processed by a history and action aggregator 514. A session management service 510 publishes data to an XML-based messaging bus 512, which subscribes to the history and action aggregator 514. The history and action aggregator uses the subscription information to access a customer layer 536. The customer layer 536 includes ecommerce transactions 526, chat history/data 528, email history/data 530, voice over Internet protocol (IP) history/data 532, and legacy and other data 534.

The CTI/IVR service 500 coordinates the wireless data transactions with voice channel-based transactions and vice versa. It allows wireless data sessions to control, guide and trigger voice channel sessions and vice versa.

Wireless data transactions are published and stored on the messaging platform to guide voice channels. These transactions can in particular be actions to control the interactions with the caller in the voice channel. Similarly, voice channel transactions are published and stored on the messaging platform to guide wireless data channels. These transactions can in particular be actions to control the interactions with the wireless device user. In both cases, the actionable data can be pushed or pulled by a channel.

In the case of pulling actionable data using the CTI/IVR service 500, a user can click a link (e.g. "Listen to Movie Review") on a wireless data session to trigger a call to the IVR system 518 that is to be controlled by the actionable data. By examining the voice channel data, such as the DNIS and ANI, the wireless session data, the voice call can be guided to execute the requested action, such as playing the Dinosaur movie review.

As a push example, suppose that a user clicks a link (e.g. "Fax the Document") on a wireless data session to register actionable data with the messaging platform. This actionable data is picked up by a fax listener 538, which is registered with the messaging platform to listen for fax actions. The session data (e.g. telephone number, or document) will guide the fax listener 538 to deliver the document as a fax.

Similarly, the CTI/IVR service 500 can be used to request to send a uniform resource locator (URL) to a wireless data wireless device to trigger a wireless session. In this case, the actionable data from the voice session is being used to control the wireless data action. Here, the actionable data is registered with the messaging platform to be picked up by a WAP alert listener registered with the messaging platform to listen for the WAP alert actions.

These examples illustrate that the CTI/IVR service 500 allows the actionable data to be executed by the destination channel at the current point of the menu structure instead of having to start from the top of the menu structure to reach the intended target of the actionable data.

The CTI/IVR service 500 does not require that the wireless device 506 support simultaneous voice channel and wireless data channel as long as it supports concurrent voice channel and wireless data channel. It allows a user to toggle between a voice session and a data session. The CTI/IVR service 500 can involve two different devices for voice and wireless data, for example, providing a speech recognition interface to a telephone so as to send a URL or other data to a WAP wireless device in response to a spoken request. A user can use a telephone to do a transaction and have the receipt sent via a WAP alert to a WAP device or emailed to another device, such as a RIM™ device.

In one embodiment, the actionable data is represented as XML data on the messaging platform. The action type can either be a push action (e.g., WAP alert or outfax call) or a pull action (e.g., the voice channel queries the messaging platform whether there is a registered action such as "play the movie review of Dinosaur").

Figure 6:
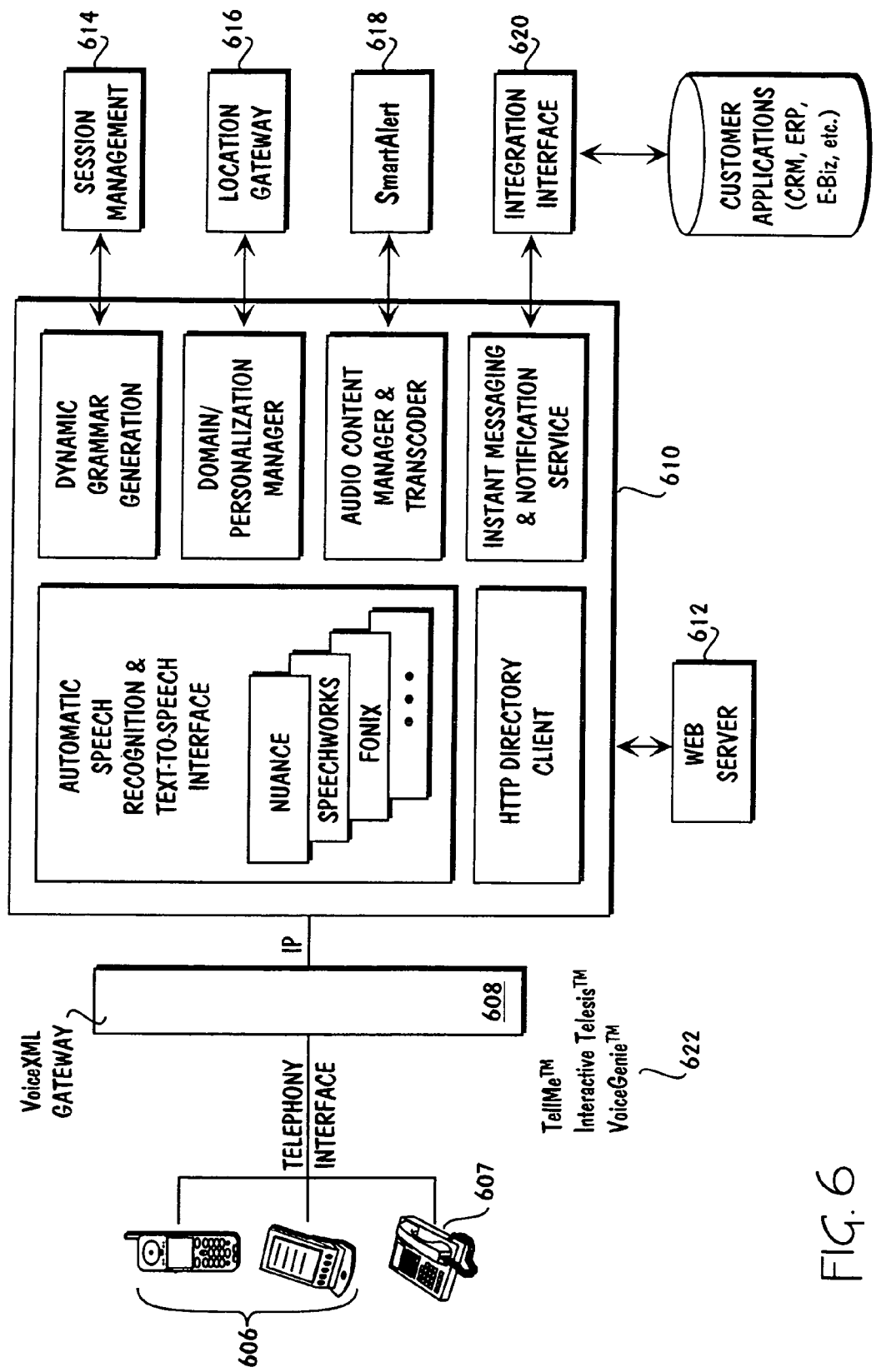
FIG. 6 is a block diagram of an embodiment of a communication system including a DVT-VoiceXML engine.

FIG. 6 is a high level block diagram illustrating the initiation of a wireless data session by a voice call. In one embodiment, a wireless data WAP session is initiated from within a voice call by sending an SMS message, email or other text message to the wireless device. During a voice call, a wireless data message (e.g., SMS or email) is sent to the wireless device that initiated the voice call. When the message is accessed on the device and the user selects a URL within that message, a data session is initiated to a web server. The embedded URL, and thus the data session, is set up based on the context of the voice call. For example, the voice call can be to an IVR or a service representative. This is significantly easier than the traditional method of manual keying to initiate a wireless data session.

A VoiceXML gateway 608 receives calls from wireless devices 606 or from wired device 607. VoiceXML gateways are Internet based telephony platforms over which a user can submit a VoiceXML document and initiate an audio dialog with the document over standard telephony channels. VoiceXML is a standard designed by the World Wide Web Consortium (W3C) to create audio dialogs that feature synthesized speech, digitized audio, recognition of spoken and DTMF key input, recording of spoken input, telephony, and mixed-initiative conversations.

Internet protocol (IP) data is sent to software 610. In one embodiment, the software 610 is a data voice telephony (DVT)-VoiceXML application engine, which includes automatic speech recognition and a text-to-speech (TTS) interface. For example, Nuance™, Speechworks™, and Fonix™ can be used. The software 610 also includes a hypertext transfer protocol (HTTP) directory client, dynamic grammar generation, a domain/personalization manager, an audio content manager, and an instant messaging and notification hierarchy. The software 610 is in communication with a web server 612. Referring to FIG. 2, the location gateway 616 is part of the network integration layer between the enhanced service layer and the devices 606 and 607. The session management service 614 and the mail or messaging service 618 are enhanced services between the network integration layer and the wireless application layer. An integration interface 620 is part of the integration layer between the wireless application layer and the customer system layer. Referring again to FIG. 6, the customer applications 602 include customer relations management software, enterprise relationship software, ecommerce software, etc.

Customer applications 602 initiate XML-based content trigger via the integration interface 620 to a DVT-VoiceXML application engine 610. The DVT-VoiceXML application engine 610 uses the audio content manager and transcoder to parse the XML content dialog file. Based on the parsing, a voice menu is constructed using the dynamic grammar generation module. The DVT-VoiceXML application engine 610 then generates a VoiceXML document and stores it in a local storage for expected callers. When an expected caller dials into the system (from a manual dial or from a data session), the domain personalization/manager recognizes the DNIS/ANI associated with the call and retrieves an appropriate VoiceXML document waiting for the caller. The DVT-VoiceXML application engine 610 sends the VoiceXML document to the VoiceXML gateway 608 that executes the document controlling the voice session dialog. When the caller enters a response via voice or DTMF, the DVT-VoiceXML application engine 610 activates the instant messaging and notification hierarchy module and sends the user response to a back-end application. During the voice session, the DVT-VoiceXML application engine 610 can activate the HTTP directory client to provide directory service if needed.

As an example of a wireless data session initiated by a voice call, consider a telephone company customer calling her wireless provider's "wireless web customer service" number to check the remaining minutes on her account. When the call is received the ANI, or calling telephone number, is used to generate an email/SMS message that is sent to the caller, and the voice session terminates. When the subscriber accesses the URL within the message, a session is started connecting the provider's customer care WAP site, and the customer accesses her account information.

As another example, a wireless web customer or a wireless telephone service provider wants to reserve tickets for an upcoming concert and purchase the tickets from a ticketing company. The ticketing company is not on the service provider's portal. The customer calls an appropriate toll free telephone number, and navigates a menu to "concerts". The customer then chooses the IVR option "wireless ticketing". An email is sent to the customer's wireless device with the initial page being "upcoming concerts". The email is already tuned to the location of the caller. The customer can navigate the page to find information, price, and times, and purchase via the WAP application. The significant advantage to the ticketing company is that it easier to move the customer to a lower cost channel, and the cost of being on the service provider's portal is avoided.

In both of the examples a significant benefit is the ability of an end user to easily gain access to the relevant wireless data site without having to navigate multiple menus or enter a string of characters on the wireless device. This is a benefit to both the user and the company that wishes to have customers access company information over a wireless channel. Many applications benefit from initiation of a wireless data session by a voice call. They include customer service, direction finding, package tracking, movies, banking, gambling, and virtually any other interactive voice response (IVR) application.

This functionality does not require the wireless device to support simultaneous voice channel and wireless data channel. The voice channel can be terminated and the data channel can be opened later by the message that was sent to the wireless device.

One embodiment includes a call service that enables a customer application 602 to manage the sending of audio messages to a user and receive the user's touch tone response. The call service includes various components and software agents, including a call agent. The call service includes an incall service and an outcall service which include an incall agent and an outcall agent. A call service IVR receives a call from an end user and is ready with the appropriate sound files to play to the caller. After the audio files are played, the caller may hear a menu with choices or a transfer option, or a prompt asking for a multidigit string.

Before the call comes in, the customer application must send an XML file specifying which audio to play to which expected callers. Once the call is done, the call service will send the status of the call and the choice that the user selected from the menu to the response URL or the customer application so that the appropriate action can be taken.

Figure 7:
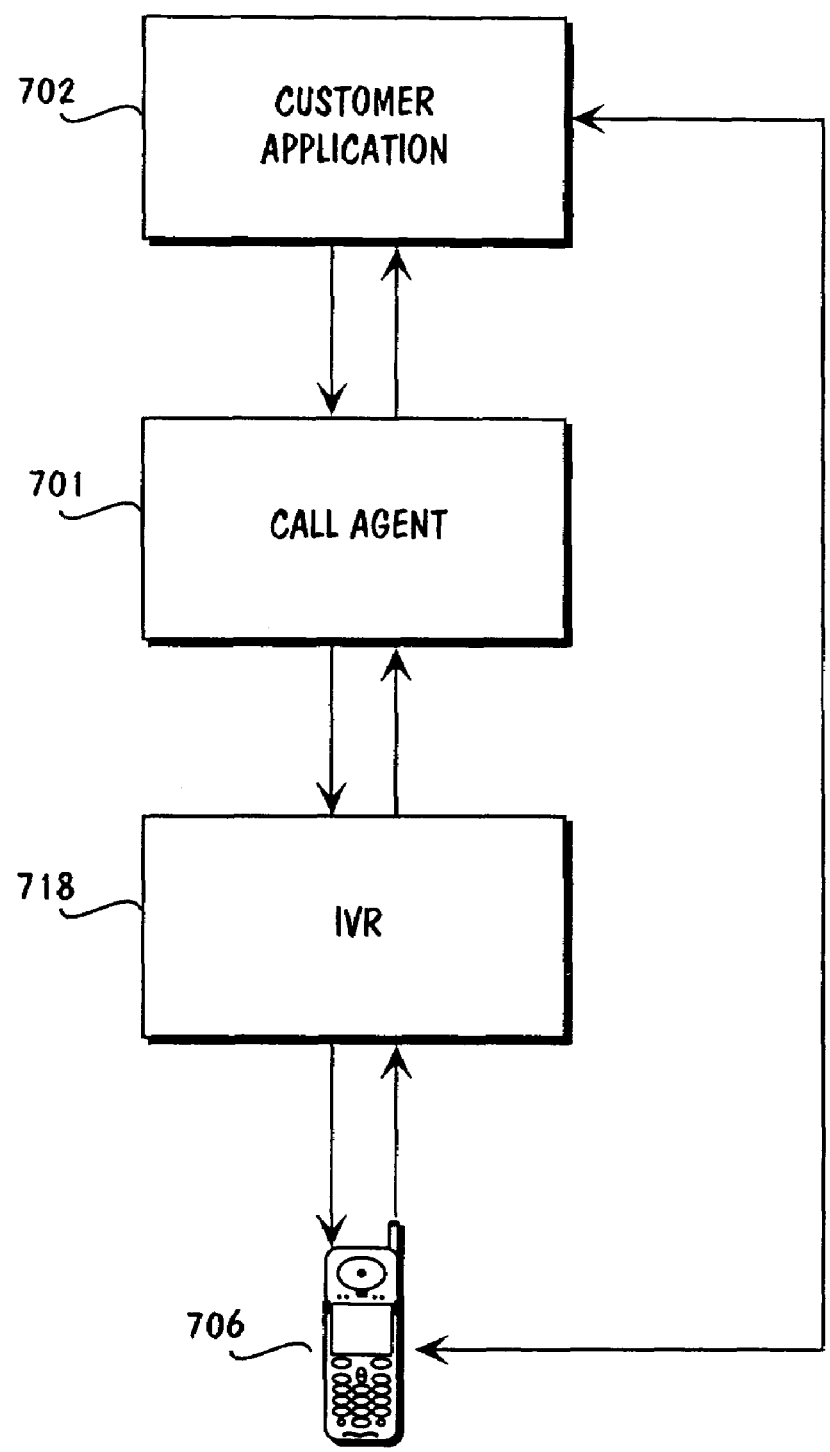
FIG. 7 is a block diagram of components of a call service.

FIG. 7 is a simplified block diagram of the call agent 701, showing its communication with a customer applications 702 and IVR service 718. The customer application 702 dictates the content that is to be played to end users through their telephones as well as any available content choices. The content and/or choices may be sound files, or they may be text that is rendered to audio by a text-to-speech object. The call agent includes an incall agent that receives calls from a caller, and an outcall agent that initiates calls to users.

The call agent 701 allows the customer application 702 to present information to mobile users that is not suited for the small screens typical of WAP-enabled mobile devices such as wireless device 706. This information is presented to the user via audio over the user's wireless device 706. Playing the audio includes checking to ensure that all audio is in an acceptable format, playing the content, playing the choices, and collecting a touch tone response from the caller.

The IVR service 718 handles the call with the end user. The call agent 701 sits between the IVR service 718 and the customer application 702 and manages the communication between the two. The customer application 702 provides an XML file that specifies, among other things, the audio file that the caller hears as well as any menu choices or transfer information for the call. This XML file also specifies any authentication necessary for the caller to receive the information.

A conversion component of the call agent 701 verifies that the audio requested by the customer application 702 is correctly formatted, and converts the audio content to a .wav file if necessary. The customer application 702 may specify audio in one of three ways: by specifying the URL of a valid .wav file; by specifying the URL of a text files; or by using text.

If the URL points to a .wav file, the conversion component checks the header to verify that the file type is supported. If the file has the RIFF header, it is accepted. RIFF is a Microsoft™ file format used for .wav, or WAV files. WAV is a sound format developed by Microsoft™. If the file has a national institute of standards and technology (NIST) header, it is re-written with a RIFF header. If the .wav file does not have a RIFF or NIST header, it is rejected. It is also rejected if it is empty or does not exist.

If the audio input is provided as a .txt file, the text is given to a text-to-speech (TTS) module for conversion to a .wav file.

A content player plays the content to the end user. Through a user interface, it provides the user with functions similar to those of a cassette player, including play, pause, fast forward, fast backward. These functions allow the user to repeat or skip portions of the message. The content player also has additional help functions built in.

The call agent further includes a menu selector. The menu selector is a self-contained object that handles the presentation of choices and their selection by the caller. The menu selector provides a single level of choices based on input from the customer application. All prompts pertinent to the menu, such as user input, caller selection, flow, and error handling are handled by the menu selector.

The menu selector receives prompts and choices from the customer application 702 via an XML file. The menu selector plays the prompts in the order in which they were provided. In one embodiment, each prompt is preceded by a prerecorded .wav file containing a phrase such as "If you would like . . . ", and is followed by the phrase " . . . press <number>", where <number> is the corresponding value for that choice as specified in the XML file. For each choice, the value is the DTMF code expected when the caller makes the given choice.

The menu selector returns the value of a choice ID corresponding to the choice value selected by the user. If the call was dropped, it returns the status, "dropped call" to the call agent 701.

If the interaction contains a transfer, "0" is reserved for the transfer choice value. If the interaction does not contain a transfer, "0" may be one of the menu choice values.

In one embodiment, the call agent interfaces with the Dialogic™ board and software via the Dialogic™ applications programming interface (API).

The call agent 701 accepts the XML file from the customer application 702 via an HTTP request. The XML file is different for the incall agent and the outcall agent. The incall agent and the outcall agent will be described more fully below. The incall agent and the outcall agent communicate with the customer application 702 via HTTP. In one embodiment, the format for the request from the customer application 702 is as follows:
http://<hostname>/servlet/Incall/?ID=nnn&xml=aaa.xml
where
hostname is the name of the server where the XML file exists
nnn (ID) is the customer specified ID for the call
aaa.xml (xml) is the XML file name The incall agent and the outcall agent each perform the following functions:

1. Get the request ID and XML file with the standard format from the customer application's HTTP request. The request from the customer application should be of the format:
http://<hostname>/servlet/Incall/?ID=nnn&xml=aaa.xml 2. The agent replies immediately to the customer application by transmitting a text file containing a numeric code and an explanation of the code. The standard HTTP status code of 200 should be present in the header, regardless of the contents of the text file returned.

If the request was well formed, the agent returns "0 accepted". If the request was ill-formed, the agent returns "<nnn> <plain-text explanation>".

If the reply was anything other than "0 accepted", there will be no further reply from the agent regarding the failed request.

3. Check the XML file format (using the standard XML parser). If the XML file was ill-formed, send the ill-formed status to the customer application.

4. Check user license and appropriate permissions.

5. Check for the existence of .wav and text files specified in the XML file. Also check extensions and file size. The audio for the interaction can be specified in any of several ways, including: text is inside of content tag; wave file in the URL; and text file in the URL.

6. If the audio is not an acceptable file type, the agent will send a message to the customer application indicating so:
http://www.customer.com/servlet/CallinService?id=nnn&status=unaccept 7. Pass the XML file to the IVR with request ID.

The menu selector provides a single level of choices for the user. It receives a set of prompt contents in text or wav format, and plays them in the order in which they were provided. Each prompt is preceded by a prerecorded wav file containing the phrase "If you would like . . . ", and is followed by the phrase " . . . press <number>", where <number> corresponds to the position of the current choice in the list. The value returned by the menu selector is a number between −1 and 9, where −1 indicates that the call was dropped, and the values 0 through 9 indicate that the user entered a valid choice. If the user enters a number that was not assigned to any choice, the menu selector will play an error message, and play the choices again from the beginning. This process is repeated until the user either hangs up or enters a valid choice, but the customer software may provide a "timeout" value that indicates the maximum number of cycles.

The incall service and incall agent will now be discussed in more detail with examples. The incall agent, in one embodiment, is a user-initiated voice channel content delivery and actionable response system. Users can reach the system either through direct dialing or from a WAP data session using the wireless telephony application (WTA) "make call" capability. The in-bound call can be user and/or session specific (but need not be), with built-in optional authentication capabilities. The content can be recorded audio or text presented using built-in text-to-speech. A single layer menu may be presented to the caller after the content has been played. The incall agent responds to an XML document or URL link request from a customer application, and provides status and response information to that application through HTTP.

An incoming call may be initiated from a data session to deliver information that is not conducive to the small screen on a web-enabled telephone. The incall agent can be used when context persistence when switching modes (from data to voice) is important. In this case, a call is triggered by a data session and the context of the data session is transferred to the voice call. On the other hand, the incall agent can be used for context-independent or user-independent audio content. In this case, any person who calls from any telephone device can hear a message.

In one embodiment, a standards-based VoiceXML gateway installation is supported in addition to a Dialogic D41/ESC based analog telephony platform. For the VoiceXML gateway configuration, the IVR component is served by a qualified VoiceXML gateway platform.

Two system configurations for an incall service including the incall agent will be described. Many more configurations are possible. The two configurations are referred to as option A (a Dialogic™ D41/ESC based IVR platform), and option B (a VoiceXML gateway based IVR). Suitable components for both configurations are listed below:

Option A: Dialogic™ D41/ESC Based Call Service
incall agent (the main incall service servlet)
XML Parser (C++)
IVR/DTMF: Content Player (C++/Dialogic)
Product Admin Web Page (JSP/Bean)
Option B: VoiceXML Version of Call Service
Agent (the main incall service servlet)
Content Manager (Java)
IVR Dialog Manager (VoiceXML)
Product Admin Web Page (JSP/Bean)

Option B includes a content manager software module. In the Dialogic™ D41/ESC based configuration (Option A), most functions performed by this software module are a part of the C++ based IVR component. The VoiceXML configuration does not have any C++ based platform to serve this module, and a set of Java classes take over this function. These Java classes reside on an application server of the architecture platform and perform various functions for both the incall agent (the main servlet) and the dialog manager (written in VoiceXML codes and Java server pages (JSP)).

System requirements for one embodiment of the incall agent of option A are:

Windows 2000, Service pack 2;

128 MB of RAM required, 256 MB recommended for T1 card;

Pentium III 733 MHz required, 1 GHz recommended for better Text-to-Speech performance;

Disk space for audio content caching: about 30 MB per hour of audio;

One or two Dialogic D/41-ESC cards (4 channels each) or single Dialogic D/240 (T-1); and Adequate network bandwidth for downloading audio content (LAN, DSL or T1).

The T-1 (or T1) carrier is the most commonly used digital line in the United States, Canada, and Japan. In these countries, it carries 24 pulse code modulation (PCM) signals using time-division multiplexing (TDM) at an overall rate of 1.544 million bits per second (Mbps).

Option B is a VoiceXML configuration. For option B, the system should include a Nuance™ voice web server and a VoiceXML gateway, such as VoiceGenie™. The VoiceXML gateway should be configured to associate one or more incoming voice ports with a DNIS (which is the number the user calls to access desired content) and URL. The URL is the root VoiceXML document for the incall agent. As an alternative to installing the VoiceXML gateway, the VoiceXML gateway can be hosted.

Performance of the incall agent on a T1 line is acceptable with separate machines handling the databases and servers. The central processing unit (CPU) overhead is relatively small. Dialogic™ supports this setup with an architecture designed to span multiple boards in multiple chassis. In this case the entire array appears as a single node with a large number of channels and resources.

Performance approximations for a T1 line are as follows: the incall agent can support 691 one-minute incoming calls per busy hour with a blocking factor of 0.001; 868 calls with a blocking factor of 0.010; 1000 calls with a blocking factor of 0.030; or 1244 calls with a blocking factor of 0.1. Where blocking factor is a measure of switch efficiency.

For failover handling in option A, the incall agent stores the XML files as they are given to it. In this case they do not need to be queued. Multiple IVRs are available to handle failover.

For failover handling in option B, failover is handled differently depending on the particular customer setup. If the customer is using a remote hosted VoiceXML gateway, failover management is built into the architecture of the hosting party. In this case, an incoming call is routed to one of several working machines. If the customer chooses to host their own VoiceXML gateway, failover is not provided, and the recovery process is reduced to manually restarting the VoiceXML gateway service on the platform after an incall agent failure, power outage, or other fatal system error. During this period, the system cannot accept a call. Such a recovery process takes approximately 15 minutes.

The incall agent can be scaled to a T3 line. A single T3 circuit has 28 DS-1 circuits for a total of 672 voice, or bearer channels. If primary rate ISDN (PRI) signaling is used, a few of the bearer channels are used to carry the signaling on a D-channel. PRI service is provided over a channelized T-1 facility. Twenty-three bearer channels (B-channels) are used to carry voice or customer data circuits. The twenty-fourth channel (D-channel) is used for out of band signaling to control the twenty-three bearer channels. Each B-channel has 64 k bits per second of throughput. At most one D-channel per T1 is used, but if the telephone company supports it, the customer can use non facility associated signaling (NFAS), where a single D-channel on one T1 span carries the signaling of several other T1 spans. The minimum voice channels in a T3 would be approximately 644 in the case of PRI with no NFAS, and the maximum would be approximately 672 (in the case of robbed bit signaling). With T3, the incall agent supports approximately 35,000 one-minute incoming calls per hour, with one percent of the callers getting a busy signal.

For NFAS, multiple PRI circuits to the same customer premises are bonded together so that the D-channel of one PRI can control multiple PRIs. This frees up the D-channels on the bonded trunks to be used as additional B-channels. Normally a second D-channel is assigned to be a backup to the primary D-channel for redundancy.

Figure 8A:
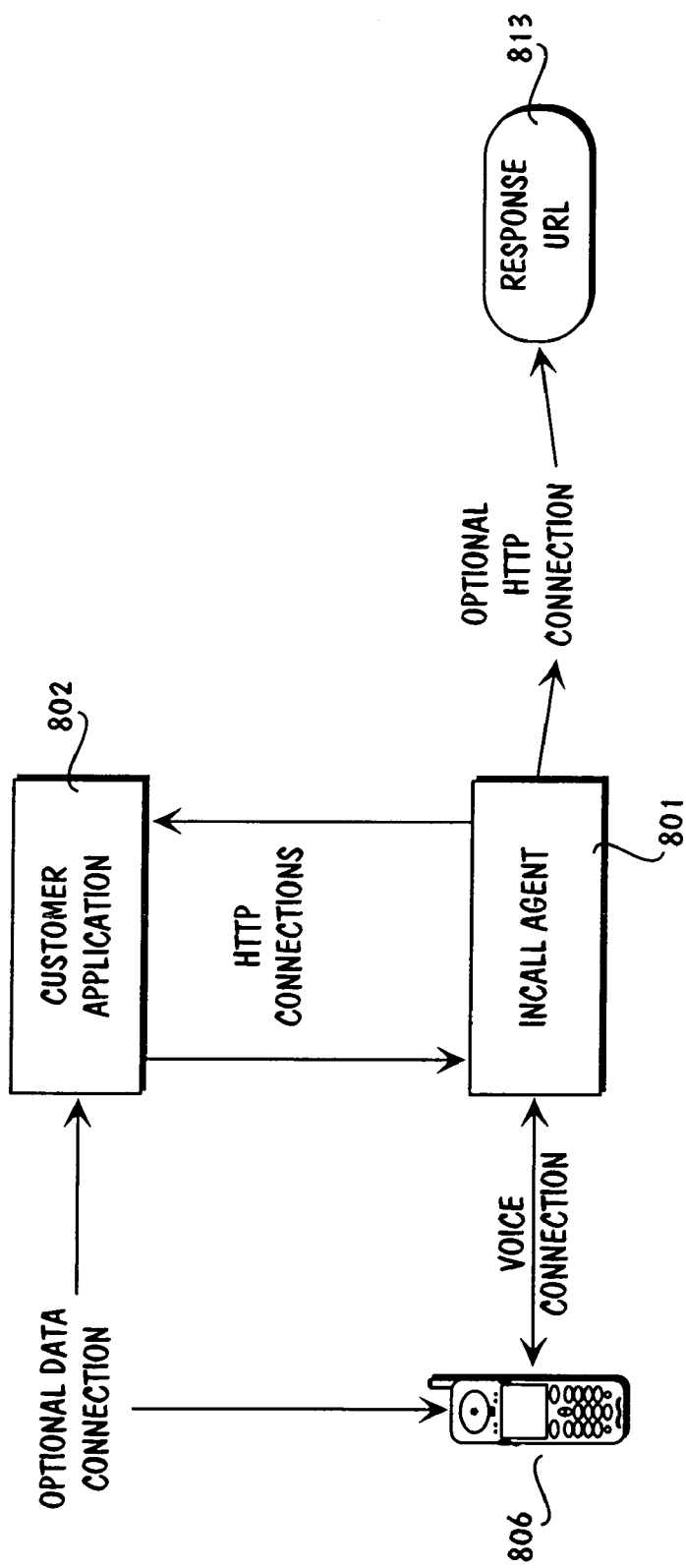
FIG. 8A is a block diagram of components of an incall service.

FIG. 8A is a high-level diagram of one embodiment that applies to both option A and option B. The incall agent 801 communicates with the customer application 802 using HTTP. The wireless device 806 communicates with the incall agent 801 using a voice connection, and with the customer application 802 using an optional data connection. The response URL 813 communicates with the incall agent 801 using an optional HTTP connection. A caller can dial in to the incall agent 801 directly or from a data session, such as a data session talking to the customer application 802. Once the caller has connected to incall agent, the caller can listen to a message and respond to requests for input. The result of the call, including any input given by the caller, is then passed back to the customer application 802 or to the response URL 813.

Figure 8B:
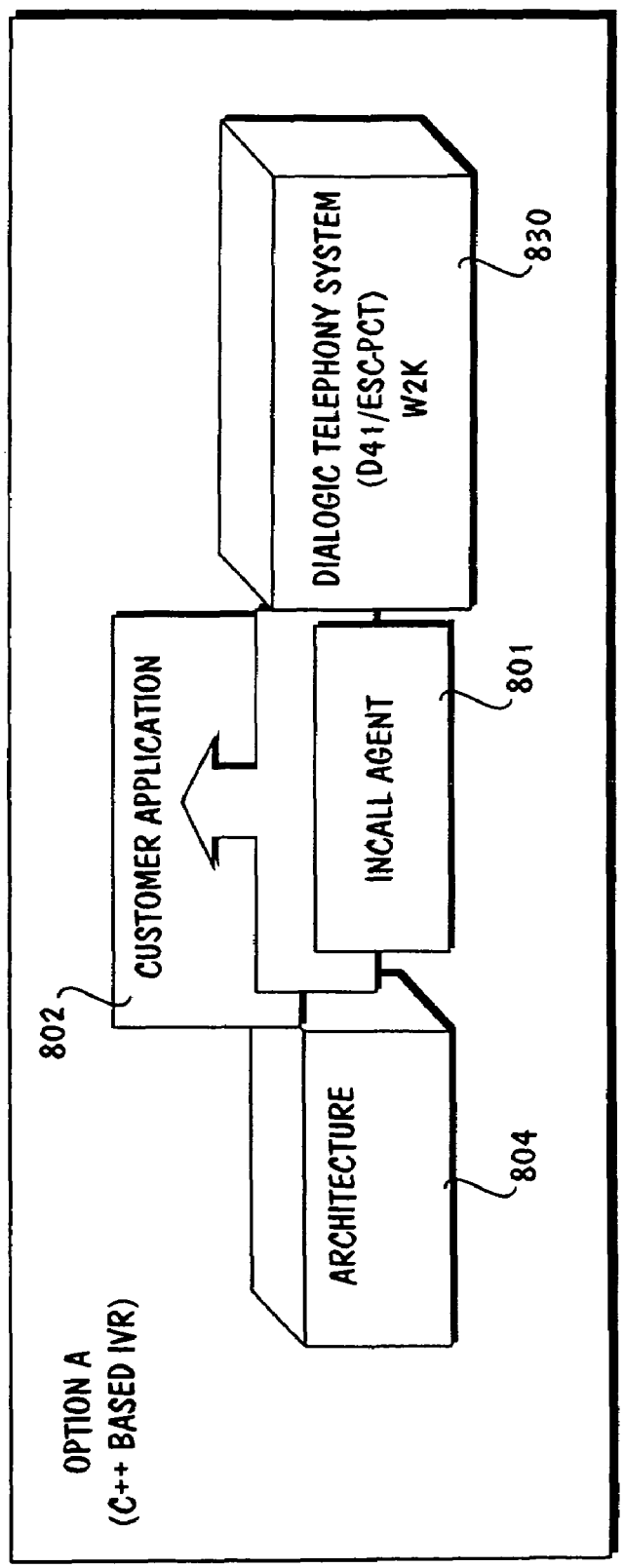
FIG. 8B is a block diagram of components of an incall service.

FIG. 8B is a diagram of an option A configuration in one embodiment. The incall agent 801 is between the customer application 802, the wireless network communication architecture platform 804, and the telephony system 830. The actual software modules (written in C++) reside on the Dialogic™-based telephony system (D41/ESC-PCI interface) 831.

Figure 8C:
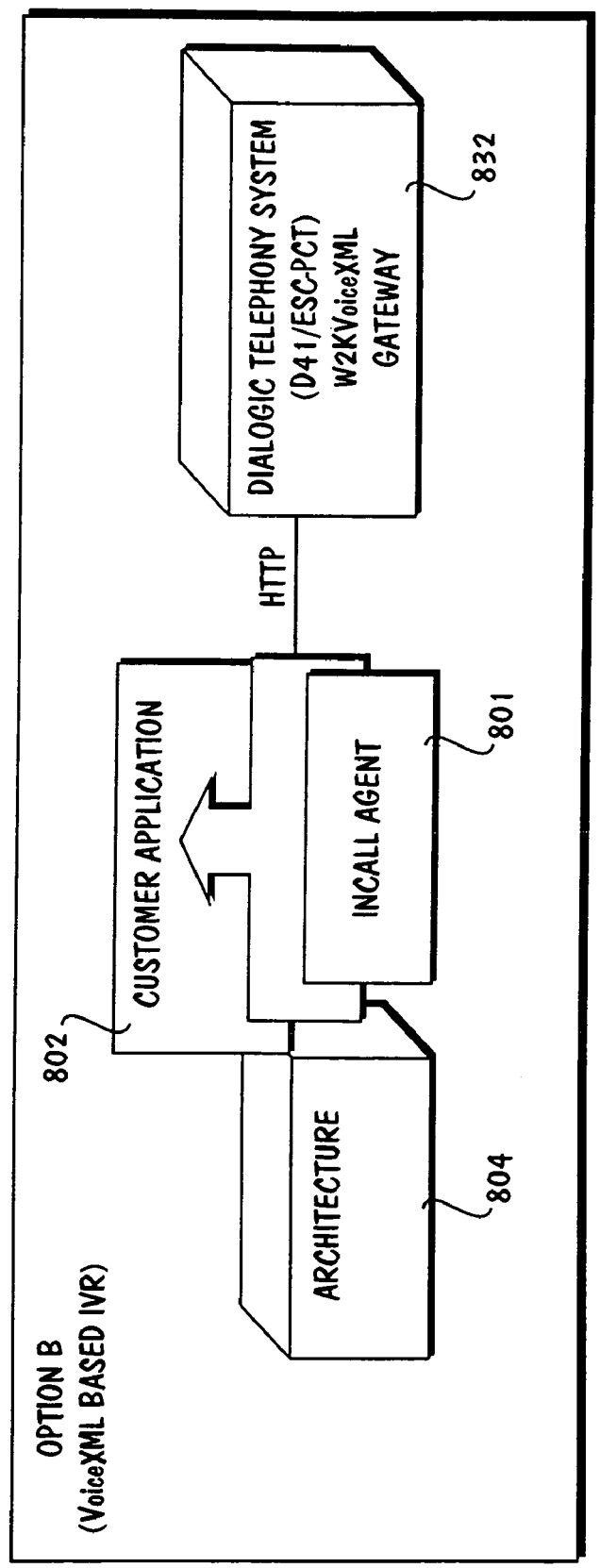
FIG. 8C is a block diagram of components of an incall service.

FIG. 8C is a diagram of an option B configuration in one embodiment. The configuration for option B supports VoiceXML based implementation where the IVR component (written in VoiceXML and related Java server pages (JSP) documents) of the incall agent 801 can reside on either the architecture platform 801, or on the actual VoiceXML gateway 832. If the incall agent 801 is on the architecture platform 804, the VoiceXML documents are delivered at run time to the VoiceXML gateway 832 via an HTTP interface.

For Option B, the run-time environment of the VoiceXML based IVR component is provided by the VoiceXML gateway 832 which can be either co-located on the same LAN with the architecture platform 804, or located in a remote hosting environment managed by a VoiceXML gateway operator such as VoiceGenie™, BeVocal™, Tellme™, HeyAnita™. The incall agent is thus independent from the telephony component of the VoiceXML 832.

Figure 8D:
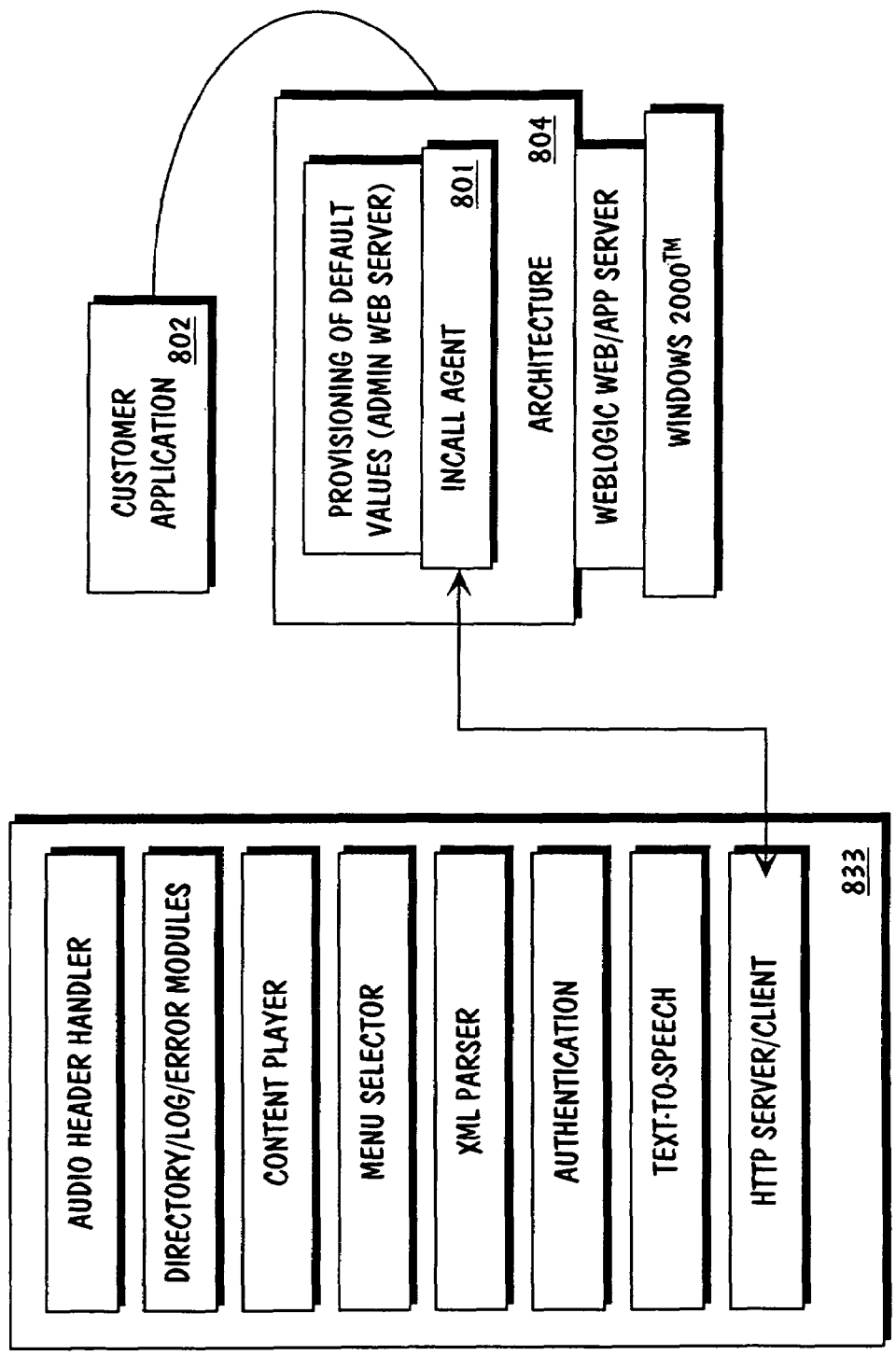
FIG. 8D is a block diagram of components of an incall service.

Typically, the incall agent resides on the architecture platform and supports one of the two configuration options described above. For both option A and option B, the incall agent 801 sits on the architecture platform 804, as shown in FIG. 8D. In option A, the IVR 833, or the part of the incall agent 801 that handles the telephony and the dialog with the caller, is on a separate platform.

Figure 8E:
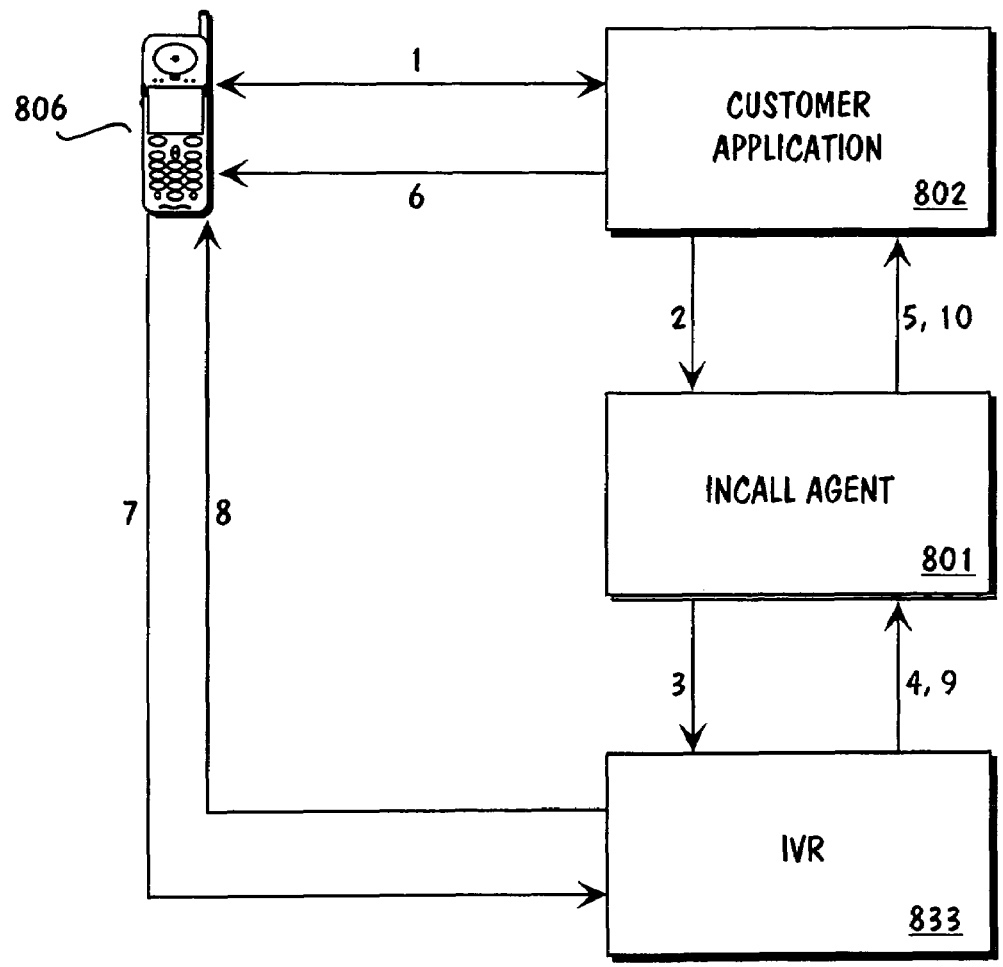
FIG. 8E is a block diagram of components of an incall service.
Figure 8F:
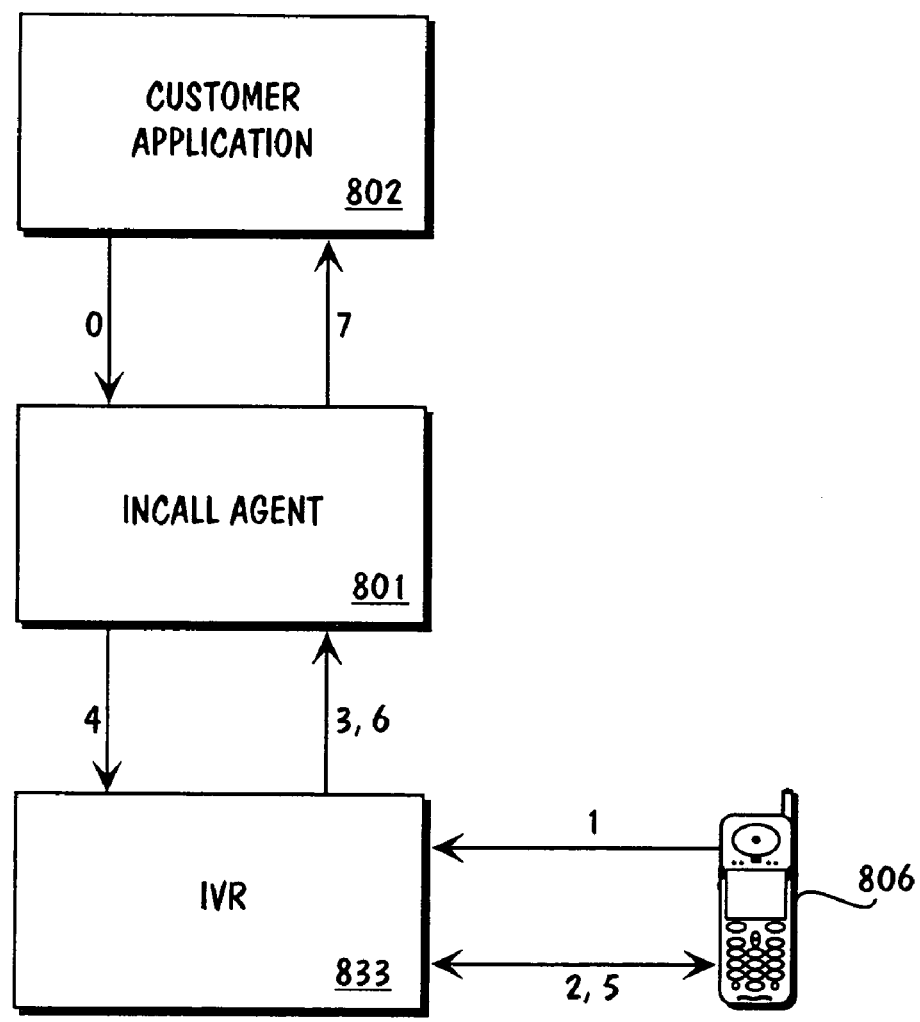
FIG. 8F is a block diagram of components of an incall service.

FIGS. 8E and 8F show two alternate call flows for option A. In FIG. 8E, the call is initiated from a data session. (1) The user is on a data session with the customer application 802. (2) When the user selects the content, the customer application 802 passes an XML file to the incall agent 801. (3) The XML file is then passed to the IVR 833. (4) The IVR 833 alerts the incall agent 801 that the IVR 833 is ready. (5) The incall agent 801 alerts the customer application 802 that the IVR 833 is ready. (6) The customer application 802 gives the user the option to call in. (7) The user calls in to the IVR 833. (8) The IVR 833 carries on a dialog with the user. (9) The IVR sends the call status to the incall agent 801. (10) The incall agent 801 sends the call status and telephone number to the customer application or to the response URL (not shown).

In the alternate call flow, shown in FIG. 8F, the call is initiated from a voice connection. The user is on a data session with the customer application 802. (0) At some point before the user calls, the customer application 802 must give the incall agent 801 the XML file for the caller. (1) The user initiates the call and the IVR 833 answers. (2) The IVR 833 collects the user's telephone number, either via mobile identification number (MIN), by asking the caller for it, etc. (3) The IVR 833 passes the telephone number to the incall agent 801. (4) The incall agent 801 passes the correct XML file to the IVR 833. (5) The IVR 833 authenticates (if necessary) and plays the content message. (6) The IVR 833 passes a status message back to the incall agent 801. (7) The incall agent 801 responds to the customer application 802 with the status and the telephone number.

Figure 8G:
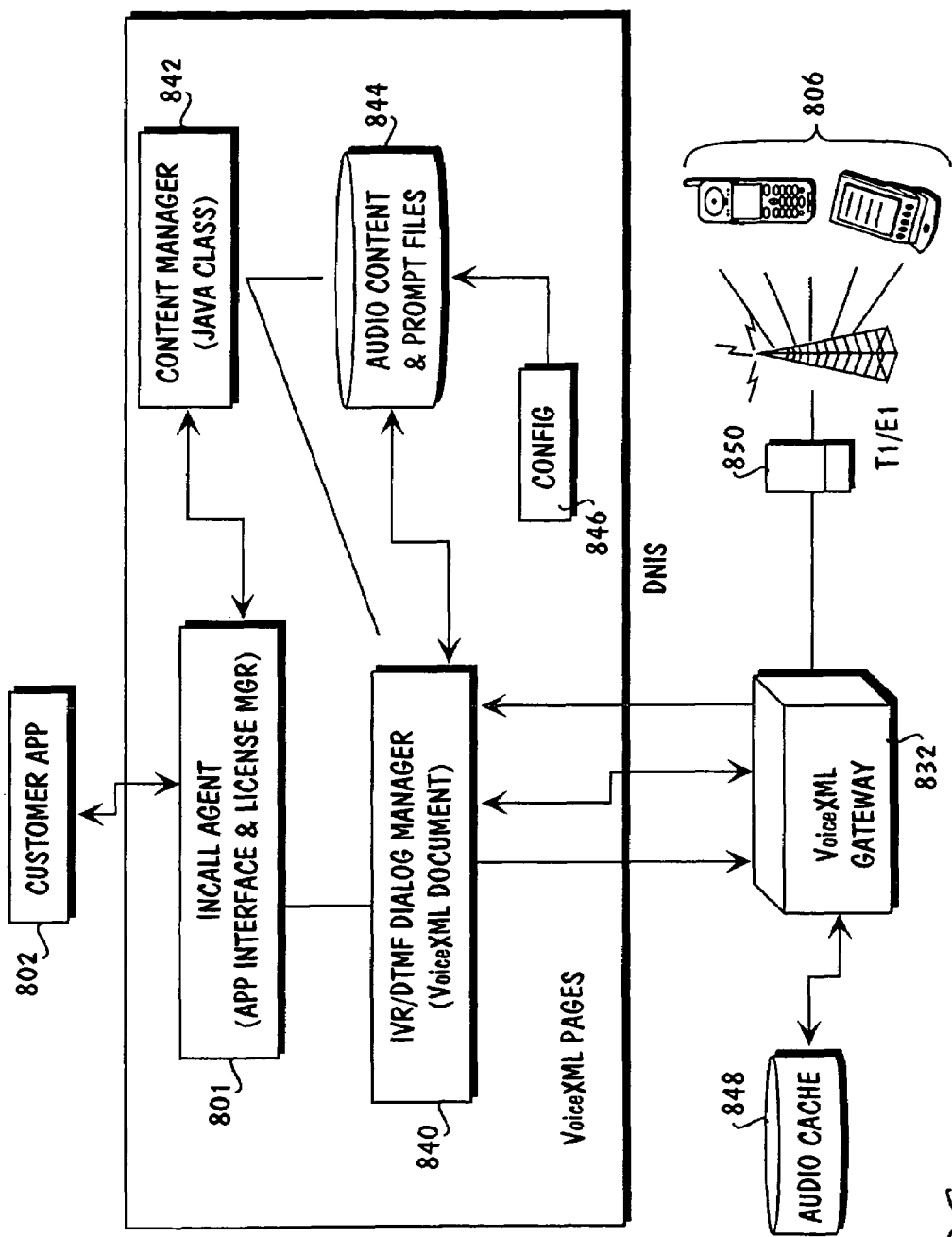
FIG. 8G is a block diagram of components of an incall service.
Figure 8U:
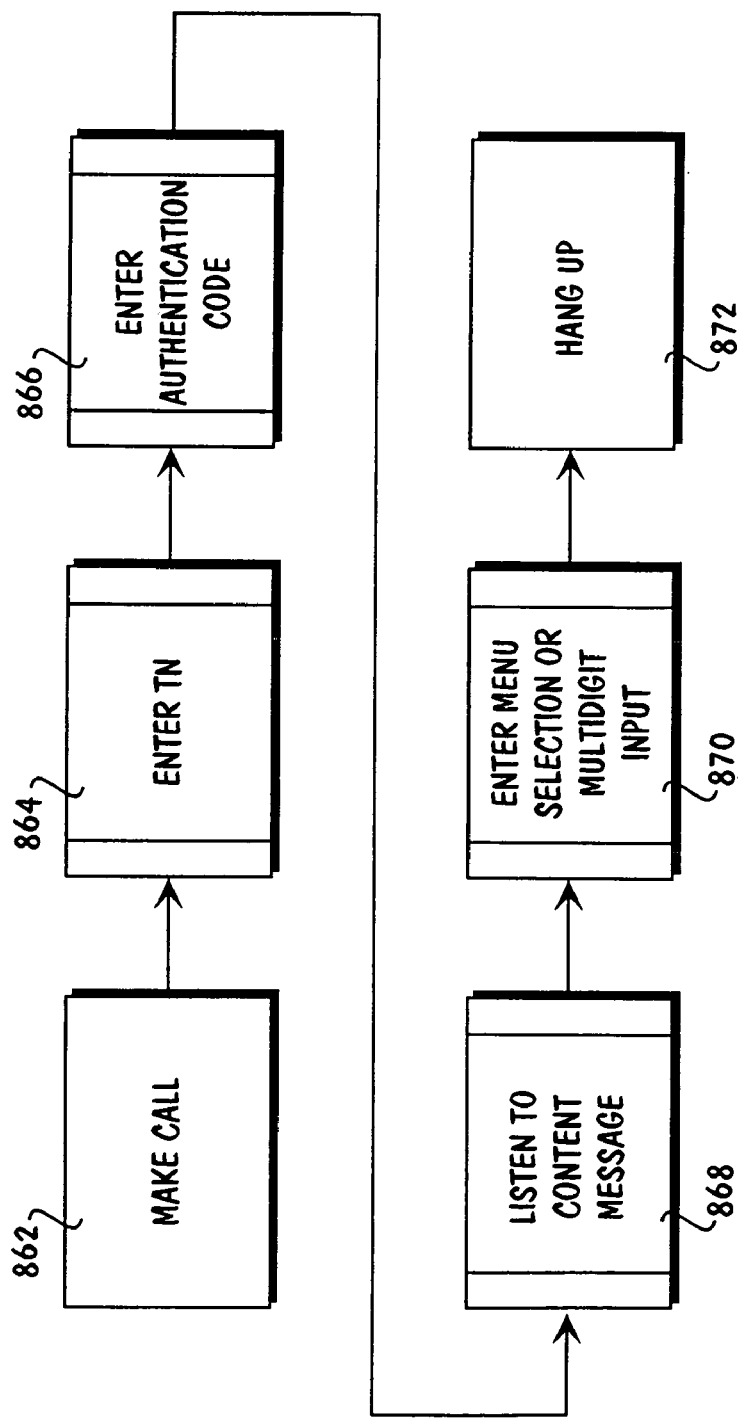
FIG. 8H is a flow diagram illustrating an incall service flow.

FIG. 8G is a high-level diagram of an option B embodiment. The architecture platform 804 includes the incall agent 801, the content manager 842, the audio, content, and prompt files 844, and the IVR/DTMF dialog manager 840. The architecture platform 804 communicates with the customer applications 802 and the VoiceXML gateway 832. The VoiceXML gateway 832 communicates with the audio cache 848 and the wireless devices 806. The VoiceXML gateway 832, in one embodiment, communicates with the wireless devices 806 through an ACD 850.

In one embodiment, the incall agent 801 is a Java class. The content manager 842 is an XML parser that is a Java class module that supports VoiceXML configuration. Configuration 846 is part of an administrative web site, and defines installation and configuration parameters, such as prompt language and file directories. The IVR/DTNF dialog manager 840 is a VoiceXML document that defines the DTMF-based IVR dialog (without voice recognition). This document is managed by the web server of the architecture platform 804 with a pre-defined URL for the VoiceXML gateway 832 to fetch.

In this VoiceXML based system configuration, option B essentially runs on two computers or groups of computers: the architecture platform 804, and a VoiceXML gateway 832 which could be hosted through a third party VoiceXML gateway 832 operator. An advantage of option B is that it could require only the installation of the architecture platform 804 without any other telephony infrastructure at the customer premise. The following describes how the data flows through the system shown in FIG. 8G.

The customer application 802 sends an HTTP request to the incall agent 801. One of the arguments to the HTTP request is a URL for the XML document defining the request details. The incall agent 801 checks the access permision for the requesting host and the arguments to the HTTP request, and then passes the XML file to content manager 842. The content manager 842 parses the XML file, processes related audio files, and stores the relates audio files at a proper location for one or more expected callers (ANI) calling into one or more specified numbers (DNIS).

When a call arrives at a particular voice port (DNIS) on the VoiceXML gateway 832, the VoiceXML gateway 832 sends an HTTP request to the architecture platform 804 asking for a pre-defined VoiceXML root document associated with that DNIS. If the caller's ANI is also delivered to the gateway 832, the gateway 832 will store the ANI at a location for the VoiceXML root document to use if desired.

The VoiceXML root document, after arriving at the VoiceXML gateway, will inate the IVR/DTMF dialog manager with DNIS and ANI if it is available.

IVR dialog manager 840 (written in JSP and VoiceXML) will contact the content manager for the initial opening prompts associated with that DNIS such as branding or service name defined in the XML document from the customer application 802.

If ANI is not available, the IVR dialog manager 840 will ask the caller to enter their ANI in DTMF. With DNIS and ANI, the IVR dialog manager 840 will retrieve relevant information about this call from the content manager 842 and carry on the dialog with the caller.

After obtaining a user response (if required) in DTMF, the IVR dialog manager 840 will send the user response to the incall agent 801 along with various status codes in the form of an HTTP request.

The incall agent 801 will then contact the content manager 842 to determine if there is a response URL defined in the XML document from the customer application 802. If there is, the incall agent 801 will send the user response to that response URL. If there is no response URL, or if the call is not successful, the incall agent 801 will send the user response to the customer application 802 if requested (via an argument to the original HTTP request from the customer application).

The user interface for the incall service includes prompts that can be constructed from pre-recorded prompts, customer supplied audio files, or text-to-speech. The user interfaces for both option A and option B can be identical. However, limitations of VoiceXML may dictate some differences in the interfaces.

The basic user flow for the incall agent 801 is illustrated in FIG. 8H. The user calls the incall agent IVR 862. In cases where the content is user and/or session-specific, if the customer application does not get the caller's telephone number via MIN, it asks the caller to input their telephone number by DTMF 864. Once it has the telephone number, it authenticates the caller 866, if directed to do so by the presence of authentication parameters in the XML file. Once the caller is authenticated, the incall agent IVR plays the content for the user to listen to 868. The incall agent IVR also offers any appropriate content player commands with any menu choices, or prompts the user for a multidigit input. The user may enter a menu selection or a multidigit input 870. Hanging up 872 ends the session.

The customer must supply the XML file that drives incall agent. The customer may build this XML file in any way, but for the purposes of this document, we assume that the XML file is built through some sort of automated application (e.g., a customer application). This customer application then sends the XML file to the incall agent via an HTTP request. The formats for the XML file and for the request are detailed below.

For a VoiceXML-based configuration, the VoiceXML gateway chosen to provide the run-time environment for the IVR/DTMF dialog manager (written in VoiceXML and JSP) is considered to be an external component even if such a VoiceXML gateway platform is on the same LAN as the architecture platform. The interface between such a VoiceXML gateway and the incall agent is an HTTP request. For each inbound voice port on the VoiceXML gateway there is a corresponding URL that points to a VoiceXML root document stored on the web server of the architecture platform. This URL must be reachable from the VoiceXML gateway, for instance:

http://<mobHost>/vxml/IncallService_start.vxml.

This root document URL is typically provisioned via an administrative interface on the VoiceXML gateway using standard web browsers or some type of graphical user interface (GUI) or text file entries. Table 1 shows the logic entries in such a provisioning table.

TABLE 1

| Channel IDs | DNIS | Default url |
| --- | --- | --- |
| 14 | 5124939850 | http://<mobhost>/vxml/SCI.vxml |

The database provisioning for incall services specifies which hosts may illustrated in Table 2, a table in a services database contains the following data for each host provisioned:

TABLE 2

| Column Name | Contents |
| --- | --- |
| id | Unique id (primary record key) |
| host | IP address |
| purpose | R for requesting host, A for answering host, v for a VoiceXML gateway |
| permission | Yes/No for current availability/authorization |

Only those hosts with R purpose and Yes permission can submit requests for incall agent services. Only those hosts with D or V purpose and Yes permission will be assigned requests for answering an incoming call to the incall agent IVR host (Dialogic D41/ESC based or VoiceXML gateway based). The host for the response URL and the host for the machine storing the XML must be provisioned in addition to the IVR host and the requesting host. For option B, the following additions are made to the incall agent provisioning table. These items are specified per DNIS:

Document Root directory;

Install type—either US/Canada or Europe (default is US/Canada);

Language for the prompts;

Voice talent;

Input mode—voice or DTMF; and

Audio Playback Skip Interval (go back or forward by N seconds).

For each item, a default is predetermined.

In one embodiment, the incall agent is a Java servlet based software module that acts as a link between the customer application and the IVR component. The incall agent uses the standard Internet HTTP protocol to communicate with the IVR, as well as to return status codes to the customer application. The incall agent also verifies that incall requests emanate from known authorized hosts, and manages assignment of requests to available hosts.

In one embodiment, the IVR is the component responsible for interacting with the end user. It interacts with the incall agent to receive the XML that feeds the dialog with the end user. After the voice channel based dialog with the end user, the IVR sends back a report in XML to the incall agent. The report contains the status of the call (e.g., success or failure) and the user response in DTMF, if required. The incall agent assembles a response message in XML and sends it to the response URL specified in the original XML file from the customer application. If no response URL is specified, the incall agent will discard the status report from the IVR. If the response URL returns a VoiceXML document in the case of VoiceXML configuration for this service, the VoiceXML document will be sent to the VoiceXML gateway. This will allow the user to conduct further interactions via the voice channel.

In one embodiment, for options A and B, the incall agent sends a post-call response either to the customer application or to the response URL. If the call is not successful, for example user input was desired but none was obtained, or the user disconnected before the end of the content message, the incall agent returns a status code indicating the nature of the call to the customer application. If the call was successful, for example user input was obtained, or no user input was desired and the listener heard the entire content message, the incall agent sends the call status along with the user input (if it exists) to the response URL.

Any file or text to be played to the end user is specified as a .wav file, a .txt file, or text in double quotes. FIG. 9A-9C provide more detail regarding the incall XML tags. FIGS. 10A and 10B lists example XML files that illustrate the use of the tags in the XML sent by a customer application to the incall agent.

The incall agent uses the standard Internet HTTP protocol to communicate with either the incall service IVR running on a Dialogic™ D41/ESC based telephony platform or the incall service IVR/DTMF dialog manager implemented as a set of VoiceXML documents which reside on the web server of the architecture platform. In addition, the incall agent sends the appropriate response messages to the response URL (if specified) that may or may not be a part of the customer application requesting the incall service. Specifically, the incall agent performs the following tasks:

for each HTTP request from the customer application, normal Internet status codes are returned, i.e., 200 for valid request and 400 for failing to parse the arguments to the HTTP request;

handle an optional parameter to the HTTP request from the customer application, such as acknowledge=<true|false>; default is true;

upon receiving the HTTP request, the incall agent sends back a status code to the customer application in XML format (such as "the XML file does not parse") if acknowledge=true;

after successfully completing the call as specified in the XML document, the incall agent sends the status report and the user response in XML format, if required, to the response URL; if no response URL is specified, the incall agent sends the XML data back to the customer application if acknowledge=true;

after failing to complete the call or failing to obtain a user response as required, the incall agent sends proper status codes and related error messages to the customer application if acknowledge=true;

delegate appropriate tasks to other components such as the C++ based IVR component or the VoiceXML based IVR/DTMF dialog manager to handle the incoming calls; and receive the final call status and the user response, if specified, from the IVR component via an HTTP request with embedded XML body as follows: http://<mob-host>/servlet/Incall?ANI=<ANI>&DNIS=<DNIS>.

The incall agent acts as a link between the customer application and the IVR component in both option A and option B. The format for the request from the customer application is http://<hostname>/servlet/
Incall?ID=abc&xml=aaa.xml&acknowledge=<true|false>
where:

hostname is the name of the server where the incall agent resides;

ID (abc) is the customer specified ID for the call;

xml (aaa.xml) is the XML file name; and acknowledge is true or false for returning acknowledgement to the customer application.

The incall agent responds to the customer application with HTTP requests, first to indicate the immediate feedback from receiving a request, and then with the result from the call. The immediate response consists of XML containing status and message in the following format:

```
<status>nnn</status>
<message>message text</message>
``` where the status is 200 for a success and 400 for HTTP request not valid.

Once a call comes in and is completed, the incall agent responds either to the customer application or the response URL, depending upon the status of the call. If the call is successful, the incall agent responds to the customer application. If the call was not successful and the acknowledge parameter is set to true in the original HTTP request from the customer application, the incall agent sends the status code back to the customer application. If the acknowledge parameter is set to false, the incall agent does not send a status code back to the customer application.

Table 3 lists 2-digit status codes returned from the incall service IVR to the incall agent under various conditions.

TABLE 3

| Message | Status Code |
| --- | --- |
| SUCCESS | 10 |
| NO_ANSWER/BUSY | 20 |
| AUTHENTICATION_FAILED | 21 |
| HANGUP_AFTER_AUTH | 22 |
| HANGUP_DURING_CONTENT_PLAY | 23 |
| HANGUP_AFTER_CONTENT_PLAY | 24 |
| HANGUP_DURING_MENU | 25 |
| HANGUP_AFTER_MENU | 26 |
| MISSING_ARGUMENTS_FOR_RESPONSE | 27 |
| NO_ENTRY_FOR_CALLER | 28 |
|  | Input |
| MENU_CHOICE_0 | 0 |
| MENU_CHOICE_1 | 1 |
| MENU_CHOICE_2 | 2 |
| MENU_CHOICE_3 | 3 |
| MENU_CHOICE_4 | 4 |
| MENU_CHOICE_5 | 5 |
| MENU_CHOICE_6 | 6 |
| MENU_CHOICE_7 | 7 |
| MENU_CHOICE_8 | 8 |
| MENU_CHOICE_9 | 9 |
| MENU_CHOICE_TRANSFER | 10 |
| MULTIDIGIT_INPUT | [xx . . . xx] |

The incall service IVR sends this status code to the incall agent using a standard HTTP POST request as follows:

http://<hostname>/servlet/
Incall?call_ID=<call_id>&url=<resp_URL> where the <resp_URL> (optional) came from the XML data received earlier from the incall agent. The XML specifying the response is as follows:

```
<status>NNN</status>;
<input>X</input>;
<message>message text</message>.
```

If there is no input (e.g., in the case of a hang-up, or when no choices are specified in the XML), the input tag is absent.

Based upon a "Purpose" configuration for the answering hosts provisioned at an administrative screen of a user interface, the incall agent knows if an answering host is a Dialogic D41/ESC-based IVR platform (Option A) or a VoiceXML gateway (Option B). In case of option A (Purpose=A), the incall agent communicates with the IVR component via an HTTP POST, with an attached XML body, as follows:

http://<IVR-host>/SmartIncall.html?id=<id> where the attached XML body is strictly copied from the original XML file submitted by the customer application.

In case of option B, the incall agent will pass this XML file to a Java-based content manager, which parses the XML file and processes individual XML elements accordingly. For either configuration option, if the XML file fails to parse (e.g., because it is missing the <Service> element), the incall agent sends proper status codes and related error messages to the customer application if acknowledge=true. Because both the incall agent and the content manager are implemented in Java classes and reside on the same architecture platform, they can communicate with each other using either http requests or Java class based services.

The incall agent keeps a list of requests that have been submitted. An HTTP request of the form http://<hostname>/servlet/Incall?pending will return a list of request IDs not yet reported as completed, along with their time of submission.

This Java based software module resides on an application server of the architecture platform. Its primary function is to parse the XML received from the incall agent, process audio content, and store it as various URLs for the IVR/DTMF dialog manager (VoiceXML document) to use. In one embodiment of option A, this set of functions are performed by a C++ based module residing on the Dialogic™ D41/ESC based telephony platform.

One of the variables the content manager must know is the location of the root directory for all the audio content files and system prompt files. Like the initial login page for the web administration of the architecture platform (e.g., http://<hostname>/html/Welcome.jsp), the underlying JSP document is stored in a pre-defined system folder. Similarly, the content manager must obtain this root directory location information from a data source. In one embodiment, this interface is implemented by introducing a new field on an incall service administrative page to associate the default web document folder for the web server with the actual reachable local folder name.

In one embodiment of option A, the installation will copy the system prompts for the incall service into a location that is not designed for constructing a URL path. For example, the actual system prompt files are copied from the release compact disc (CD) into a typical local folder.

In one embodiment of option B (VoiceXML version), all system prompt files are also copied into an appropriate webclient folder. For example, if these system prompt files are copied into the webclient folder, they are reachable later by a VoiceXML document.

For example, a Welcome.wav audio file stored there can be referenced by the following URL:
http://<hostname>/com/mobileum/incall/sounds/US_English/prompt/mobileum/Welcome.wav The directory structure for managing audio content is designed to handle both broadcasting mode, in which the same audio message could be accessed by millions of different end users, and personal mode, in which one audio message is only for one particular end user. The overall audio content directory tree is structured to support four mutually related branches under the root directory: DNIS, Service, ANI, and Audio. The following example directory tree is constructed by the content manager based on an XML file describing one DNIS entry, two ANI entries, one audio content file with a URL path, and a three-choice menu with each menu choice represented by a URL path pointing to an audio file of proper file format (.wav). To support fast-forward or fast-rewind while playing a long audio file, the content manager constructs five overlapping audio files from the original audio file. In the example of Table 4, it is assumed that the audio content is presented by a text file divided into three text files for support of playback options.

TABLE 4

```
$root_directory/<DNIS>/<Service_ID>/<Service_ID>.service_name
    .../5122901234
    .../5122904567
    .../audio/moive_sales.wav
        .../<time-stamp>_1.wav
        .../<time-stamp>_2.wav
        .../<time-stamp>_3.wav
        .../<time-stamp>_4.wav
        .../<time-stamp>_5.wav
    .../audio_text/<audio_file_name>.txt
    .../audio_text/1.txt
    .../audio_text/2.txt
    .../audio_text/3.txt
$root_directory/sounds/<language>/prompts/<voice-talent>/Thank_you.wav
                                              .../Goodbye.wav
```

Every XML file requires a service name element, such as <Service name="some text">. Because the name attribute does not have any limit on text strings, the content manager maps each name string into a unique service ID using some algorithm. For example, a name string "movie sales online store" may be mapped into "moviesale1404", which is the first two words plus a 4-digit sequence number.

The content manager provides an API as illustrated in Table 5 for the IVR dialog manager or the incall agent to retrieve context information about a specific call.

TABLE 5

| API Argument | Data Available | Explanation/Example |
|---|---|---|
| DNIS | $root_directory<br><language><br><service_ID> | cm( ).root<br>cm( ).language<br>acm( ).serviceID |

TABLE 5-continued

| API Argument | Data Available | Explanation/Example |
|---|---|---|
| DNIS, ANI | Auth_description | cm( ).authDescription (could be null) |
|  | Auth_code | cm( ).authCode (could be null) |
|  | NumAudioSeg | cm( ).NaudioSeg (1 to N) |
|  | Prefix_audio_file | cm( ).prefix (e.g., <time-stamp> like YYYYMMDDHHMMSS) |
|  | Suffix_audio_file | cm( ).suffix (e.g., ".wav") |
|  | NumMenuChoices | cm( ).NmenuChoices (1 to 9), acm( ).menu[i]<br>cm( ).menu[I].type = "txt", "wav", "url" |
| ANI | <response_URL> | Acm( ).responseURL (could be null) |

For option A, the telephone number collection component uses the telephone number class as previously defined. In one embodiment, the DTMFTelephoneNumberClass is used. For option B, the telephone number collection component is implemented in VoiceXML. In one embodiment, telephone number collection is always turned on, because MIN may not be reliable across a VoiceXML gateway.

The behavior of the authentication component is the same for option A and option B. If the XML contains non-empty strings for the authentication description and authentication code, this component plays a phrase such as, "If you are $expected_caller, please enter your <authentication_description> followed by the pound sign". The authentication component accepts a string of DTMF tones. If the string matches the expected authentication code, the authentication component returns "true", otherwise it repeats the above procedure up to a configurable number of times. If the user has not entered the correct code the authentication component plays a final error message, drops the call, and returns "false".

If the XML contains no authentication codes, the component returns "true". An empty authentication description or an empty authentication code indicates that authentication is not necessary for this interaction and therefore should be skipped in the dialog.

The following use cases are examples that describe the user experience with the incall service, including the interaction on a data session with the application, the call initiated from the data session, the interaction with the IVR, and subsequent actions. The incall service handles the portion of this experience that dictates the interaction between the user and the IVR.

In a first case, Jane follows Company WX and other wireless infrastructure companies closely. She subscribes to a service from Epoch Partners™ that provides her with an analyst's comments every Tuesday morning. When she turns on her cellular telephone on Tuesday morning, typically there is already an alert message from Epoch Partners™ waiting for her. Once she has gotten her daily 30-minute commute to work underway, she views the alert message. The message offers Jane the option to listen to the report. Jane presses the "CallIn" softkey, puts the handset to her ear, and waits to hear the analyst report.

The content in the report is specific to Jane, and therefore requires her telephone number as well as an authorization code. If Jane's telephone number does not come through on CallerID, the IVR will ask her for it. Jane uses the "fast forward", "rewind", and "pause" functions to facilitate reviewing the material. When Jane gets to the end of the message, she can choose an action such as faxing or emailing the document.

If Jane's call drops, she uses her telephone's "redial" function to get back in. She uses the "fast forward" function to get back to the portion she was last listening to.

In a second case, John wants to see a movie at a theatre tonight, but doesn't know what is playing. He accesses the Fandango™ site from his cellular telephone. John has previously allowed that site to categorize the zip code he lives in as well as his movie preferences. John loves action films and never wants to hear about romances. Today, he can see that there are two interesting looking films playing nearby. John selects one of the films and presses a softkey that invites him to listen to a movie review. He then puts the handset to his ear. When the call connects, he hears the movie review. After the review is completed, he is offered the option to purchase a ticket. Instead, John just hangs up and browses to the next film, to hear that review.

The movie review must be queued up for John when he requests it. While it is a public piece of material, it is one of many available. Therefore, if John's CallerID had not come through, he would have been asked to key in his telephone number. However, because this is not secure material, John will never be asked for an authorization code of any kind. John can take advantage of the "fast forward", "rewind", and "pause" functions to navigate through the material.

Because the "actions" on this material are optional, hanging up is an option for John. John just goes back to where his browser left off. Many telephones cache the last page. For telephones that do not cache the last page, and "action" can allow the user to return to a previous location in a data session. If John elects to purchase a ticket, a browser alert is sent to allow him to navigate easily to the appropriate point in the data site.

The outcall service and outcall agent will now be discussed in more detail. In one embodiment, the outcall service enables a customer application to send a voice alert to an end user by making an outgoing call and playing audio messages to the person called. The outcall service then either plays a single-tier menu or plays a prompt asking for multidigit input, and accept a response.

The outcall service initiates a call to an end user which may or may not be an actionable call. The customer application specifies that the IVR send a voice alert by calling an end user. Once the end user answers and authenticates (if necessary), the specified voice files are played, choices are presented, or an input string is asked for, and a response is accepted. The XML file sent by the customer application can specify the phone number to call and the audio file(s) to be played as well as the authentication information, menu choices or value input prompt, and transfer information.

In one embodiment, the outcall service requires the following system setup:
  Windows 2000, Service pack 2;
  128 MB of RAM required, 256 MB recommended for D/41 setup, 256 MB required for T-1 card;
  Pentium III or better, 733 MHz or faster required, 1 GHz recommended for better Text-to-Speech performance;
  Disk space for audio content caching: about 30 MB per hour of audio;
  Dialogic telephony system release 5.0.1;
  A single Dialogic D/41-ESC card (4 channels) or a single Dialogic D/240 (T-1);
  Fonix FAAST TTS 5.0 software; and
  Adequate network bandwidth for downloading audio content (LAN, DSL, or T-1).

Digital trunks require different call control signaling than the analog lines. The two most common signaling schemes for T1 lines in North America are Robbed Bit Signaling (RBS) and Primary Rate ISDN (PRI). For RBS, a non-ISDN digital trunk is provided over a channelized T-1 facility. 24 channels are available for voice or customer data circuits. Signaling is in-band in that a few bits from each T-1 superframe are "robbed" to serve as status bits for the 24 channels. Each channel ends up with only 56 k bits per second of real throughput. Digits are sent as DTMF or MF tones in-band during call setup.

In various embodiments, different protocols may or may not be supported for RBS and PRI. For example, for one embodiment using PRI, only National ISDN 2 (NI2) protocol is supported.

One embodiment of the outcall service supports a T-1 line based Dialogic™ digital telephony platform with a single T-1 interface card (D240). With a T-1 line, the outcall service can support 1380 outgoing one-minute calls per busy hour, at 100% capacity. To handle failover, the outcall service keeps the XML files sent by the customer application. In a worst-case scenario, the end user could receive more calls than the ensure completion value indicates. However, this case is expected to be extremely rare and the consequences acceptable. The outcall service allows multiple active IVR hosts to be provisioned, therefore, if one IVR host is down, another can complete the calls. A switch to a new IVR can be manual or automatic.

Figure 11A:
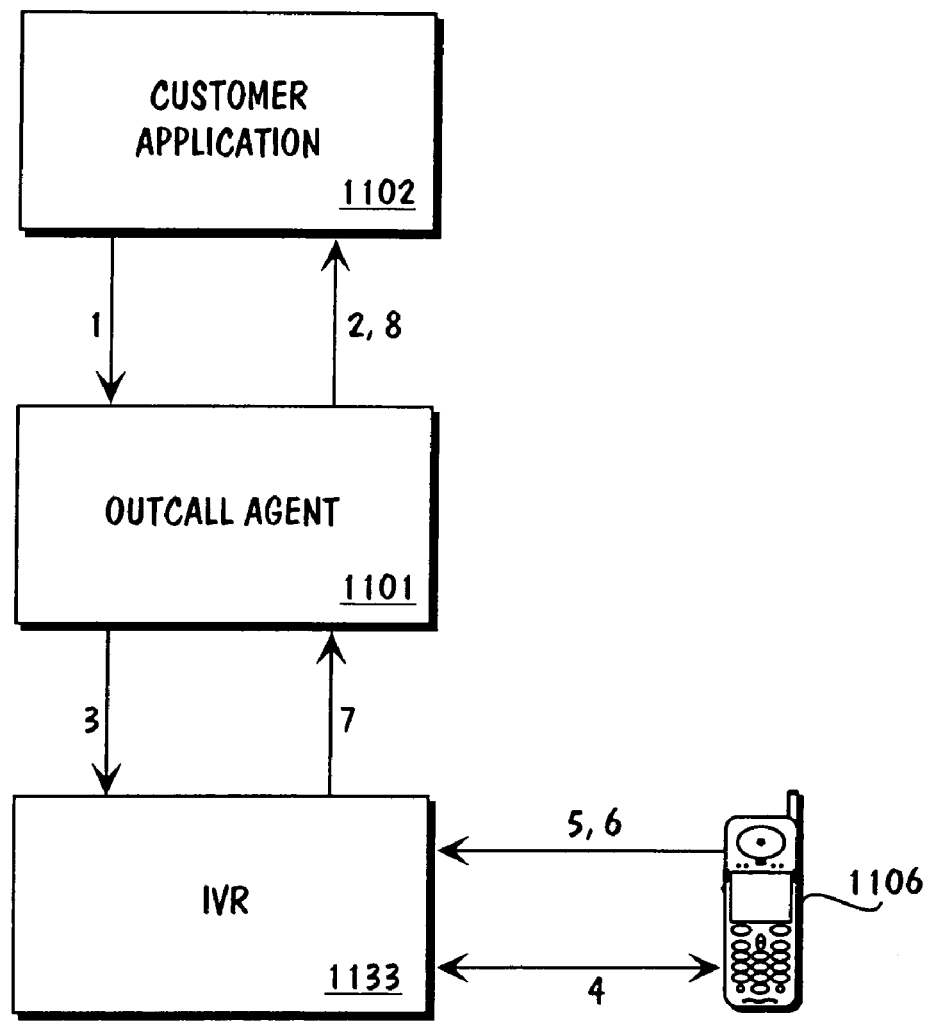
FIG. 11A is a block diagram of components of an outcall service.

FIG. 11A is an overview diagram of one embodiment of the outcall service. The outcall agent 1101 communicates with the customer application 1102 and the IVR 1133. The IVR 1133 communicates with the wireless device 1106. The following items explain a data flow for the outcall service:
  (1) the customer application sends an XML file to the outcall agent;
  (2) application telling it whether the request was accepted;
  (3) the outcall agent passes the XML file on to the IVR, and the IVR passes the XML and checks the headers of the audio files to ensure they are acceptable;
  (4) the IVR calls the specified number;
  (5) the IVR asks for authentication to ensure that the correct person was reached (this is optional);
  (6) the IVR plays the content message and any menu choices or a prompt for multidigit input;
  (7) the IVR sends the recipient's response to the outcall agent; and
  (8) the outcall agent returns a status message to the customer application including the recipient's response.

Figure 11B:
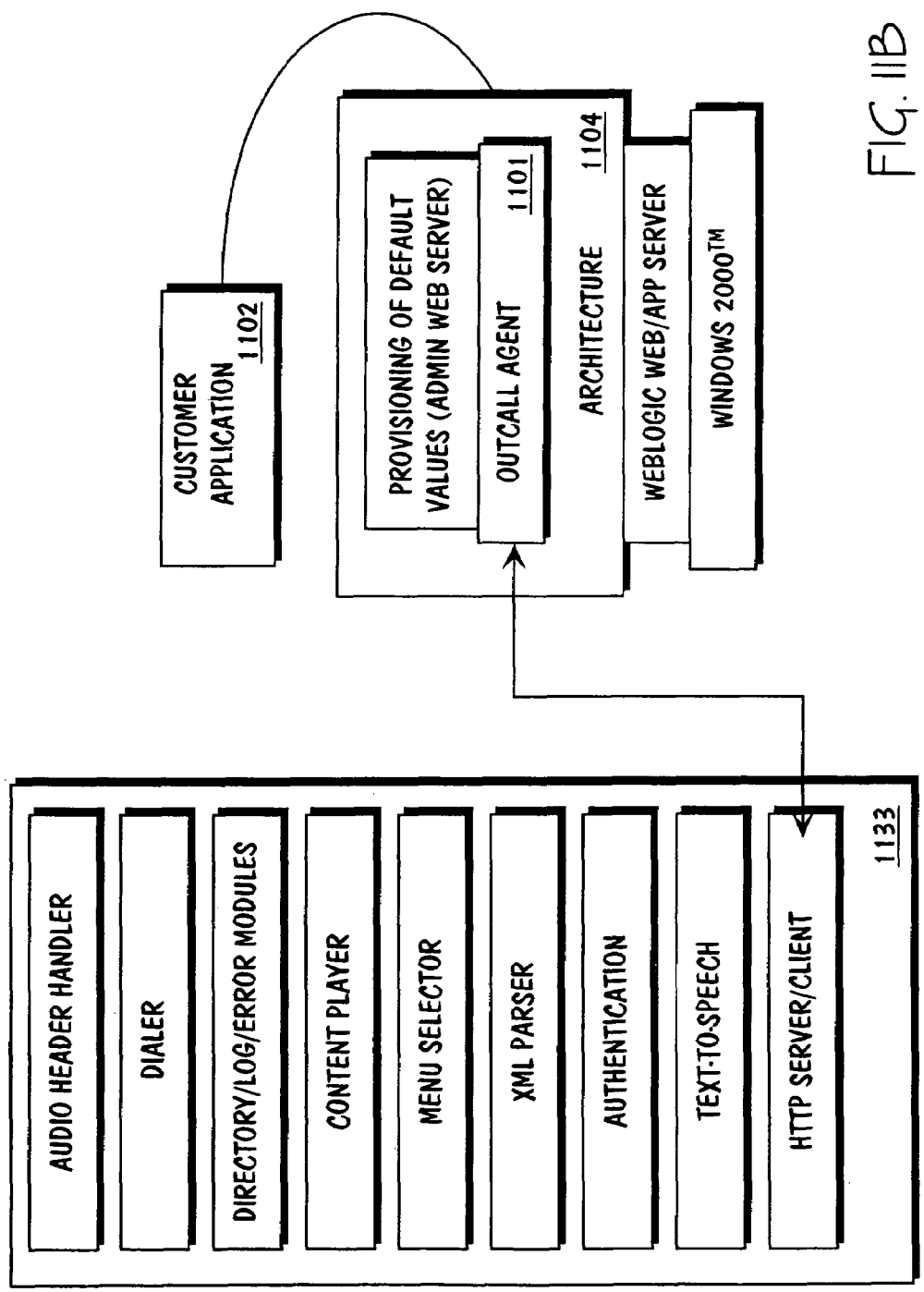
FIG. 11B is a block diagram of components of an outcall service.

Typically, the outcall agent 1101 resides on the architecture platform 1104 as shown in FIG. 11B.

Figure 11C:
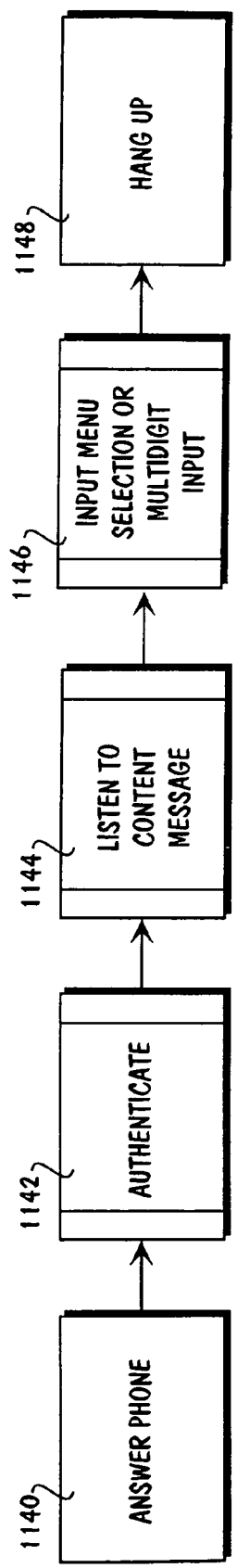
FIG. 11C is a flow diagram illustrating an outcall service flow.

FIG. 11C illustrates an example of a user flow for the outcall service. The user receives a telephone call, just like any normal telephone call. When the user answers 1140, they authenticate 1142 if necessary. If it is not necessary to authenticate, the user can press any key to indicate that the system has reached a person and not an answering machine or voice mail. The user can then listen to the content message 1144 (with the appropriate content player commands) and choose from the menu choices 1146, if offered. If the menu choices permit, the user may choose to be transferred to a different number. Hanging up 1148 terminates the session.

Various implementation details for embodiments of the outcall service will now be discussed. The implementation details refer to two of the software components that work together to provide the functionality of the outcall service. The first component is a Java-based outcall agent. The second component is a C++ based software component, the outcall IVR, which interfaces directly to a Dialogic™ telephony platform.

The customer must supply the XML file that drives outcall service. The customer may build this XML file in any way, but for the purposes of this document, we assume that the XML file is built through some sort of automated application (e.g., a customer application). This application then sends the XML file to the outcall service via an HTTP request. The tags for the XML file are detailed in FIGS. 12A-12C. FIGS. 13A and 13B lists example XML files that illustrate the use of the tags in an XML file sent by a customer application to the outcall agent.

The outcall agent makes standard requests of the product provisioning and configuration tables that are stored in a database of the architecture platform. This set of tables can be organized as a single web page for all voice products. The outcall agent has its own web page to provision various runtime parameters. In addition, the outcall agent is integrated with other services to deliver "voice" alerts in addition to other types of alerts such as WAP, SMS, etc.

The database provisioning for the outcall services specifies which hosts may make requests, and which hosts are available to serve those requests. A MOBHOSTPERMISSION table in a services database contains the data shown in Table 6 for each host provisioned.

TABLE 6

| Column Name | Contents |
|---|---|
| Host | IP address or domain name such as www.ml.com |
| Reference App | Outcall |
| Host Type | Request or IVR |
| Permission | Yes/No for current availability/authorization |

Only those hosts with host type Request and permission Yes can submit requests for outcall services. Only those hosts with host type IVR and permission Yes will be assigned requests for dialing. In the case of a WAP browser making the request of the outcall service, the host on which the attached XML file can be found must be provisioned.

The outcall agent checks licensing issues and interacts with the customer application and the IVRs. One task of the outcall agent is determining which provisioned IVR to send an XML file to. The outcall agent uses a load balancing algorithm to determine the IVR that has been contacted least. However, the outcall agent must send all HTTP requests with the same ID to the same IVR so that M-files and their corresponding P-files go to the same IVR. The outcall agent also determines if/where to send a response based on the outcome of a call.

The outcall agent accepts an XML file from the customer application via an HTTP request. The request may be either a POST or GET request. If the customer chooses to utilize a GET request, the format for the request from the customer application is as follows:

http://<hostname>/servlet/Outcall?ID=<abc>&xml=<xml-file url>&acknowledge=<true|false>

The format for a POST request is as follows:
http://<hostname>/servlet/
 Outcall?ID=<abc>&acknowledge=<true|false>
where
hostname is the name of the server where the outcall agent resides
ID abc is the customer specified alphanumeric ID for the XML request
xml xml-file is a URL pointing to the XML file that specifies the dialog
acknowledge specifies whether the sending application will receive error messages or not, since only information about successful calls will be sent to the response URL specified in the XML In order for the outcall agent to support multiple customer applications and multiple IVRs, the ID for an M-file and all corresponding P-files must match. An M-file is one that contains a MULTICALL tag and possibly a PERCALL tag. A P-file is one that contains only a PERCALL tag and no MULTICALL tag. The calls specified in a P-file use tag values specified in a previous M-file.

The outcall agent responds immediately to the customer application with an HTTP request to indicate the immediate feedback from receiving a request. This immediate response consists of XML containing the status and a message in the following format:

<status>NNN</status>
<message>message text</message> where the status is 200 for success, or 400 for HTTP request not valid.

After the outcall IVR completes a call, either successfully (e.g., by reaching the number specified in the XML file), or unsuccessfully (e.g., by reaching a point at which it cannot fulfill the request for any reason), it sends a final status code to the outcall agent.

The 2-digit status codes shown in Table 7 are returned from the outcall IVR to the outcall agent under various conditions.

TABLE 7

| Message | Status Code |
|---|---|
| SUCCESS | 10 |
| NO_ANSWER/BUSY | 20 |
| AUTHENTICATION_FAILED | 21 |
| HANGUP_AFTER_AUTH | 22 |
| HANGUP_DURING_CONTENT_PLAY | 23 |
| HANGUP_AFTER_CONTENT_PLAY | 24 |
| HANGUP_DURING_MENU | 25 |
| HANGUP_AFTER_MENU | 26 |
| MISSING_ARGUMENTS_FOR_RESPONSE | 27 |

The outcall IVR sends this status code to the outcall agent using a standard HTTP POST request as follows:

http://<hostname>/servlet/
Outcall?call_ID=<call_id>&url=<resp_URL> where the <resp_URL> (optional) came from the XML data received earlier from the Agent. The XML specifying the response is as follows:

<status>NNN</status>
<input>X</input>
<message>message text</message>

If there is no input (e.g., in the case of a hang-up or if no choices are specified in the XML), the INPUT tag is absent.

After the outcall agent receives a final response from the outcall IVR, the outcall agent will reply to the response URL of the customer application, or not at all, depending on the status of the call and the value of the acknowledge parameter in the original HTTP request. If the call is successful (status code 0) the outcall agent will form an HTTP request to be sent to the response URL with the following format:

<resp_URL>?call_ID=<call_id>&status=NN&input=
value&message=message where "NN" is the 2-digit status code from outcall IVR, "input" is the user's input, and "message" is the corresponding message. For example, if the status code is 0, the input 1, the message will be "Menu Selection 1".

If the status code is not 0, the outcall agent will determine where to send the result based on the acknowledge parameter sent with the original HTTP request from the customer application. If the acknowledge parameter is set to True, the outcall agent will send the result of an unsuccessful call back to the customer application. If the acknowledge parameter is False, the outcall agent will not respond to the customer application with the result of the call. The default for the acknowledge parameter is True.

The outcall IVR keeps a list of requests that have been submitted, but have not yet been completed. An HTTP request of the proper form will return the number of pending calls for the specified service.

An HTTP request with a reset tag set in an XML tag will cancel the values for that tag and any of its child tags. Only certain tags, such as service and call tags, may be specified for reset. FIGS. 12A-12C show detail for the outcall XML tags. If a service is canceled, all calls specified for that service will be canceled. Calls in progress at the time of the request will be completed. If a call is canceled, only that call will be removed from the queue. The ID for this HTTP request must match the ID for the HTTP request that contained the M-file or P-file that specified the service or call to be canceled.

In one embodiment, the outcall agent and the outcall IVR use the VPLSecurityLock™ software to ensure that the request to the outcall IVR is coming from a known source.

The outcall IVR interfaces with the Dialogic™ board and software via the Dialogic™ API. The Dialogic™ channel encapsulation provides a method for placing an outbound call and determining the outcome of the call (voice connection, busy, no answer, etc.), using Dialogic™ call analysis. The dialing component is configured to retry the call a specified number of times, or to send a status message back to the outcall agent. These behaviors should vary according to the result of the dialing attempt.

The "cache" is a module used by the outcall IVR. Cache is a class that maintains a map of audio data specifiers, such as a URL, a disk file name, or literal text, and the corresponding path to a local disk file. It provides methods to add entries or arrays of entries, transparently invoking TTS code or web client code to process literal text or URLs. Audio content should be added to the cache before a call is placed or received, to avoid delays associated with TTS or downloading.

The "ACR menu" is another module used by the outcall IVR. The ACR menu is a class that presents a set of choices to the user, requests confirmation once a choice has been made, presents the choices two more times if no choice is made, and finally returns a status code. This codes may be the ordinal of the selected menu item, TRANSFER if the user entered zero, HANGUP if the call was dropped, NOTHING if the user allowed the dialog to time out three times, or REPLAY if the user pressed the star key to request that the content be played again.

"LiveDocument" is another module used by the outcall IVR. LiveDocument is a class that provides support for loading audio content into memory so that it may be accessed randomly to support fast forward, fast backward, and GOTO functionality. LiveDocument contains the code that creates a local disk file for caching purposes, if the content is specified as literal text or a URL. LiveDocument also provides support for resizing the audio buffer so that live input can be appended to pre-existing recorded content.

"Dialogic™" is another module used by the outcall IVR. Dialogic™ is a class that encapsulates one Dialogic™ channel. It provides facilities for opening or closing a channel, setting the termination conditions for I/O operations, and carrying out I/O operations such as playing a file or buffer, recording, getting DTMF digits, etc.

"ACR" is another module used by the outcall IVR. ACR is a class that is derived from the Dialogic™ class. It provides higher-level methods, similar to the controls on an audio cassette recorder: play, record, goto, fast forward, fast backward. The ACR class uses the LiveDocument class to keep audio data in memory and support random access to content.

"WebReader" is another module used by the outcall IVR. WebReader is a class that is based on Microsof™ sample web client code. It is used to send an HTTP "GET" request. This is done when content is provided as a URL beginning with "http:", and at the end of each call, to send the final status or menu selection to the outcall agent.

At configuration the outcall IVR learns what type of Dialogic™ board is installed, so the outcall IVR does not need to automatically detect it. An additional thread may be needed in some embodiments to detect unexpected call drops, because the audio I/O functions will not be interrupted if the call is placed on a digital line. The "dx" family of I/O APIs can be interrupted by a loop current drop on an analog line, but there is no corresponding termination condition for a digital line. One solution, in the case of robbed-bit T1 signaling, is to use a separate thread that detects events involving the A and B signaling bits, issues a dx_stopch call to stop the I/O operation in progress, and makes the channel available for another call.

An authentication component ensures that the person who answers the phone is indeed the desired audience for the audio message. Authentication is optional, as not every application will require the end user to be known. The authentication module asks the user for a code of some sort (e.g., an account number or social security code) and then compares it against the value known for the desired person. If no authentication is required, this component asks the called party to enter a single digit in order to determine that the answering party is a person and not an answering machine or voice mailbox. The authentication component then returns true or false.

The following use cases illustrate the outcall service. The outcall service initiates a call to an end user when instructed to do so by a customer application. The customer application, at a scheduled interval, requests the outcall service to make an outbound call to the end user and play a specified message. For instance, this message may be a daily analyst report or the traffic and weather report. The outcall service can be used to escalate message service. Because browser alerts, email alerts, and SMS alerts may not reach a roaming user, a customer may wish to contact an end user with the outcall service if attempts at sending other types of alerts have failed.

Not all targeted end users may have a WAP-enabled telephone, but an outcall service message can be sent to any type of telephone. The outcall service may also be used for security/authentication. The outcall service provides a more reliable way to confirm the correctness of a telephone number than CallerID. An application can ask the user for his telephone number, give him a security code to enter during the outcall service, and make a call to the number given by the user. The user then enters the security code given to him during the data session for authentication.

The capability of the outcall service to ask the end user for input in the form of a menu choice or multidigit input can enhance any of these use cases. An application can use an escalated call to get the input it would have with a browser alert, or it could get daily feedback from an end user with a scheduled call.

Because the outcall service initiates a call to an end user, the outcall service must ensure that when the telephone is answered, there is a person on the other end, and not an answering machine or voice mail. The outcall service will ask for a DTMF input when the telephone is answered to ensure that there is a person on the other end. The DTMF asked for will depend on the parameters sent in the XML file from the customer application. If an authentication code is specified, the code input will serve as proof that there is a person on the line. If no authentication code is specified, the person answering will hear a prompt asking them to press a key in order to continue.

Another feature of the outcall service is the ability to call back should a call be dropped. The outcall service determines when to call a user back after a call is dropped based on an "Ensure Completion" parameter, and whether the call was dropped prior to confirmation of the end user.

Figure 14:
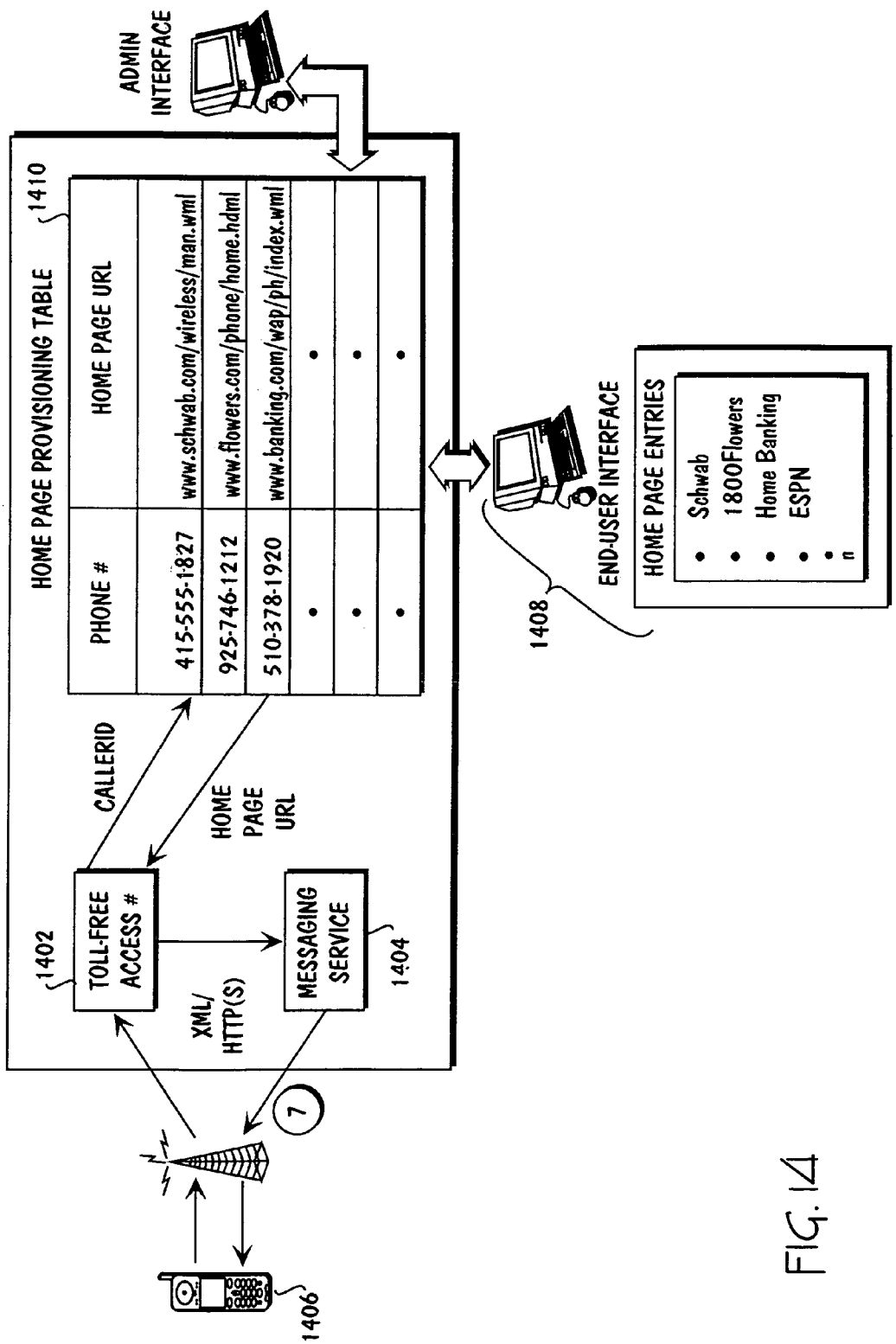
FIG. 14 is a block diagram of an embodiment of a home provisioning service.

FIG. 14 is a block diagram of a homepage provisioning method as performed by an embodiment of a voice channel homepage provisioning service. Voice channel-based homepage provisioning is another example of initiation of a wireless data session by a voice call. Traditionally, for example in the WAP/HDTP world, the "homepage" is controlled by the carrier or has to be manually entered by the user on the wireless device. In order to go to a URL for an enterprise site that is not on the carrier's homepage, the user must know the "goto" URL and enter it manually. To avoid this, a large enterprise, such as a major Internet service provider, might have to pay a fee to be on the carrier's homepage. In this case, the user must still enter the URL on the wireless device configuration. In either case, a new URL change results in another manual URL entry process.

Voice channel homepage provisioning as shown in FIG. 14 is a voice channel-based platform that solves the problems described, and yet avoids dealing with service provider relationships. The voice channel-based platform provides an alternative over-the-air method that is not carrier controlled and allows any homepage URL of the user's choice to be shown on the wireless device. Instead of making a data call to get a homepage, or any other page, the voice channel-based platform allows the wireless device user to make a voice call that triggers an over-the-air alert embedding the homepage URL of the caller to the wireless device. Furthermore, voice short cuts can be used for voice browsing content. The voice short cuts can be extended to allow the URLs associated with the voice short cuts to trigger an over-the-air alert embedding the homepage URL of the caller to the wireless device.

According to one embodiment, a voice call number is provided to the WAP/HDTP user. This number is called using the WAP/HDTP wireless device 1406. The homepage provisioning service 1402 receives the call, extracts the caller ID (e.g., telephone number), and terminates the call. The homepage provisioning service uses the caller ID of the wireless device 1406 to find a corresponding homepage URL. In one embodiment, the homepage provisioning table 1410 is queried for the corresponding URL. The homepage URL is sent to the homepage provisioning service 1402, and forwarded to the messaging service 1404. The messaging service sends an actionable alert with an embedded URL for that user's homepage to the user's wireless device 1406. By responding to the alert, the user immediately enters a data session directly with their homepage. The user can bookmark the homepage for later use. The end-user interface 1408 is used to manage the display of homepage entries.

The voice channel homepage provisioning service, in one embodiment, is voice-activated using speech recognition and voice short cuts, such as, "send homepage to my WAP wireless device", or "send 800-flower homepage to my WAP wireless device", etc. The homepage provisioning service can also be an 800 number based service. In this case, the service immediately terminates the call upon receiving the caller ID in order to avoid incurring the call cost. Once the caller ID is received, the service can immediately register a push actionable alert embedded with the URL to, for example, the CTI/IVR service 500 of FIG. 5 to be delivered by the messaging service 1404 via an alert. For efficiency, the actionable alert can talk directly to the messaging service for delivery.

One advantage of the voice activated approach is that it can additionally allow users to use voice short cuts to go to URLs that are not necessarily homepage URLs. The 800 number on the other hand, avoids telephone costs to the service provider. As an alternative to using voice short-cuts, URLs can be bookmarks on the homepage URL menu.

Figure 15:
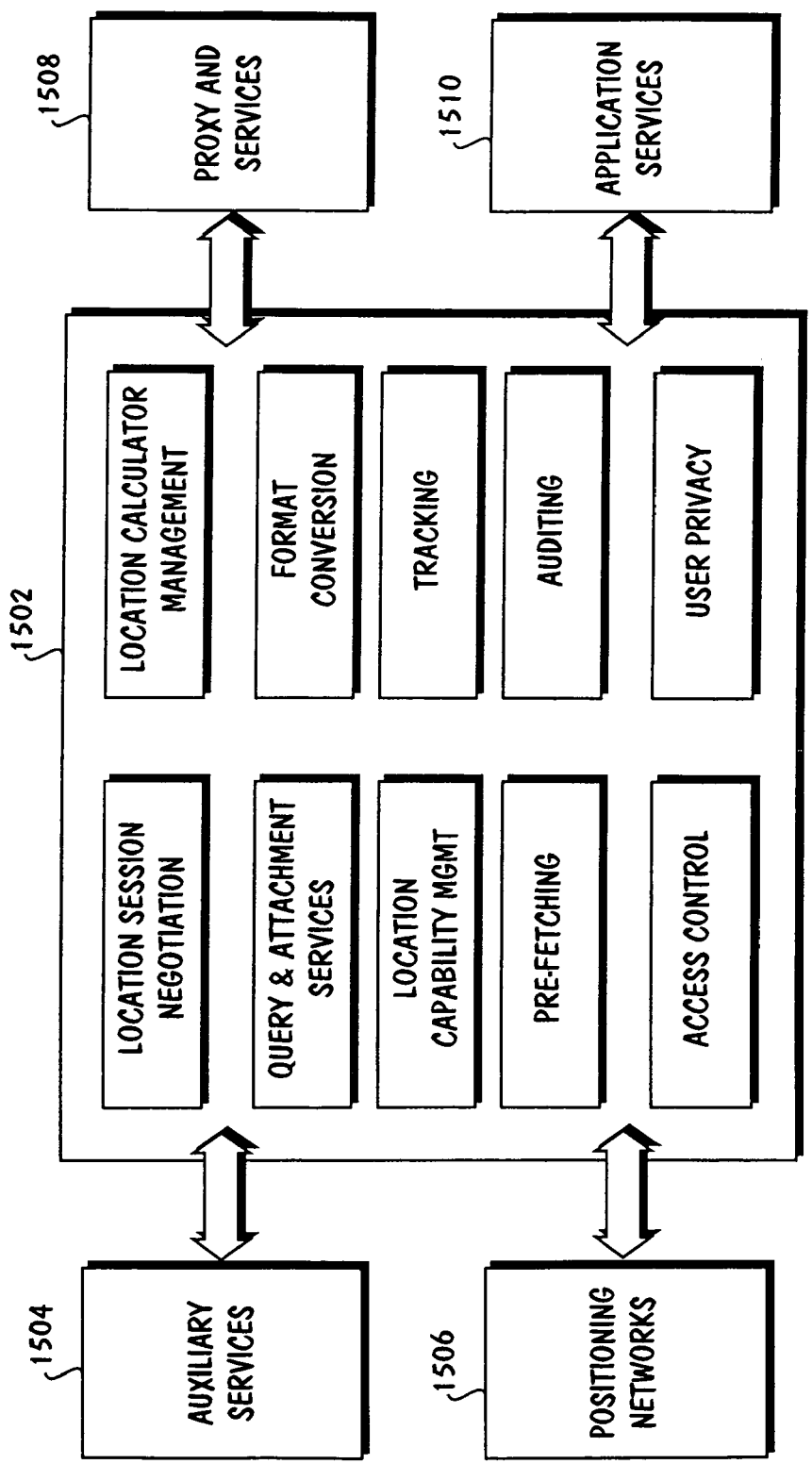
FIG. 15 is a block diagram of an embodiment of a location service.
Figure 16:
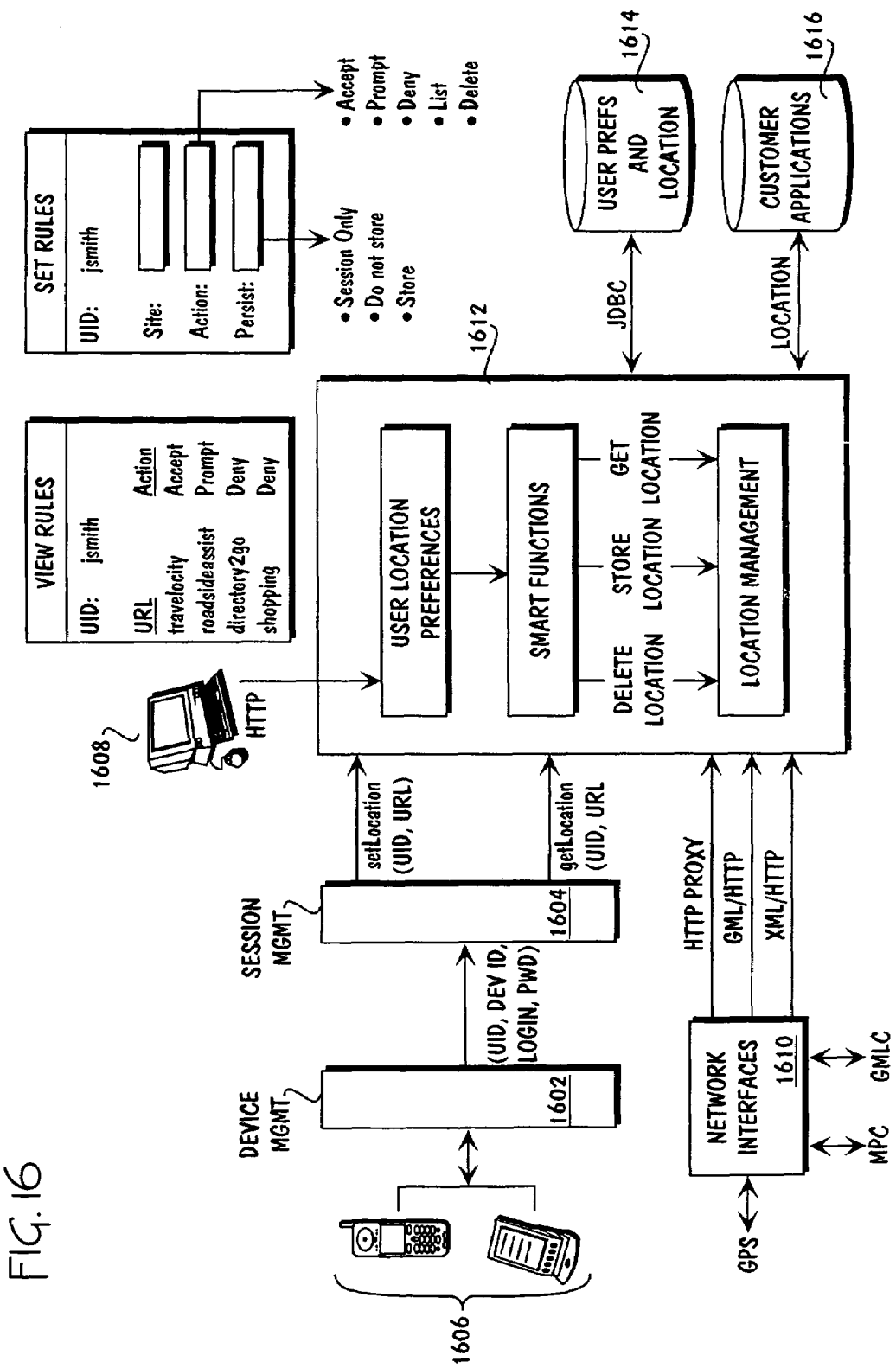
FIG. 16 is a block diagram illustrating the interaction of the location service with other services/entities.

Another process provided in the method and system is a wireless location service as illustrated in FIG. 15 and FIG. 16. As used herein, wireless location indicates technologies that enable the positioning of wireless communications devices. Device location determination can be done by the wireless device, networks, or a combination of the two. Progress in wireless location technology and its commercialization have been guided by the FCC mandate to support E911.

The positioning of a mobile device provides the basis for so-called location services. Location services provide information based on the location of certain mobile devices. Examples include enhanced directory assistance, roadside emergency service, fleet management, asset tracking, and others. In one embodiment, the wireless location service is a proxy that provides a single point of interface to one or more applications and one or more location networks for location management using an open protocol. The location service processes position measurements to assure that they are in the required format, and obtains the required authorization for locating a mobile device. The location service manages mediation among network entities, preferences, authorization, and related functions. Mediation is provided among nodes that are logical peers but do not support the same interfaces. The location service includes a gateway that may be physically installed and operated by different entities. For example, the location service may be co-located with the application server, WAP gateway, location gateway, or hosted independently.

The location service combines location management with other services, such as session management, alerts, device management, and caching to provide a comprehensive solution for location sensitive applications. The interface to the architecture (for example, architecture 104 of FIGS. 1 and 2) that includes the location service enables attachment and prefetch services in which the mobile device location is obtained and processed prior to or in lieu of a direct request from the application. The interface to the architecture can be, for example, through a proxy server. The interface to the messaging service (to be described in more detail below) enables customized alert and escalation procedures related to the device location.

FIG. 15 is a block diagram of an embodiment of the location service 1502 showing its interaction with other services/entities. The location service 1502 includes various services, such as location session management, query and attachment services, location capability management, pre-fetching, access control, location calculator management, format conversion, geographic information system (GIS) services, tracking, auditing, and user privacy. The location service is in communication with auxiliary servers 1504, positioning networks 1506, and application servers 1510. The location service also communicates with a proxy server and services 1508 that are part of the wireless network communication architecture. Communication between the location service 1502 and other services/entities provides data to the services/entities so that enhanced functionality results. For example, the location service 1502 supports roaming, handoff, and the application of multiple position techniques for a user in a given location (e.g., GPS, TDOA/AOA). Additional functions of the location service include: managing positioning for tracking and delayed location requests; forwarding a request to positioning equipment in response to a request from an application; storing internal records with user permissions and passwords, and prompting the user for permission if no record exists; and improving position measurement acquisition time by giving location equipment a head start for a given user (prior to receipt of a location request). The GIS services provide application format conversion, proximity and routing services.

FIG. 16 is a block diagram illustrating interaction of the location service with other services/entities in one embodiment. The wireless devices 1606 communicate with device management service 1602 and session management service 1604. The session management service 1604 communicates with the location service 1612 to request location information to be used during a wireless session. The location service 1612 includes user location preferences, which are set by the user, for example through the user's personal computer 1608. Various "smart functions" and location management processes get, store, and delete location data. The location service 1612 communicates with various network interfaces 1610 using various protocols to receive, process, and manage location data. The location of the wireless device 1606 is available to the user preferences and location database 1614. The location of the wireless device 1606 is also available to the customer applications 1616 to facilitate providing location-specific services to the user according to the application accessed.

The interaction of location services 1612 with the services and entities shown allows various functions to be provided transparently. For example, the following functions are performed: auditing, including measuring use (in peg counts) in categories based upon subscriber, application, network, etc., for purposes such as billing, feature customization, usage tracking, etc; managing position data formats; and storing the last known location (for example, for retrieval after temporary loss of GPS coverage, which avoids GPS warm-up delay).

Figure 17:
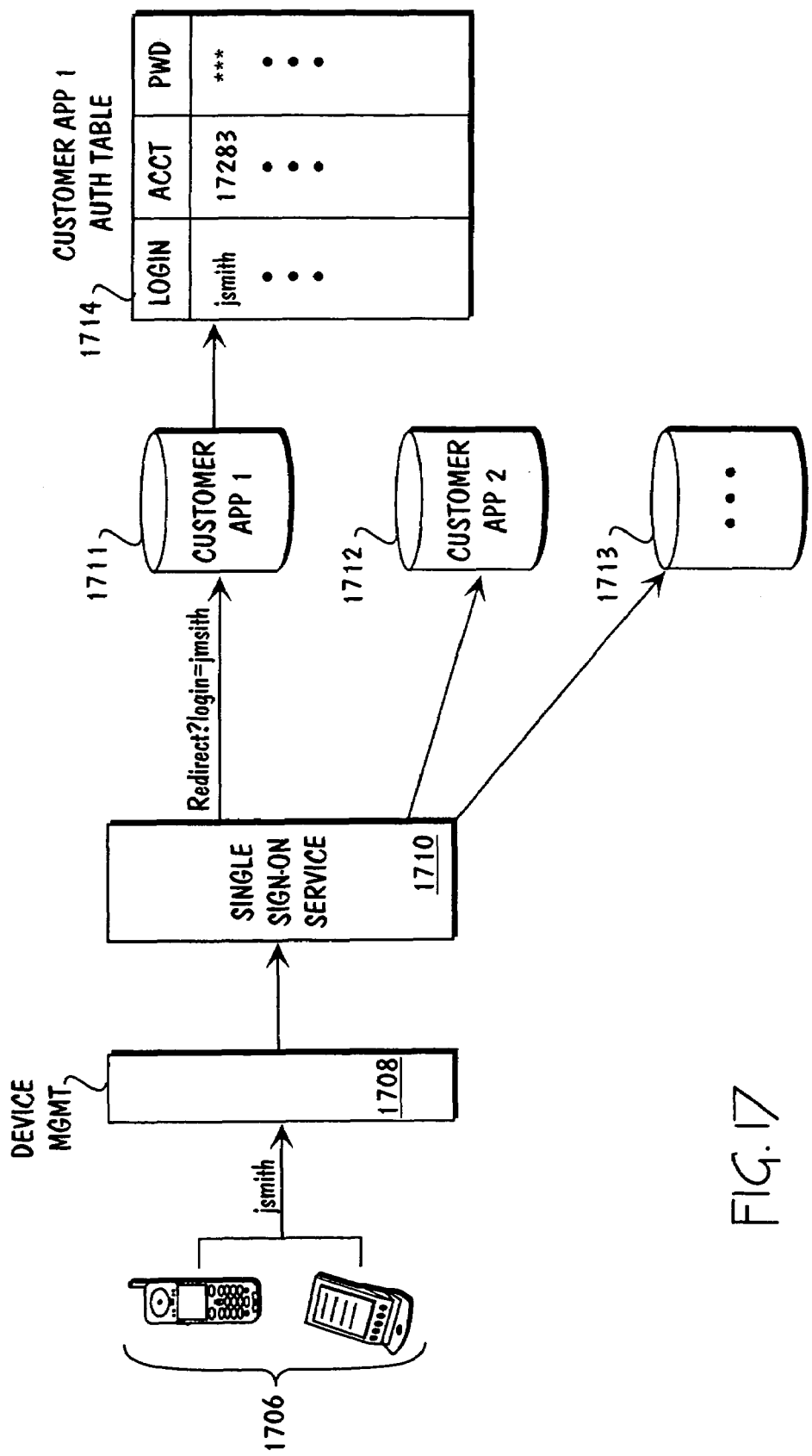
FIG. 17 is a block diagram of an embodiment of a single sign-on service.
Figure 18:
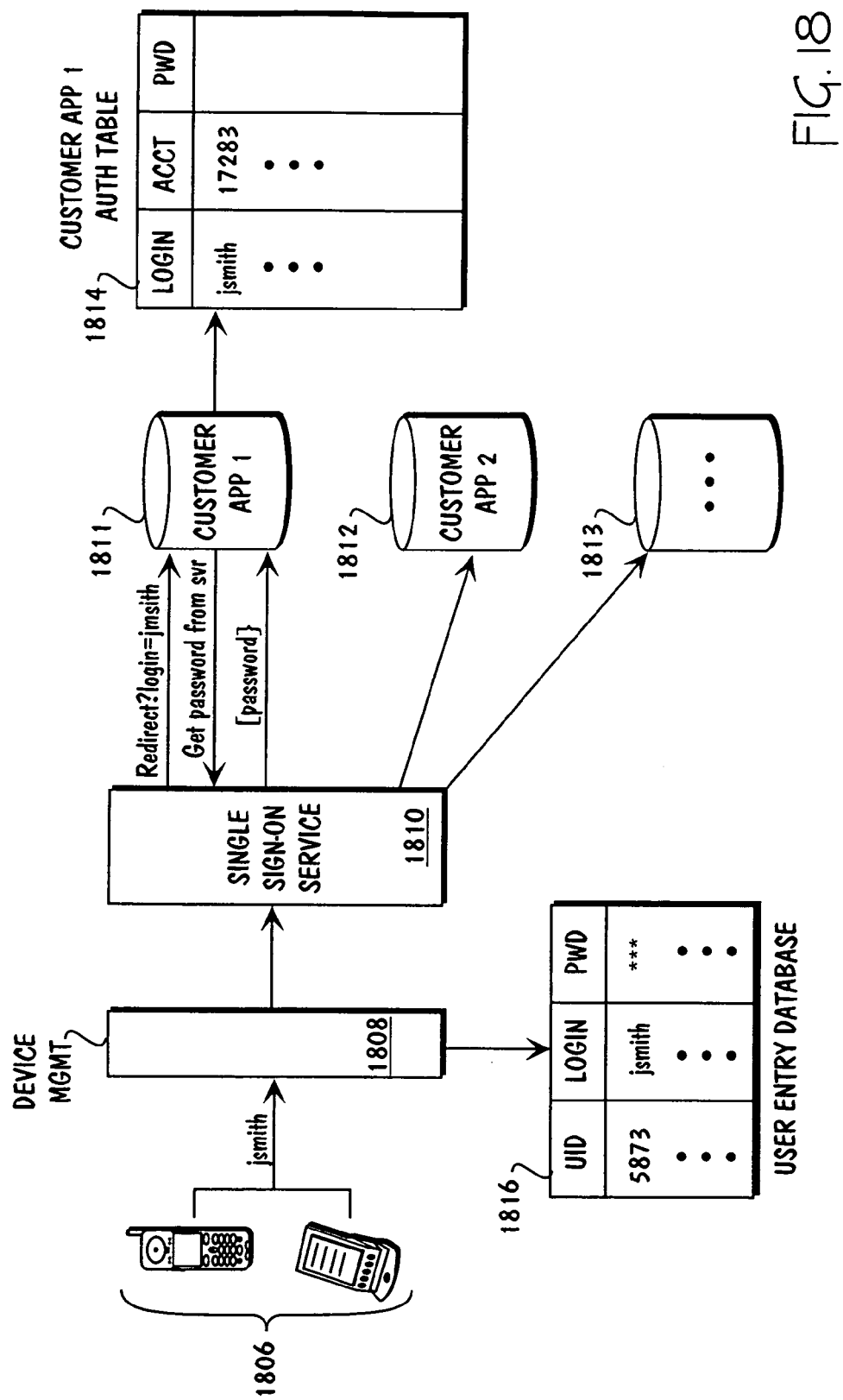
FIG. 18 is a block diagram of an embodiment of a single sign-on service.
Figure 19:
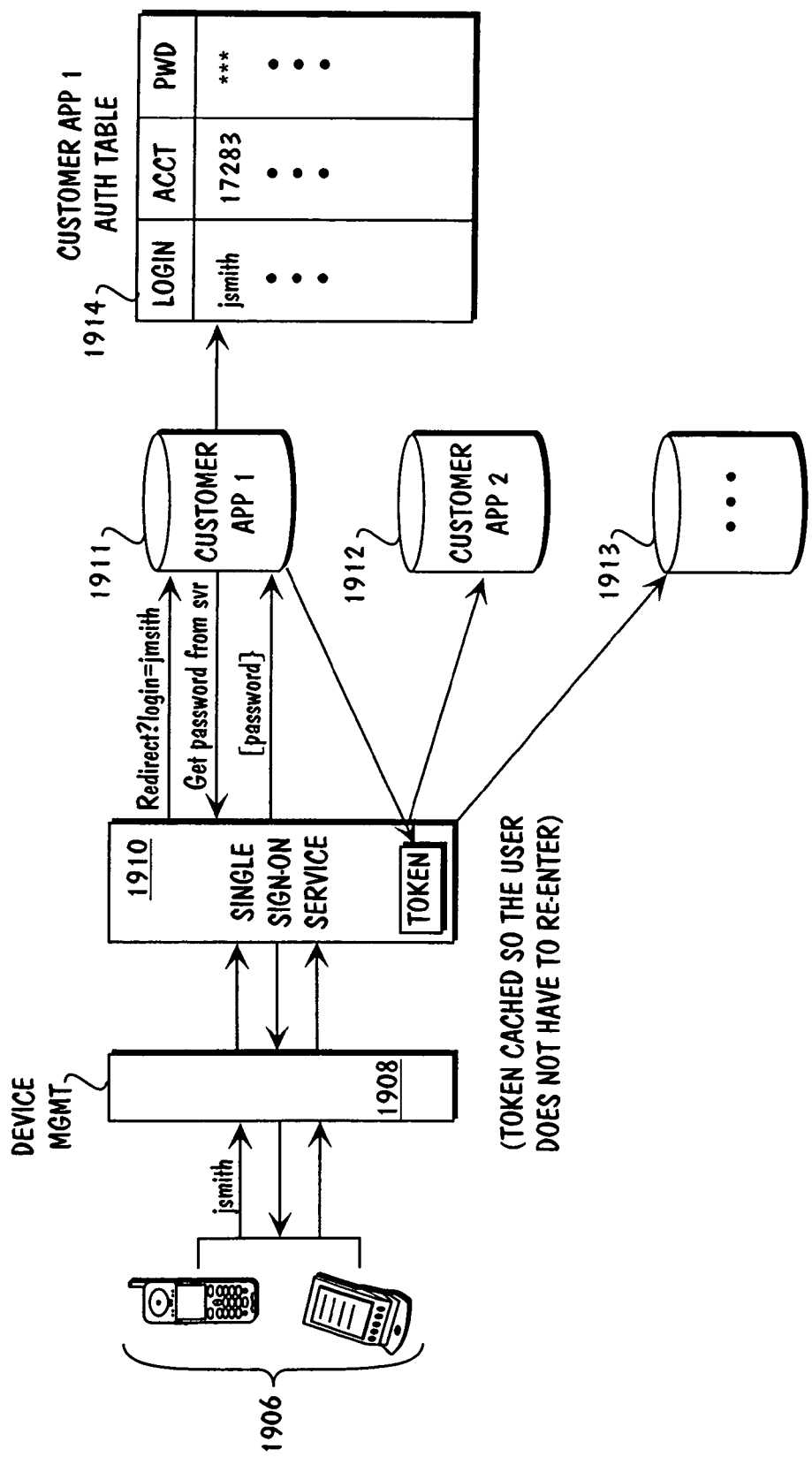
FIG. 19 is a block diagram of an embodiment of a single sign-on service.

The architecture (as shown, for example, in FIG. 2) includes a central gateway through which wireless device users access multiple applications. These accessible applications could be hosted locally (in the same physical location or same administration domain as the architecture), in the same intranet behind the firewall, or anywhere on the Internet. Each of these accessible applications may have very different authentication and authorization requirements. In prior system, users are required to sign on to each of these applications whenever they access them. The single sign-on service, which is part of the enhanced services layer 204 (FIG. 2), reduces the user inconvenience associated with signing on to various applications. Various embodiments of the single sign-on service are shown in FIGS. 17, 18 and 19. One embodiment, shown in the block diagram of FIG. 17, is a single sign-on service with low-level security. Each user of a wireless device 1706 initiates a wireless session by signing on using a previously assigned single sign-on (SSO) identification (ID). This session is valid and effective until a predefined expiration time is reached, or the user explicitly signs off. While the SSO session remains effective, all application sign-on requests by the user are intercepted and handled by the single sign-on service on the user's behalf. If a SSO session has never been established or has expired, the user is prompted for a SSO sign-on ID. Signing on establishes a wireless SSO session with the gateway through the device management service 1708. The single sign-on service 1710 performs an appropriate sign-on process to each application of customer applications 1711-1713 on behalf of the user. The customer application refers to a previously compiled authorization table 1714. The single sign-on service will perform the sign-on process whenever the user accesses a customer application, until the SSO session is no longer valid. The SSO session is applicable to application sign-on requests only. It is independent of the sessions between the user and the applications themselves after a successful sign-on to those applications. If an SSO session expires before an application session expires, the user can continue interacting with that application. On the other hand, if the application session expires before the SSO session does, then the user must sign on to the application again, and the single sign-on service will intercept that request and handle it as usual.

The single sign-on service greatly reduces the involvement of the user in signing on to individual customer applications. The single sign-on service 1710 does not impose a single authentication scheme on all participating applications. It accommodates diverse application security requirements concurrently within a single deployment environment.

In one embodiment, a relatively passive approach to managing access to customer applications is used. In this approach, the single sign-on service maintains very limited knowledge of the applications accessible to its users. For example, the single sign-on service maintains the identification of applications, and how to reach their sign-on page. The single sign-on service does not need to know the specific authentication requirement of the application. The single sign-on service forwards the sign-on request to the application, and it is then up to the application to proceed appropriately.

Another embodiment includes a relatively more active approach, assuming more responsibility in registering, administering and managing applications it allows its users to access. In addition to the identification of the applications and the address of their sign-on pages, the single sign-on service is also aware of the authentication requirements of each. The single sign-on service optimizes the communication flow between itself and the applications, and also participates in enforcing authentication requirements.

The low-level single sign-on service of FIG. 17 is suitable for applications that do not deal with user specific or sensitive information. For example, these applications may wish to know how users access them, but are not concerned with the authenticity of each user. A valid SSO ID received from the single sign-on service is sufficient to grant access to the application.

FIG. 18 is a block diagram including a mid-level security single sign-on service 1810. Applications using the single sign-on service 1810 are concerned with user authentication. In the mid-level scheme, the mid-level security single sign-on service participates in a server to server password request. A user of a wireless device 1806 initiates a wireless session by communicating with the device management service 1808. The device management service 1808 validates the identity of the user by consulting the user entry database 1816. Upon receiving a valid SSO ID from the single sign-on service 1810 on behalf of the user, the application (one of customer applications 1811-1813) will request the SSO password of that user from the single sign-on service 1810. The application then performs the password validation locally according to its own scheme without involving the single sign-on service 1810, for example by consulting authorization table 1814. The application's own password validation process is independent from the single sign-on service 1810.

FIG. 19 is a block diagram including a high-level security single sign-on service 1908. In the high level security scheme, the user accesses the customer applications 1911-1913 through the device management service 1908 as before. Upon receiving a valid SSO ID from the single sign-on service 1910 on behalf of the user, the customer application may directly request additional "credential" (e.g., a native application password) from the user's wireless device 1906, and perform local validation according to its own scheme without involving the single sign-on service 1910. Alternatively, the customer application could request that a security token be cached after a successful sign-on. The single sign-on service 1910 forwards this security token to the originating customer applications in subsequent user sign on requests. The content of the token is not exposed to the single sign-on service 1910. The application has the option to decide whether or not the security token is valid at any subsequent sign-on attempt.

The single sign-on services 1710, 1810, and 1910 provide requested services to the customer application during the process of application sign-on. The customer application may request the SSO password of a user (in the case of the mid-level security model), or store a security token for a user (in the case of the high-level security model). The single sign-on services include servlets with a predefined request and response data stream format. Each customer application requiring any of these services is assigned an application ID. Single sign-on services implement an authorization scheme based on the application ID, and validate each service request using this authorization scheme.

Figure 20:
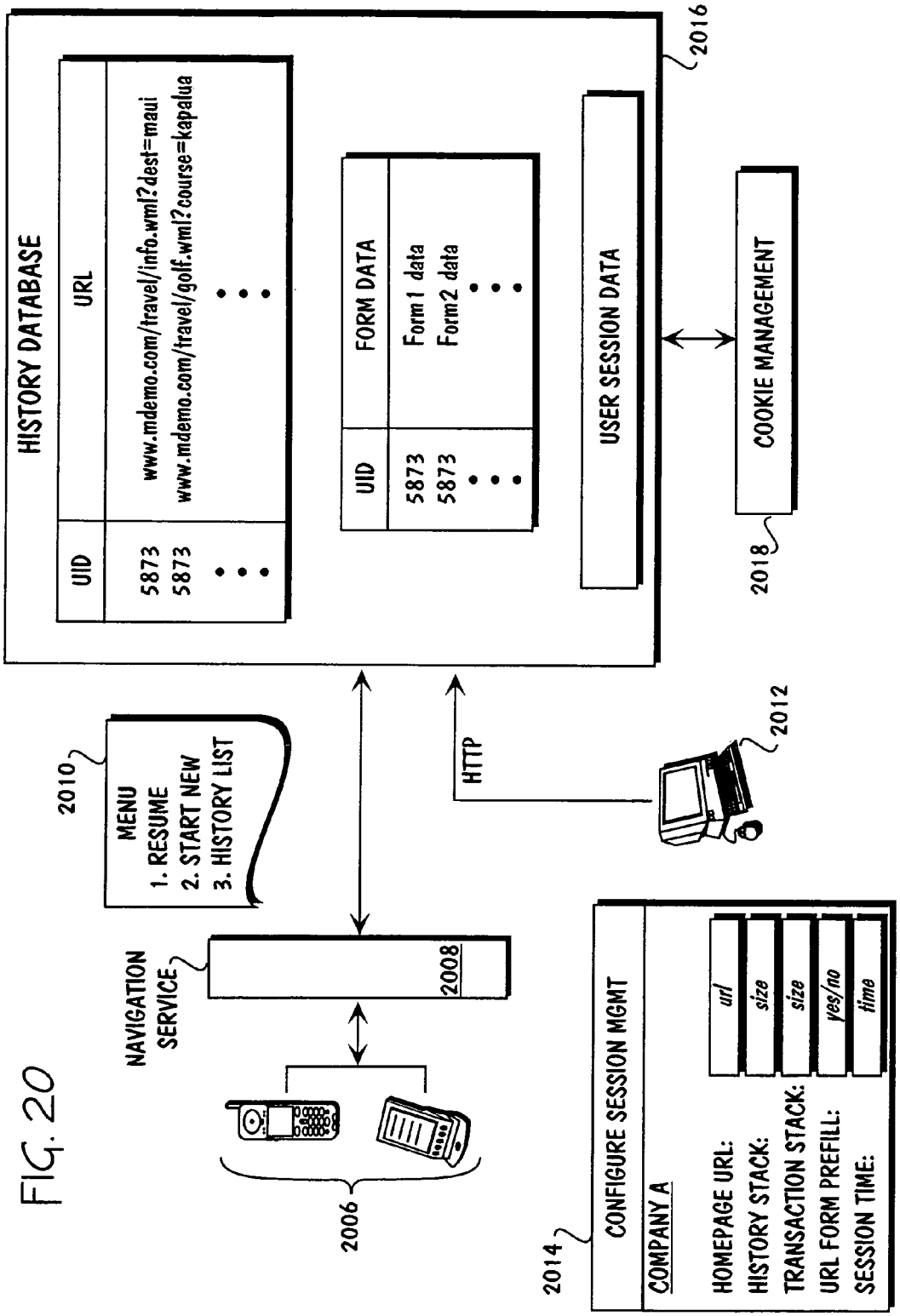
FIG. 20 is a block diagram of an embodiment of a session management service.

FIG. 20 further illustrates the session management service shown in the enhanced services layer of FIG. 2. The session management service is an application level service. In one embodiment, the session management service uses a session mechanism to manage the application-level click stream, form data, and response in an application-independent manner. The session management service captures the history, form data, response and cookies associated with a wireless session. The history level is configurable to capture the last n requests and responses. The default is 1. The session management service is also configurable to support "session resume" services for each domain and the home site URL of that domain. For example, the session management service allows the user to resume a session at the same location at a site when a dropped connection is reestablished when the user visits the home site URL of that domain again. In addition, the user is enabled to maintain a state of a site, leave the site to go to another, and return back to the original location at the original site. The user can also resume a session using a different device from the original device used to access a site.

Session management records both the requesting URL and the post data associated with it and its response for a domain. If the response is recorded at a domain for the last request, then when the user resumes a session at the domain, the URL does not get posted or requested again to avoid duplicated and side effect transactions. However if the response is not recorded, e.g. due to a network failure on the application side, session resume will cause a re-post or re-get request.

As shown in FIG. 20, a user of a wireless device 2006 accesses an Internet site via navigation service 2008. The history database captures recent URLs, form data, and user session data from the user's ID. The history database information can come from various sources, including the cookie management service 2018, and the personal computer (PC) 2012. An enterprise (for example, "company A") using the architecture of FIG. 2 can configure its session management service preferences using the "Configure Session Management" menu 2014. The user uses the menu 2010 to resume a session, start a new session, or choose a starting point from the user's own history list. The session management is maintained in a hierarchical tree manner. The user can move from one site, for example a portal site, to a second site. When a connection is dropped, the session can be resumed at the second site when the user visits the portal site again. This also allows a user to maintain sessions at different sites. For example, after visiting the second site from the portal domain, the user can go back to the portal, and then to a third domain domain. The user can later go back to the previous location at the second site, back to the previous location in the third domain.

Another feature of the session management service is the network-side autofill of a form. This saves the user the trouble of typing in form field data again when the user returns to a form previously filled. The data used for autofill is form data previously entered by the user, and can be data in the user's electronic wallet. Each field of a form is intelligently recognized and classified to allow future autofill of the field of the same classification. For example, an email address that is recognized for an email field on a form can be used to fill in email fields of any forms. To ensure security and privacy, the autofill is based upon user preferences and application domain settings so that certain form data will not be autofilled. The autofill is particularly helpful when used across multiple devices. For example, a user can fill in a form using a device with relatively "better" keyboard interface, such as a PC, and then the form can be autofilled when accessed by a wireless device with a relatively "worse" keyboard interface.

The network-side autofill is either session-based or persistency-based. In the session-based case, the form is only autofilled within a given session time. In the case of persistency-based, the form data persists across multiple sessions.

In one embodiment, the session management service publishes data from the wireless data session of a user to a messaging platform. This platform provides data about the user on the wireless channel. The messaging platform can be subscribed to by, for example, customer relationship management (CRM) systems for integrating data and transactions associated with a user from multiple channels such as CTI/ IVR, web, and email. The session management service is the wireless channel in this case.

Figure 21:
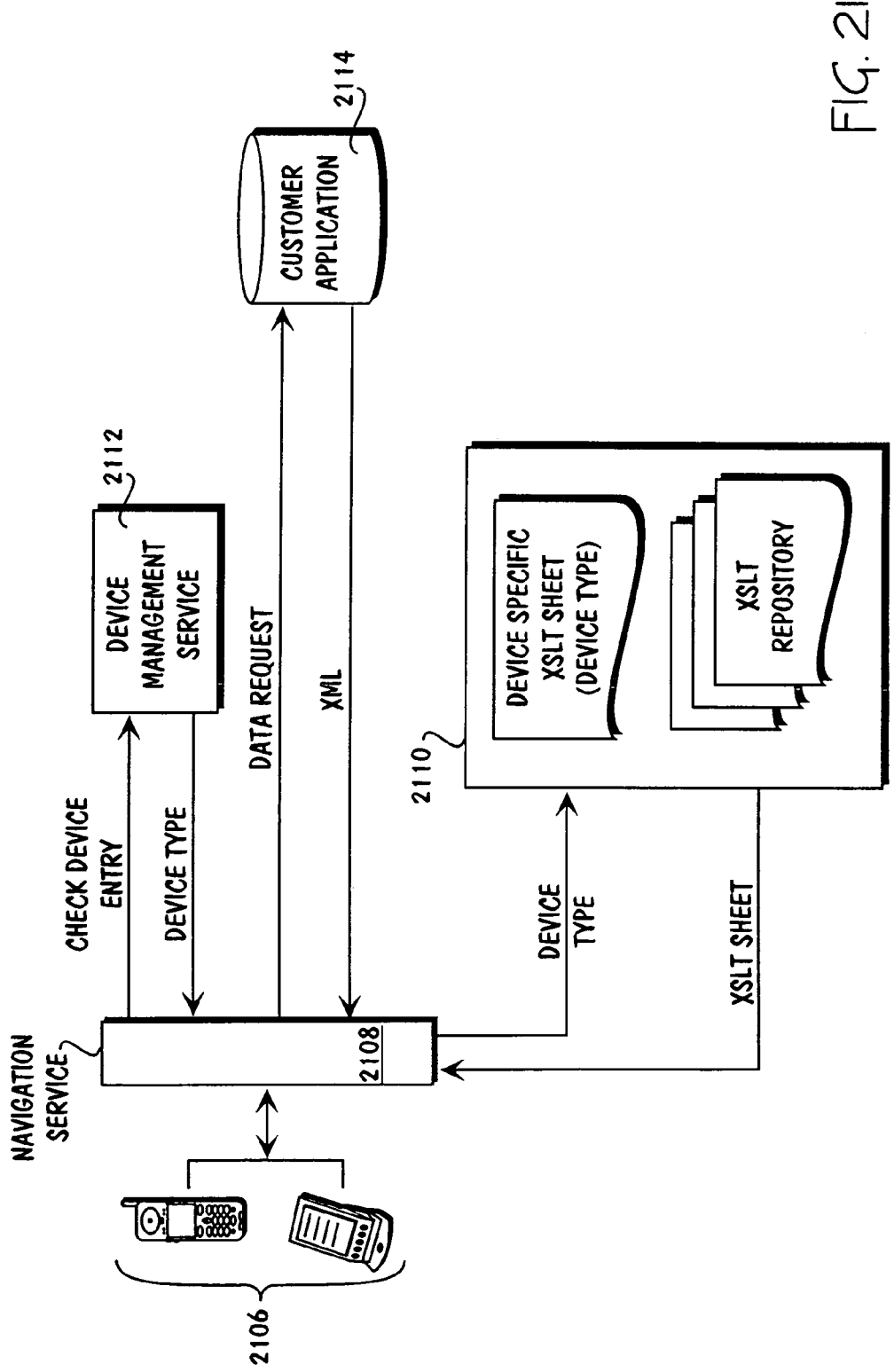
FIG. 21 is a block diagram of an embodiment of navigation and presentation services.

FIG. 21 is a block diagram showing navigation and presentation services of the architecture of FIG. 2. The navigation and presentation services 2108 and 2110 provide a user-friendly, device-independent wirelessly-enabled front-end to customer legacy systems. Through the device management service 2112, users are presented with wireless markup language (WML) specific to the wireless device 2106 they are using. In one embodiment, the navigation and presentation services 2108 and 2110 are used to integrate the entire suite of services in the architecture of FIG. 2 (e.g. session management, cookie management, etc.). The navigation service 2108 communicates with the device management service 2112 to verify device type. The navigation service 2108 requests data from the appropriate customer application 2114 dependent upon the user's inputs to the wireless device. The customer application 2114 returns data in extensible markup language (XML) to the navigation service 2108. Dependent upon the device type, the presentation service 2110 applies the correct device-specific extensible style-sheet language template (XSLT) to the XML document. Presentation formatted for the specific wireless device 2106 is sent to the device 2106 via the navigation service 2108. The navigation and presentation services provide a personalized, device-independent, wireless front-end that can be easily customized to integrate with legacy systems. Through the integration of the navigation and presentation services with the suite of enhanced services, a flexible and powerful mechanism to design and maintain application functionality is provided. The requirement for hand coding data is greatly reduced. For example hand coding is reduced for presentation, for directing how data will be used, and for navigating through options.

The navigation and presentation services provide platform-independence, data-source-independence, a high degree of personalization, and a distributed implementation that can be hosted anywhere. In one embodiment, the navigation and presentation services act as a WAP front-end to customer legacy systems. They can also be used as a stand-alone application, as well as integrated with the entire suite of enhanced services (as shown in FIG. 2).

Figure 22:
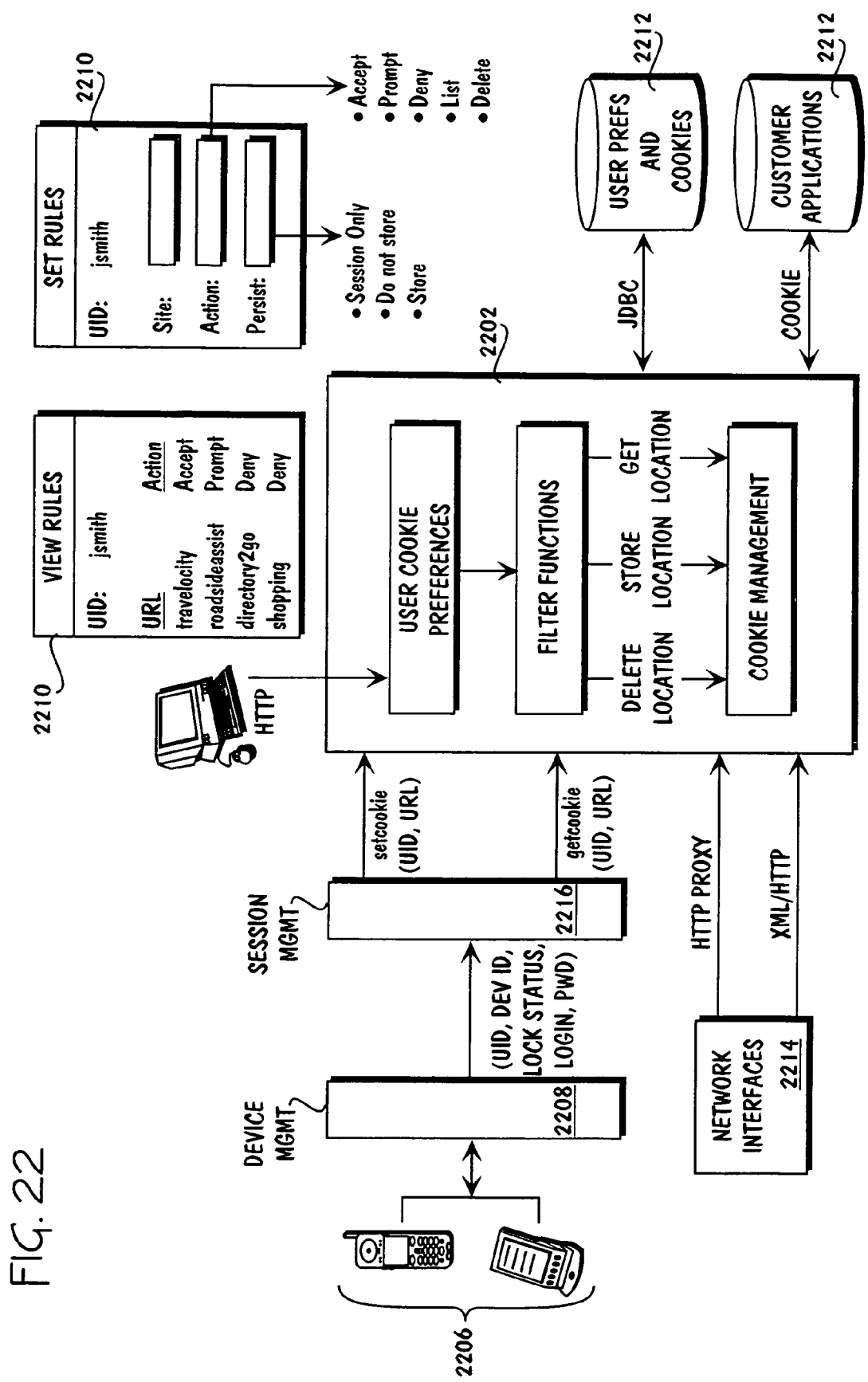
FIG. 22 is a block diagram of an embodiment of a cookie management service.

FIG. 22 is a block diagram showing one embodiment of the cookie management service 2202. Cookies are useful to save logon information, session information, personal information, etc. These types of information are essential for wireless devices. The cookie management service 2202 is a network-based cookie management system, unlike typical desktop-based or client-based cookie management systems. The cookie management service 2202 allows cookies to be accessible and managed (e.g., cookies can be locked) anywhere on the Internet, and supports multiple users. The cookie management service includes web interface 2210 for personalization and management. The user communicates with the device management service 2208, which in turn communicates with the session management service 2216 and the cookie management service 2202. The session management service 2216 sends "getcookie" and "setcookie" commands and data to the cookie management service 2202. The cookie management service 2202 includes a user preference database that stores preferences modified using the desktop interface 2210. The cookie management service further includes filter functions and a cookie management database. The customer applications 2212 receive information from the cookie management service 2202.

The cookie management service supports multiple interfaces to the wireless gateways (e.g. HTTP proxy, XML, etc). The cookie management service supports multiple domains and can be run as a service hub or as a data center. The cookie management service need not be physically located with the wireless gateways. With the cookie management service, multiple devices have access to the same cookies. This is particularly useful when a user wants to fill out a form with a more user-friendly keyboard, and then use the cookies generated from the desktop interface via the wireless device.

In one embodiment, the cookie management service is deployed as a proxy-based value added service with features such as cookie session management, navigation, profiling, preferences etc. The cookie management service is positioned on the back-end of the WAP gateway in carrier, or alternatively on the back-end of the enterprise, or customer system. Alternatively, the cookie management service is positioned on the front-end of the enterprise applications. In either case, the cookie management service can be a plug and play "middleware" hardware and software application.

The cookie management service 2202 provides enhanced security, in part because the cookie management service intercepts cookies which will be sent to the client destination side rather than caching cookies. The cookie management service allows the user to have only session cookies, which provides additional security, privacy control and convenience to the user. The user can operate within a session as if the cookies are stored, but as soon as the session is timed out, cookies will not be in (or will be removed from) the database.

The cookie management service provides secure encryption between itself and the enterprise application. When the cookie management service is positioned on the front-end of the enterprise using the security and privacy management environment of the enterprise, there is no dependency on the carrier infrastructure or wireless device capability. The user can use any device to lock cookies. This is particularly useful if the user's accessing device is stolen. It is also possible for a user to delegate some cookies to other users without compromising undelegated cookies. For example, a user can lend a wireless device for others to check stock quotes, but not for reading email. This is achieved by locking email cookies.

In addition to cookies, the cookie management service also handles advertisements and promotions. Because the cookie management service supports an XML interface, it can offload some processing power of the gateways in a client server. Cookie processing is only passed on based upon needs of the gateways.

Figure 23:
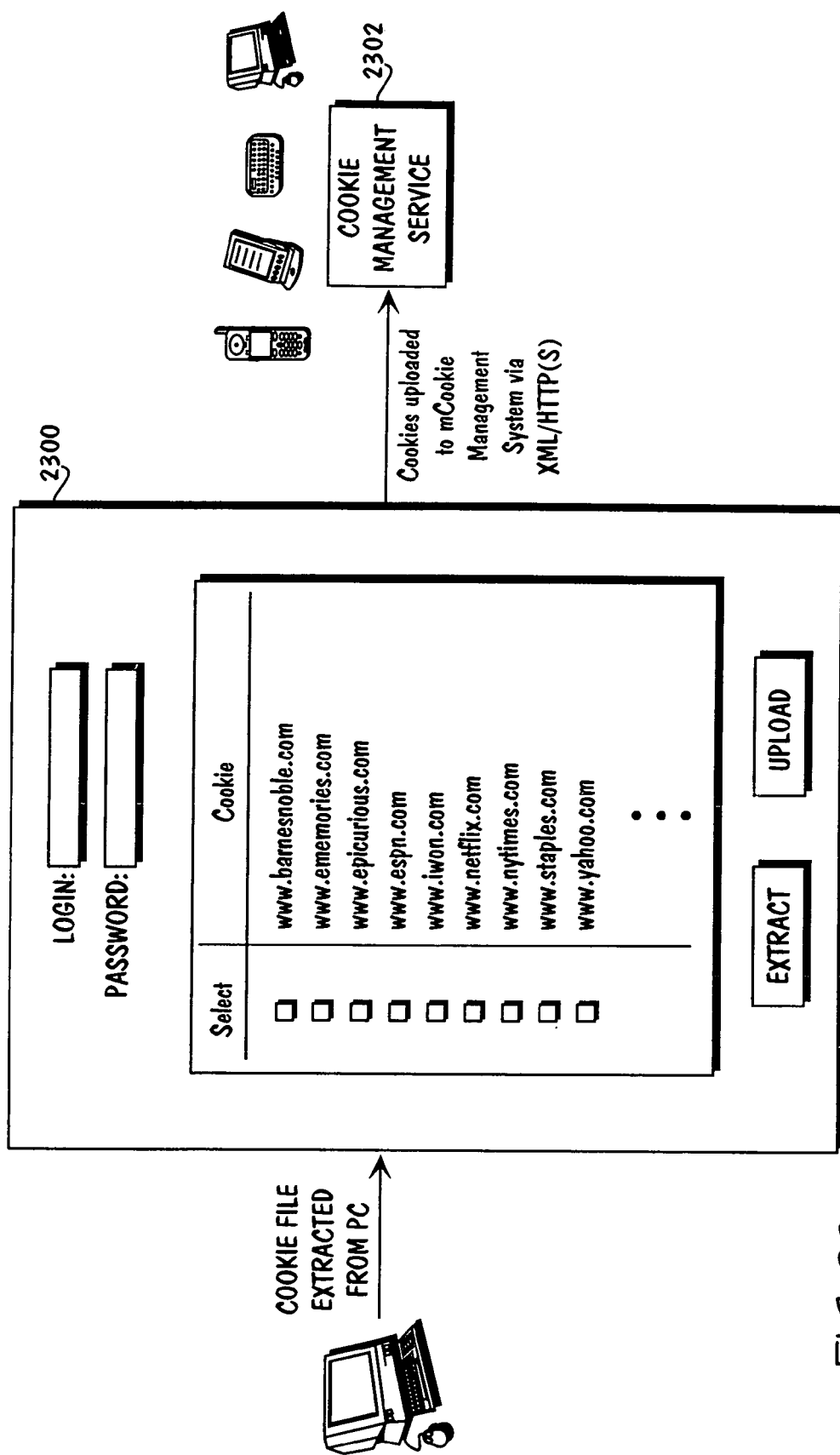
FIG. 23 is a block diagram of an embodiment of a cookie transporter.

FIG. 23 is a block diagram of an embodiment of a cookie management service 2302 and an associated tool, the cookie transporter 2300. The cookie transporter 2300 allows a user to copy some or all of their local cookies to the cookie management service 2302. The transported cookies are then managed through an interface, such as the interface 2210, and are available for wireless interactions. The cookies to be uploaded to the cookie management service 2302 are extracted into a list before being uploaded.

Figure 24:
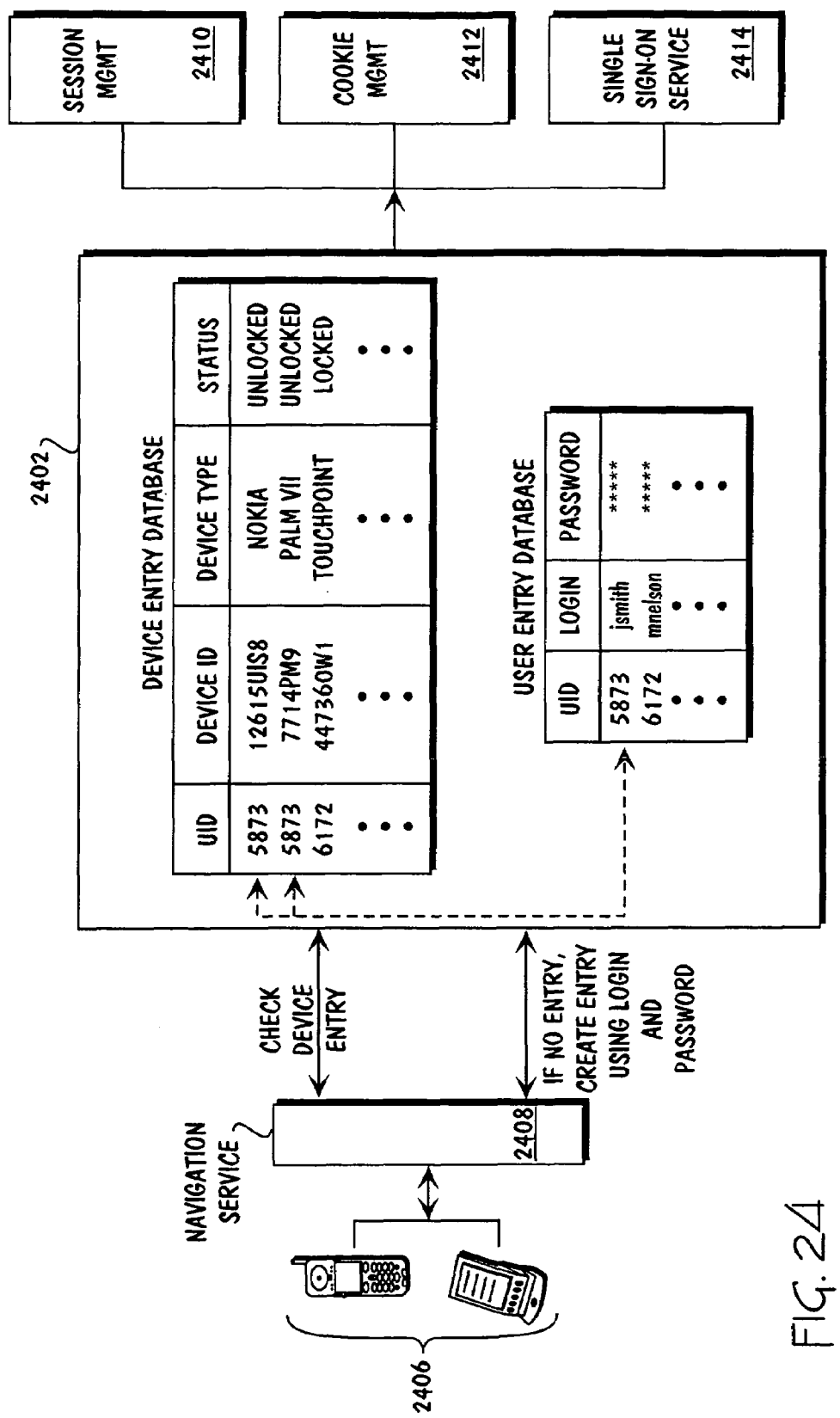
FIG. 24 is a block diagram of an embodiment of a device management service.

FIG. 24 is a block diagram showing one embodiment of the device management service 2402. The device management service 2402 allows voice verification of wireless devices, as well as automatic device registration. Each wireless device has a unique device ID. By using data and voice integration in the device registration process the unique device identifier of the device is easily related to the telephone number of the device. The unique device ID is automatically captured during the device registration data session and the telephone number of the device is related to the device ID in an automatically initiated voice session.

In one embodiment of device registration, the user initiates a data session to register a device. The user is prompted for a previously assigned user name and password, and the user is asked to enter their telephone number. After entering the telephone number, the user is immediately presented with a personal identification (PIN) number. The unique device ID is automatically captured during this data session. The device registration service then makes a voice call to the phone number (by using the outcall service described above). When the user answers the call, he is prompted to enter the PIN. The phone number is automatically related to the device's unique data identifier.

Voice verification is superior to prior methods such as short messaging, in part because the user does not have to key in any characters. Other advantages of voice verification include the reduced waiting time realized by eliminating switching between WAP sessions and voice sessions, and the fact that the user does not need to read, understand, or remember a written code.

The user communicates with the navigation service 2408, which communicates with the device management service 2402. The device management service 2402 includes a device entry database, and a user entry database. An entry in the device entry database is accessed for the calling device 2406, or if there is no entry one is created using a login and password. The device management service 2402 communicates with other services, such as the session management service 2410, the cookie management service 2412, and the single sign-on service 2414.

In one embodiment, when messages are sent to a telephone number belonging to a wireless device 2406, the web identifier to which the message should go is already known. When the user registers for a data session in the wireless device 2406, they enter their telephone number and a page is returned to that device just as in a normal data sessions action. This is in contrast to the traditional method of sending an alert message, including a code, to the calling device. There is a telephone number in the return pages part of the link. The user clicks that link to make a telephone call into the system. When the telephone call is made, the caller identification (ID) is captured and mapped to the user's telephone number. If the number matches what the user entered, an association is made between the telephone number and the device ID from the device or from the registration service.

In another embodiment, the user speaks a special code. In either case (whether the user speaks a code or the code is placed beneath the link) that special code is typed in automatically and transparently to the user. In this way the wireless device's telephone number is verified as being correct. The wireless device's identifier has already been obtained through the data session, so that the telephone number can then be mapped through the caller ID or through the telephone number that the user entered.

To summarize, the user simply enters the data session using the telephone number and the call is returned to the calling device with a link for coding the caller ID. Then that caller ID is mapped with the user telephone number. In the process of verifying the telephone number, transparently to the user, a mapping between the telephone number and the data session is established by mapping the code identifier to the caller ID.

Sometimes the caller ID is not obtainable through a telephone call. In that case, one course of action is to code the wireless device and require the user to say a particular password to verify the code. Alternatively, a message is sent directly to the wireless device and the wireless device enters the code to continue processing.

In one embodiment, the device management service 2402 includes a set of methods which use a voice channel telephone call to verify the mobile telephone number (mTN) associated with a device's SubnoID, or with the cookie, or with state variables generated from the registration service. After a device's SubnoID has been collected by a WAP site and the user has claimed a mTN, the wireless application protocol (WAP) site facilitates the connection of a voice call between that device and a voice extensible markup language (VoiceXML) or proprietary telephony platform. This connection provides primary verification of the claimed mTN. The WAP site waits a predetermined amount of time to receive the verification from the telephony platform. To improve scalability and security, secondary verification in the form of a shared code can also be provided.

The device management service 2402 is implemented either with the device placing a call to the telephony platform, or with the telephony platform placing a call to the device. In the former implementation, the automatic number identification (ANI) feature of the public switched telephone network (PSTN) is used for primary verification. The WAP site uses a wireless telephony application interface (WTAI) function to assist the user in placing a call to the telephony platform. The telephony platform sends a message to the WAP site indicating the ANI of the caller. In the latter implementation, the WAP site provides the user with a code. The site then sends a message to the telephony platform directing it to place a call to the mTN claimed by the user. If the user answers the call, they are directed to provide the code. The telephony platform then sends a message to the WAP site with the provided code.

Secondary verification methods depend upon whether the device places or receives the telephone call. If the device places the telephone call, three methods are available. In one method, the WAP site can dial one of several telephone numbers to reach the telephony platform, and the platform sends a message to the WAP site containing both the ANI as well as information as to which telephone number was dialed. Alternatively, the WAP site can use the WTAI "SEND DIGITS" function to send a code to the telephony platform as part of the call by the device. In another alternative method, the WAP site can provide the user with a code. The telephony platform asks the user for the code. The telephony platform provides both the ANI and information about the code it received in the message it sends to the WAP site. This code could be numeric or it could be a name, word, phrase, or any other form of information that can be recognized by the telephony platform.

If the device receives the call from the telephony platform, the user must provide the code. Again, the WAP site provides the user with a code. The telephony platform asks the user for the code. The telephony platform provides both the ANI as well as information about the code that it received in the message it sends to the WAP site. Again, this code could be numeric or it could be a name, word, phrase, or any other form of information that can be recognized by the telephony platform.

The telephony platform may be implemented, for example, as a VoiceXML script. As the traffic for this management application is negligible, the cost for providing this service is significantly reduced in a hosted environment.

Figure 25:
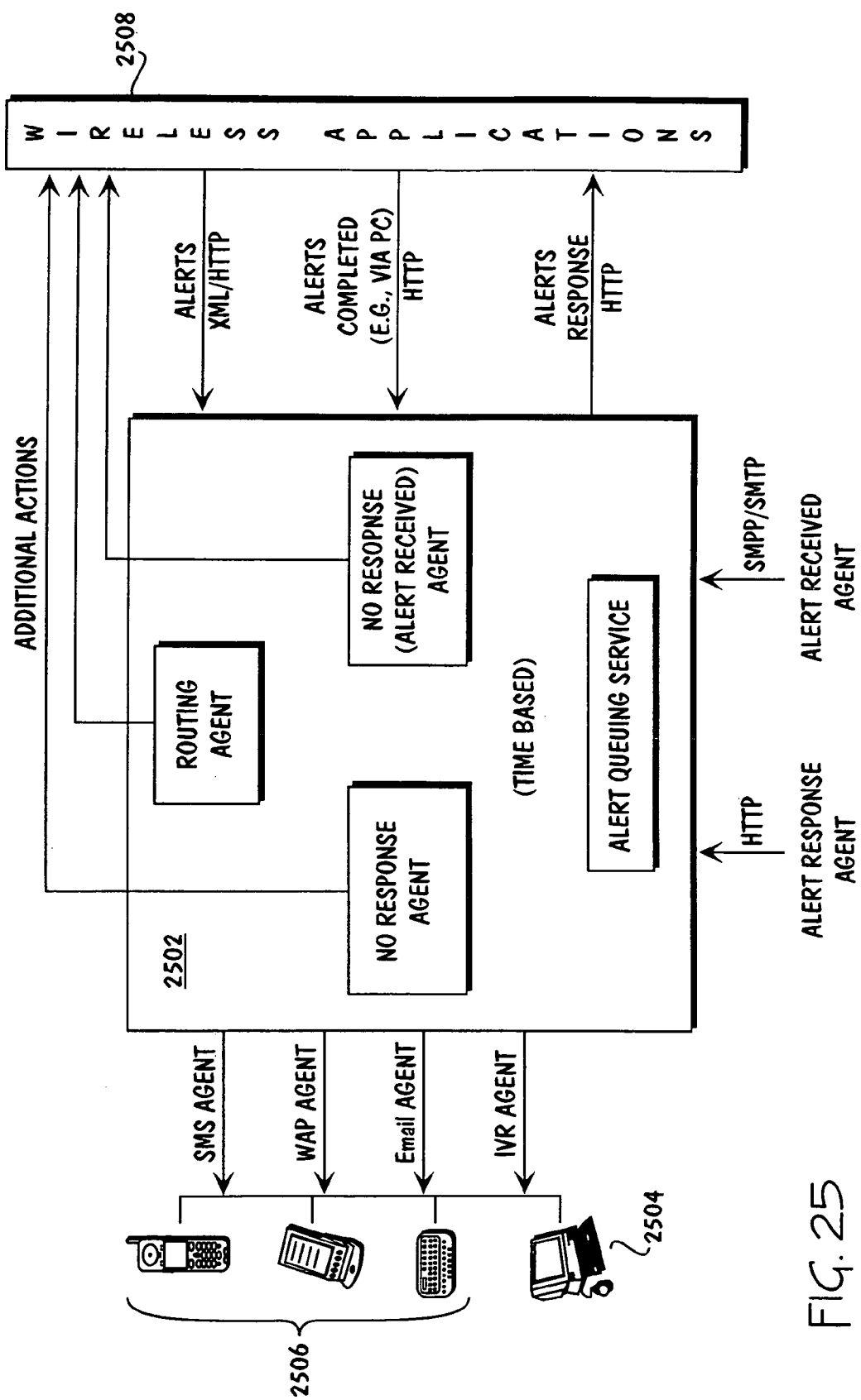
FIG. 25 is a block diagram of an embodiment of a messaging service.

Alerts allow an application to notify users of relevant events, and provide the mechanism for users to respond accordingly. The messaging service 2502 shown in FIG. 25 provides full alert lifecycle management including tracking, delivery, and responding. The user wireless devices 2506 and wired devices 2504 communicate with the messaging service 2502 via an SMS agent, a WAP agent, an email agent, and an IVR agent. The messaging service 2502 includes a routing agent, a "no response" agent, a "no-response (alert received)" agent, and an alert queuing service. The wireless applications 2508 send and receive alerts and actions to and from the messaging service 2502.

The messaging service 2502 is an action-oriented wireless alert management service that supports unlimited levels of escalation. It is used to manage the wireless delivery of alerts and responses to alerts, as well as the escalation process. The messaging service 2502 does not generate alerts. The generation of alerts is done by any higher level application that uses the messaging service 2502 as a subrate system. Examples of such applications include stock alerts, calendar alerts, etc. The messaging service 2502 provides the wireless network interfaces required to deliver alerts via SMS, WAP, IVR etc. The messaging service 2502 supports guaranteed and scheduled delivery, email support, broadcasting, multicasting with acknowledgement, and an unlimited escalation process. Each alert can be acknowledged via an acknowledge URL registered by the application. Multicasting allows the response URL and acknowledgement URL to track whether each user in the multicasting list (e.g. in a marketing survey or poll) has received and/or responded to the message. Time-based actions are invoked in the event that the intended recipient of an alert does not respond to it. These time-based actions are URL driven and can provide additional network-based requests. The network-based requests can, in turn, interface with the messaging service 2502, causing unlimited escalation. For example, if there is no response to a WAP message within two minutes, the message is resent to SMS, email, and pager.

The messaging service 2502 separates alert management and delivery from alert generation with an open XML over HTTP interface. This allows remote alert management as well as the support of multiple applications from multiple domains on the same messaging service 2502 platform. The messaging service 2502 is augmented with carrier network knowledge, such as which telephone number belongs to which carrier using which WAP identifier, which WAP push gateway is used to push WAP alerts, and which a short message service center (SMSC) is used to receive SMS messages. This allows applications to concentrate on delivering alerts to telephone numbers without having to handle network issues, such as choosing a network to send messages to.

Figure 26:
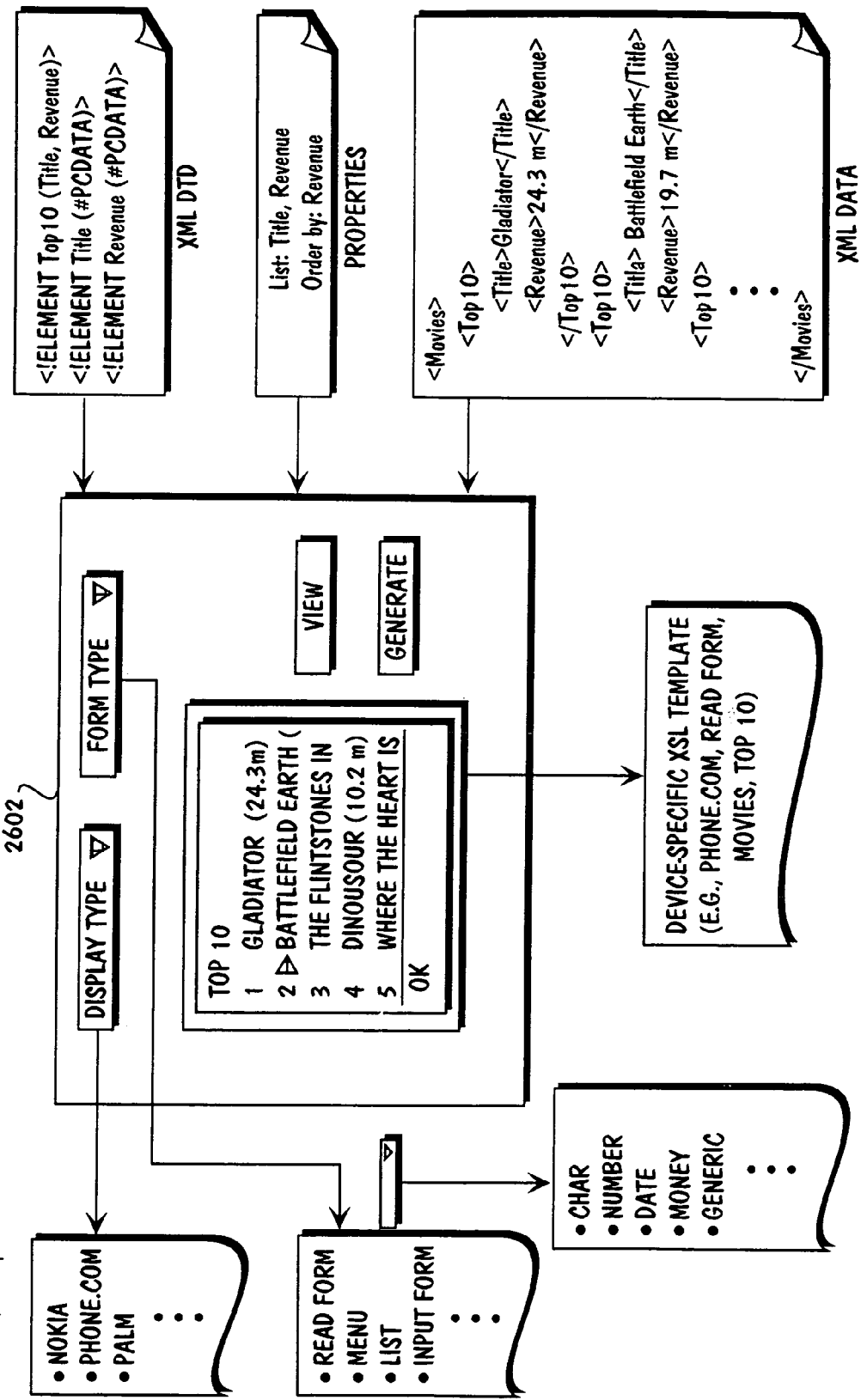
FIG. 26 is a block diagram of an embodiment of an XSL style-sheet generator.

FIG. 26 is a block diagram showing an embodiment of an XSL style-sheet template generator 2602. The template generator 2602 is a tool for the wireless application developer to produce style-sheets to format XML content for various devices. Using the template generator 2602, a user generates specific XSL templates with the click of a button. The inputs to the template generator 2602 are XML data, a list of properties, a device type, and a display format. The template generator 2602 uses the inputs to generate an XSL style-sheet template. The list of properties can specify the data item, the ordering characteristics, the table row element, the list element, the input type etc. The style-sheet template may not be the final style-sheet intended for the XML data source. Rather it is framework upon which a detailed display can be controlled. For example, one detail can be adding a label to the display. Another example could be making data items bold.

The final style-sheets are used by the presentation service (as shown in FIG. 21) that takes the input of the XML data source and the XSL style-sheets to produce formats that are tailored for different devices.

Previous tools usually focus on transforming one data format into another data format. The transformation process is often guided by internal style-sheets that are built into the process. In contrast, the template generator 2602 takes the source data format and the destination format as input and produces the style-sheets externally. The external style-sheet approach allows modularization between the tool and the presentation service. Any change of wireless device (e.g. new telephone size or new telephone UI) or display format (e.g. WML 2.0 or XHTML) will not affect the presentation service, but only the style-sheet generator. To use the template generator 2602 in one embodiment, the user selects a display type, such as PALM™ or NOKIA™, and a form type, such as "list". The user may view a simulated screen to determine whether the style-sheet is satisfactory.

As part of the wireless network communication architecture 104, The XSL style-sheet template generator is part of an application development platform (e.g. presentation services, application editor/navigation-modeler, transcoder etc). It can be used with the transcoder to produce design-time style-sheets for the transcoded XML data source from hypertext markup language (HTML). These style-sheets can then be used by the presentation service for run-time transformation based upon device characteristics.

Figure 27:
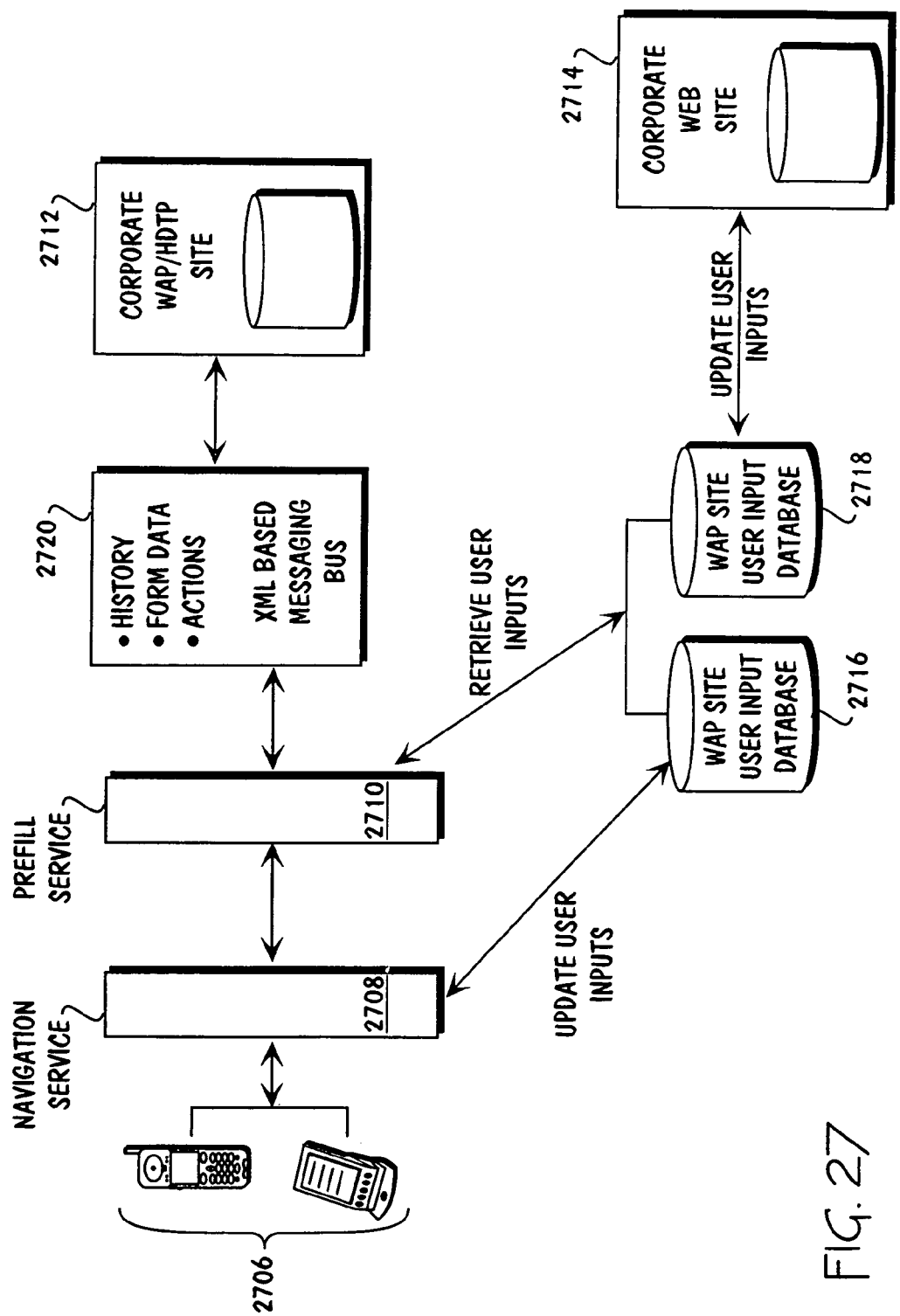
FIG. 27 is a block diagram of an embodiment of a "prefill" application.

FIG. 27 is a block diagram of a "prefill" application that allows a user to prefill input fields in a WAP/HDTP application. In a wireless environment reducing the need for the user to type inputs is critical. Because of the limitations of the telephone keypad, entering letters or special characters is slow and error prone. Estimates vary but at a minimum, entering letters on a telephone keypad requires slightly more than two keystrokes for every keystroke used on a standard QWERTY keyboard. If uppercase letters and special characters are included, significantly more than two keystrokes are required on average. Analyses of the usability of cellular telephones have identified the difficulty involved in typing as a major obstacle to the success of WAP/HDTP based services.

A more usable approach is to allow end users to select from their own previous inputs. The additional use of earlier web-based inputs extends this approach to encompass more of the user's previous inputs and allows WAP/HDTP sites to effectively support additional functionality in a usable manner. As shown in FIG. 27, a web site is tied with a companion WAP site to provide value to the end user and for the business providing the service. The inclusion of this function does not negatively affect the design of an already existing web site or WAP site. The user of wireless device 2706 contacts the prefill service 2710 through the navigation service 2708. The prefill service 2710 communicates with the web site user input database 2718 and the WAP site user input database 2712 to send user input updates and receive previous user inputs. User input updates are passed to the corporate web site 2714. History data and form data are exchanged with the corporate WAP/HDTP site 2712 via the XML messaging bus 2720.

In one embodiment, the prefill service 2710 is a service added to existing applications without affecting the user interface design of the existing application. The user is presented with multiple input selections to choose from. The user selections are placed in a separate "deck" to avoid any deck size limitation. Companion web site inputs can be used to populate the input fields in a WAP site.

In one embodiment, the prefill application tracks user inputs in the wireless environment and uses the inputs to prefill input fields in a WAP/HDTP application. If an input field had a previous entry, a "prefill select card" is dynamically created directly preceding the original input card. The prefill select card lists all of the values that have previously been used with that field. If a prefill is selected, the input card is skipped and the user goes directly to a results card. An option to directly enter a value (labeled "other") is included at the top of the prefill select card. Selecting "other" goes to the standard input card.

Entries are listed in the order of occurrence. The most recent input is listed first, the second most recent is listed second, etc. Some prefills have a time value associated with them. For example, flight numbers and package tracking numbers are only meaningful for a certain period of time. Using recency for prefill ordering is very effective for this class of prefill.

Many WAP/HDTP based applications act as an additional channel for existing web sites. In one embodiment, inputs are mapped from a web site into a companion WAP/HDTP application. This requires a web site to which the user must log on. Examples include portals, stock brokers, travel sites, and banks. Preferably, an input field in the web site is associated with an input field in the WAP/HDTP site. When the user is identified, their previous inputs to the web site are displayed in the prefill select card of the WAP/HDTP site. Depending upon deck size, the prefill select cards can be separated from a long input deck and prefetched as a separate deck. In one embodiment, prefetching is done using either HDML or WML 1.1 with UP.Browser 4.x or later, using known extensions, such as OpenWave™ extensions. This allows navigation between the input deck and the prefill select cards without significant degradation in response times.

Figure 28:
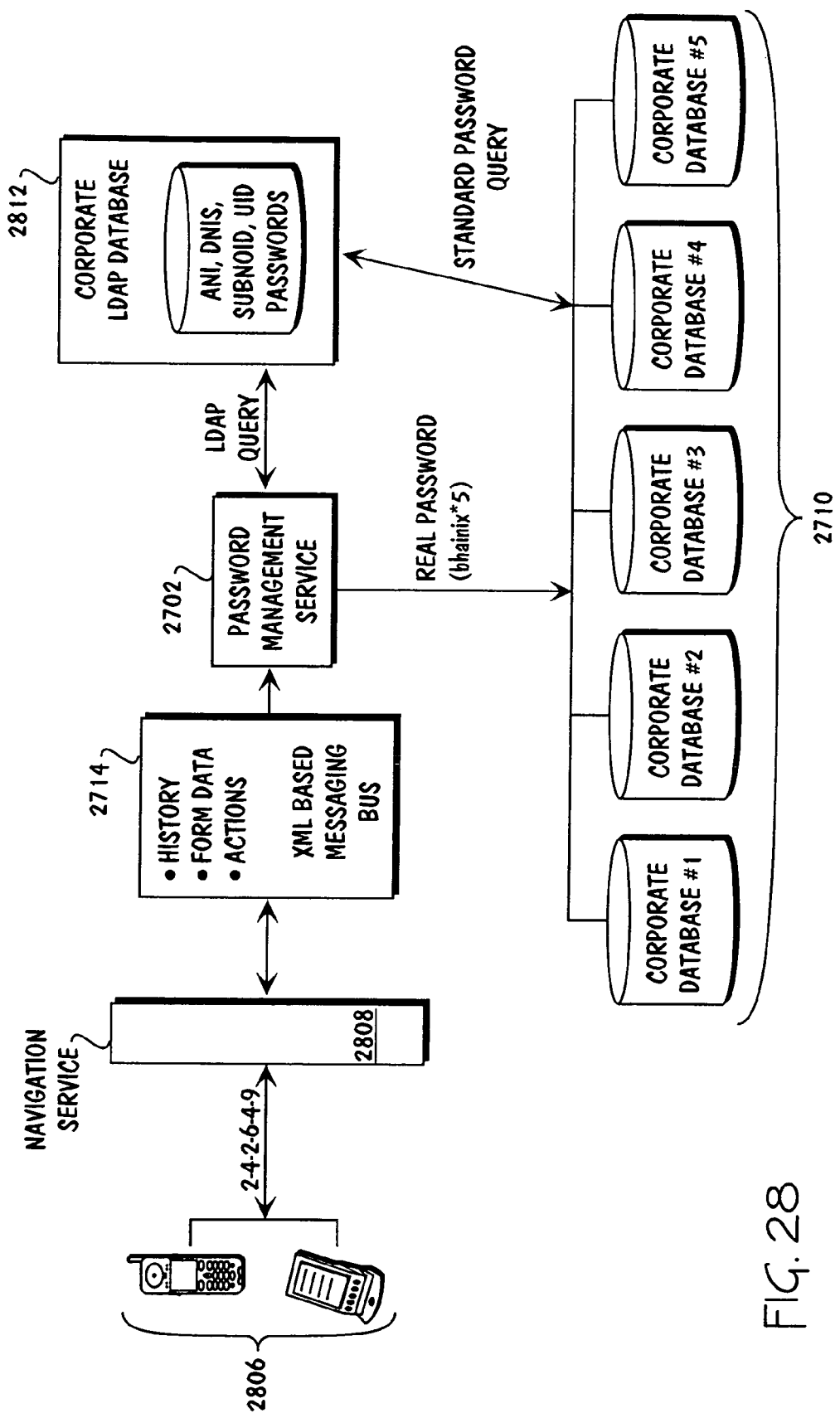
FIG. 28 is a block diagram of an embodiment of a password management service.

Another application that enhances the experience of the wireless device user is the password management service 2802 illustrated in FIG. 28. The password management service 2802 reduces the complexity of corporate passwords. This is especially useful when only a telephone keypad is available as an input device. The wireless device 2806 user accesses the password management service 2802 through the navigation service 2808. The password management service 2802 communicates with the navigation service 2808 to send and receive history, form data, and actions via the XML messaging bus 2814. The password management service 2802 sends lightweight directory access protocol (LDAP) queries to the corporate LDAP database 2812. The corporate LDAP database 2812 contains passwords, identification numbers, etc. Various corporate databases 2810 transmit standard password queries to the corporate LDAP database 2812 and receive "real" passwords from the password management service 2802.

In the corporate environment, employees often have multiple passwords that are used to access different systems. These passwords often have specific restrictions on their format to reduce the probability of them being guessed or cracked by an automated password-guessing program. Restrictions vary between and within companies but passwords often involve a minimum of eight characters with one or more "special" characters. This presents a significant usability obstacle to accessing corporate applications over the wireless web. Input using a WAP telephone browser is difficult because characters and particularly special symbols take a long time to type and errors are often introduced.

The password management service 2802 provides a security method that makes it easy for employees to use their own passwords in an easier form for input using a wireless device. Security is maintained by using information about the device that is attempting to access the corporate application. In a sense, the wireless device acts as a physical key that, when combined with a simplified password, allows secure access in much the same way as a bankcard and a personal identification number (PIN).

In addition, maintaining passwords is a critical requirement for highly secure businesses. Many corporations require that passwords be changed on a regular basis. Using a PIN code that is based on a password makes the PIN code easy to remember. Even if passwords change frequently, this method does not impose any additional difficulty for the end user to remember additional passwords. The password management service 2802 allows an entire class of corporate applications to be accessed securely and efficiently.

It is also possible to integrate the password management service 2802 with message or email alerts to enable an end user to be alerted when repeated attempts are made to access their account. These alerts occur in real time and require an appropriate response (e.g., a full length password) within a set amount of time or the SubNo.ID is automatically deactivated. The actionable alert also has the option to immediately lock a device that is attempting to gain entry.

In one embodiment, the first four to eight characters of the standard password for a user/application are used with the characters transformed into the matching digits on the telephone keypad. The digits, along with the SubNo.ID are used to control access. Though it is possible to fake the SubNo.ID, this would require the attacker to discover the SubNo.ID of the employee, and also discover the short form of the password. If the wireless device is lost, the SubNo.ID could be deactivated through the use of the device management service 2402 (FIG. 24).

In one embodiment, the password management service 2802 is an enhanced application of the single sign-on service previously described. It is an additional service that is specifically developed to assist employees of corporations that have stringent security requirements. The password management service 2802 requires integration with the password database that is currently being used by a corporation.

Figure 29A:
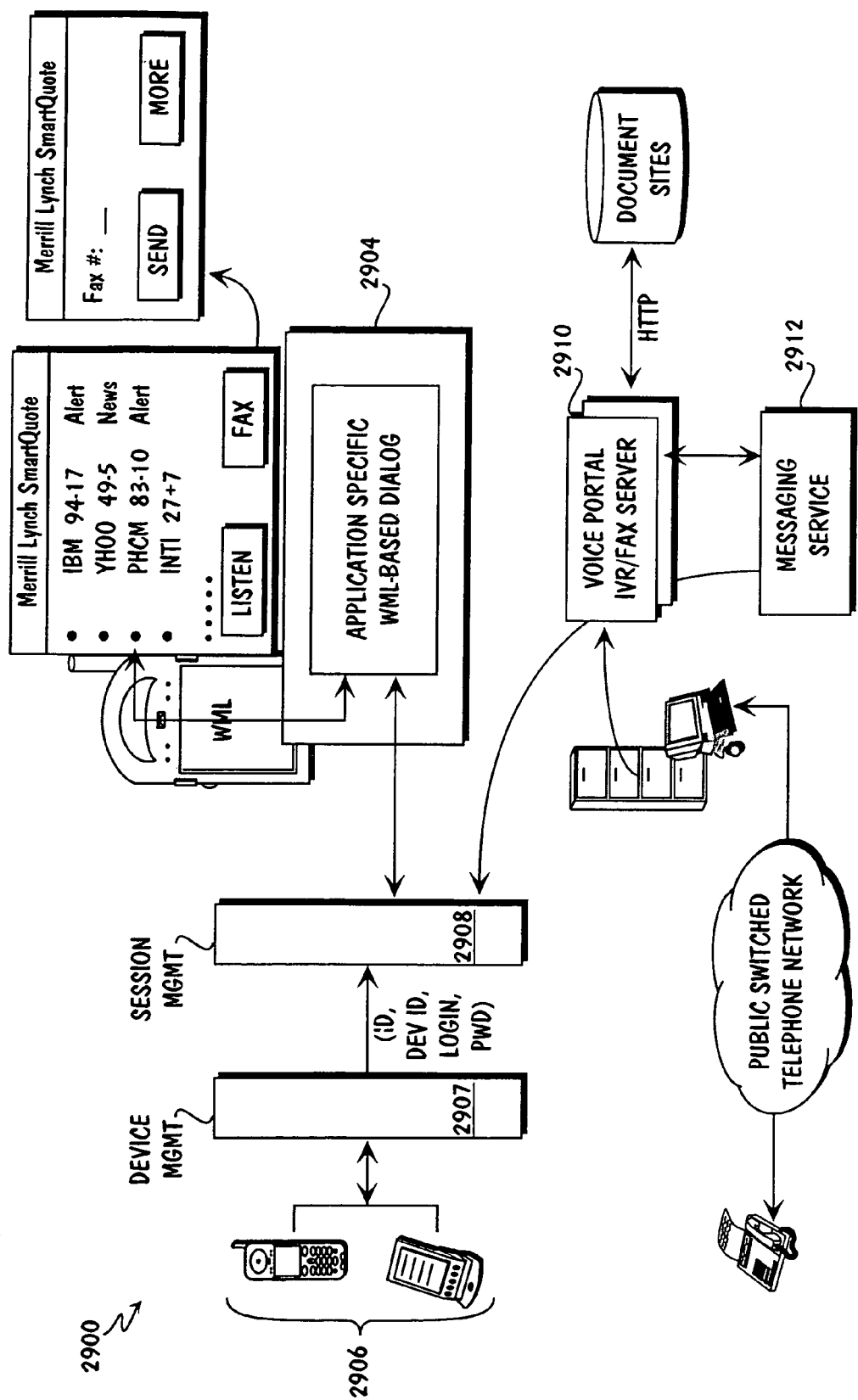
FIG. 29A is a block diagram of an embodiment of a wireless data and fax apparatus.

An embodiment of an integrated wireless data and fax method and system, or fax service 2900 is illustrated in FIG. 29A. There are several use cases for the fax service. Use cases can arbitrarily be classed as pull cases and push cases. In pull cases, the end user is actively requesting a fax be sent, probably at the point in time when the request is made.

In one pull case, an end user is looking for information from a customer application (at a customer public WML site). After seeing an abstract of desired information, the end user requests a fax. At this point, the end user specifies the destination fax number or confirms/edits a number already in their profile, and optionally specifies cover page information.

In another pull case, an end user receives an alert (e.g., a browser alert, SMS alert, email alert, or voice) from a customer application. After reading the abstracted information, the end user requests a fax. At this point, the end user specifies the destination fax number or confirms/edits a number already in their profile, and optionally specifies cover page information.

In another pull case, an end user that is an employee of a customer locates important information on the customer's internal WML site and chooses to have that information faxed to another end user. The employee then specifies the destination fax number or confirms/edits a number already in their profile, and optionally specifies cover page information.

In one push case, a customer application sends a fax, typically at a scheduled time. The customer application faxes information to an arbitrary end user as part of an escalation process. Alternatively, the customer application faxes information to arbitrary end users as part of normally scheduled information transmission.

The fax service 2900 is based upon the WAP standards. The fax service 2900 consists of a set of software and hardware modules that allow the users of WAP-enabled mobile devices to request that a fax be sent while engaged in a WAP data session. The fax service 2900 converts a web document into image files of TIFF format and then faxes the image files using a built-in fax server or sends the image files as email attachments to an external fax server/service via a simple mail transfer protocol (SMTP) interface. If a default fax number has been pre-defined and is accessible from the user's profile data (known as "the cookie), the user may employ a one-click-to-fax method for sending the fax. Otherwise, the user may specify any G3-based fax number or select it from a telephone book entry. The fax service 2900 can be used in conjunction with other applications or services described herein, such as the single sign-on service. The fax service 2900 can also be effectively used as a stand-alone application that is part of a larger WAP-based platform.

Referring to FIG. 29A, the fax service 2900 includes the following components: a WML-based application-specific dialog module 2904; the device management service 2907; the session management service 2908; the messaging service 2912; and the IVR/FAX server 2910.

Figure 29B:
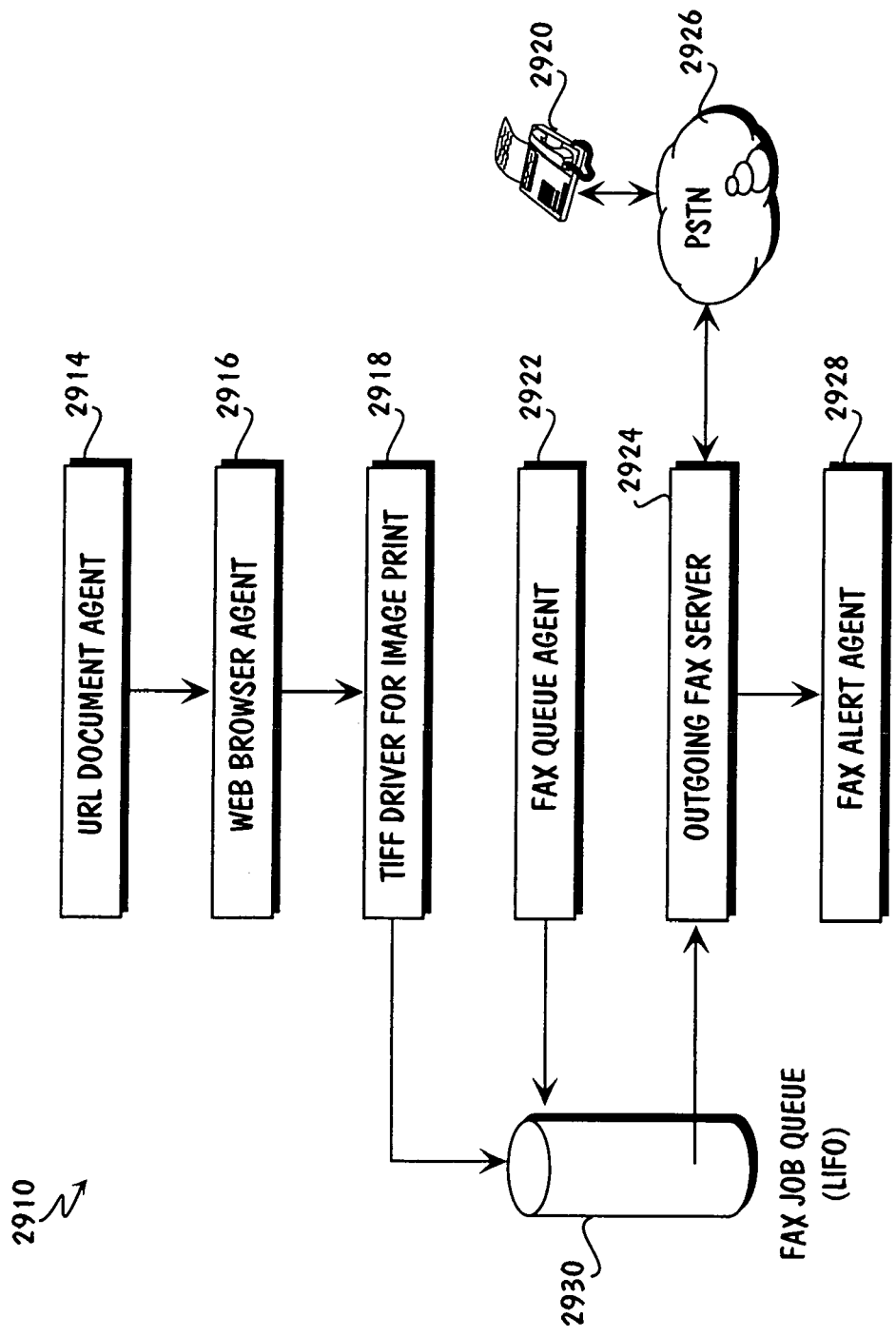
FIG. 29B is a diagram illustrating an IVR/FAX server.

The IVR/FAX server 2910 is further illustrated in FIG. 29B. The URL document agent 2914 is a web-based client software module that downloads an HTML-based web page identified by its corresponding URL, which is set by a dialog module (not shown). The web browser agent 2916, in one embodiment, is a C++ based software module that invokes a standard web browser to display the page downloaded by the dialog module and then has the browser print the displayed page to a virtual printing device, such as the tagged image file format (TIFF) driver 2918. The TIFF driver 2918 converts the printing image to a computer file with an appropriate TIFF header that is acceptable to the outgoing fax server 2924. The fax queue agent 2922 monitors the computer file being generated. Once it detects that the file is complete, it moves the file to a last-in-first-out (LIFO) fax job queue 2930 for the fax jobs to be executed by the outgoing fax server 2924. The outgoing fax server 2924 retrieves the first job in the fax job queue 2930 and then faxes the corresponding file to the fax number set by the dialog module. Upon receiving confirmation of a successfully completed fax task from the distant fax device, the fax alert agent 2928 sends a WAP-based fax alert message to the originating WAP wireless device indicating the number of pages and their time of delivery.

In one embodiment, if the user has a default fax number stored in the user's profile data (the cookie), the device management service 2907 (FIG. 29A) will set the fax number register to this fax number. Otherwise, it will set the register to null. The session management service 2908 keeps track of each instance of the dialog module during a session. If after a successful session of the dialog module the session management service 2908 finds that the register is null, it will set the register to the last fax number entered by the user through the dialog module. If the register contains a valid fax number after entering the dialog module, the dialog module will ask the user to confirm the fax number, edit the fax number, or select a number from the user's telephone book. If the register is null, the dialog module will ask the user to key in a valid fax number for the HTML document to be faxed to, or choose a number from the user's telephone book.

Figure 29C:
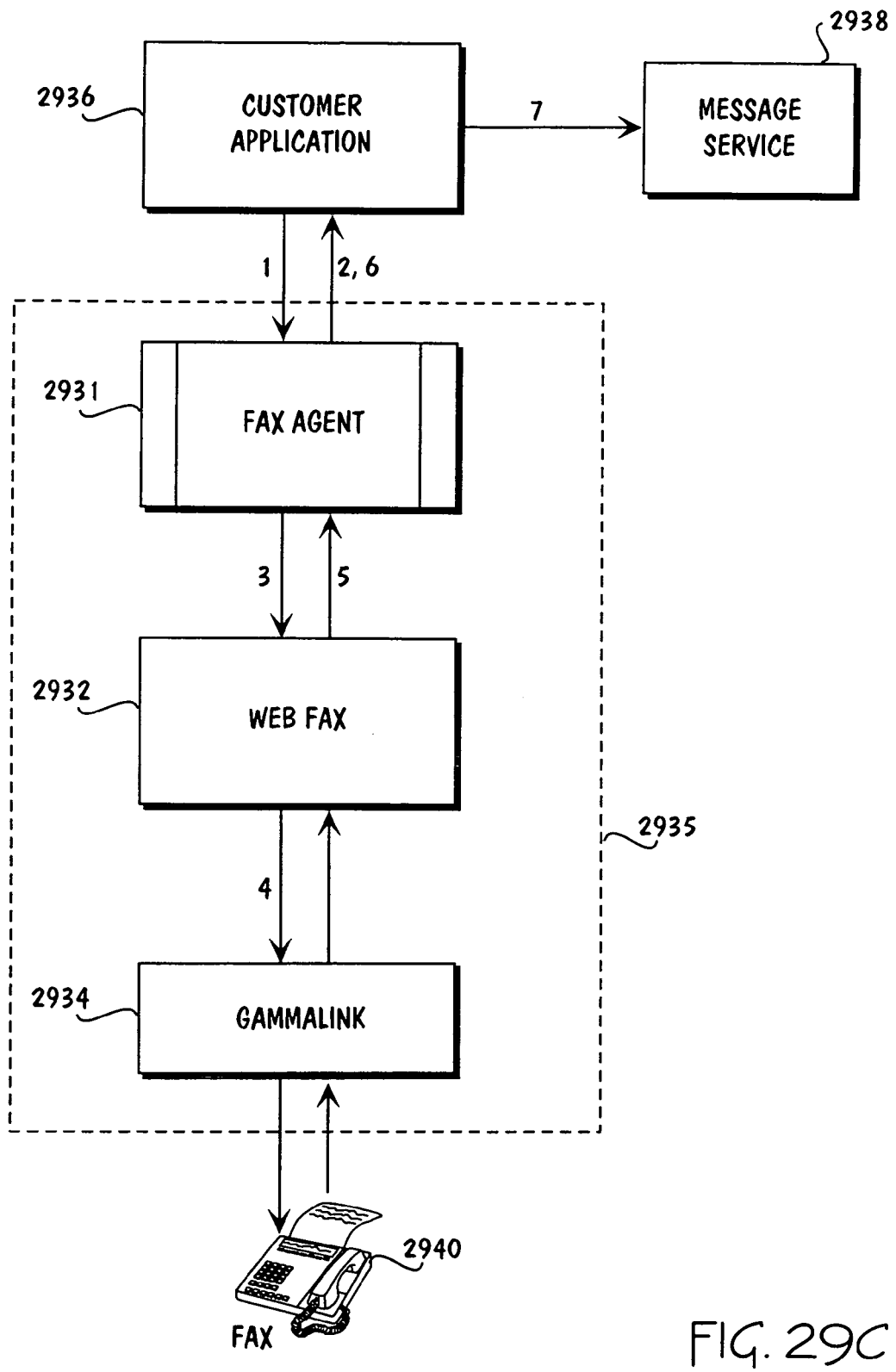
FIG. 29C is a diagram of components of one embodiment of a fax service.

The overall flow of the fax service, the user interface, and the implementation of the fax service will now be discussed in more detail with reference to FIGS. 29C and 29D. FIG. 29C is a diagram showing one embodiment of the fax service 2935. The fax service 2935 communicates with the customer application 2936 and with the fax machine 2940. The fax service includes a GammaLink™ module 2934, a WebFax™ module 2932, and the fax agent 2931. Optionally, the customer application may communicate with the messaging service (described elsewhere in this document). The following is an example of data flow for the fax service 2935:

(1) the customer application sends fax request to the fax agent 2931;
(2) the fax agent 2931 sends an immediate reply to the customer application and checks licensing issues;
(3) the fax agent 2931 sends the request to WebFax™ 2932;
(4) WebFax™ 2932 renders the document and then faxes it;
(5) once the fax is done or has timed out trying, WebFax™ 2932 sends a status message back to the fax agent;
(6) the fax agent 2931 passes on the status to the customer application; and
(7) the customer application 2936 can then choose to send an alert (using messaging service 2938) to notify the end use of the fax status.

Figure 29D:
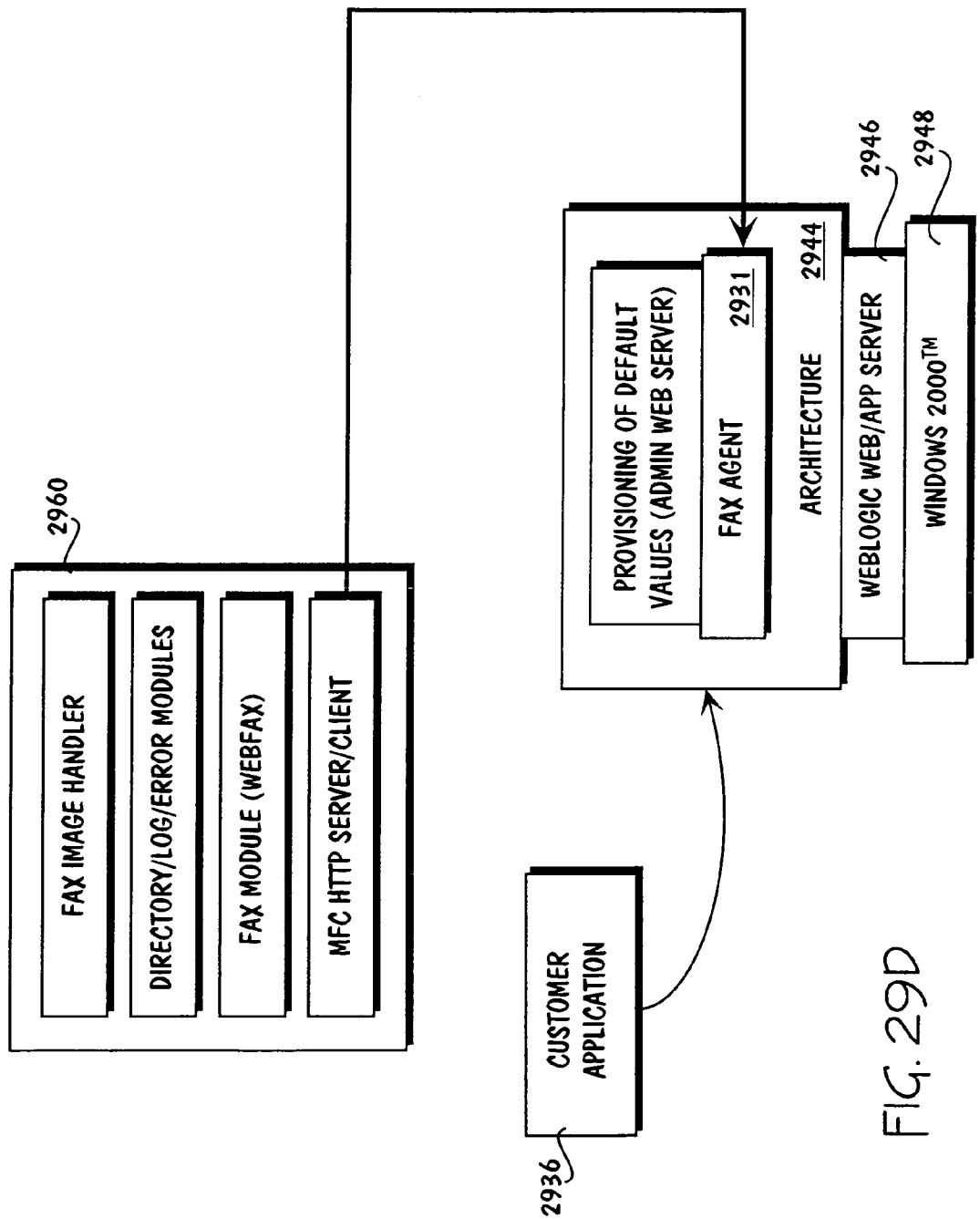
FIG. 29D is a diagram of components of one embodiment of a fax service.

FIG. 29D is a component diagram showing an example arrangement of the fax agent 2931 on the architecture platform 2944. In one embodiment, the architecture platform is supported by the WebLogic™ Web/App server 2946 and Windows 2000™ 2948. The customer application 2936 communicates with the fax agent 2931, and the fax agent 2931 communicates with other components of the fax service 2960.

A customer (e.g., a large corporation or a provider of a specific Internet service) provides a customer application that sends the fax agent the required parameters via an HTTP request. For instance, this application could be WML software for the callers who use their services. The software can allow the callers to traverse menus on their handset, and select a document to send to a specified fax number. When the caller presses a fax softkey, the HTTP request is sent to the fax agent.

In one embodiment, a WebFax™ component of the fax service uses Microsoft Internet Explorer Automation™ to navigate to the requested URL and prints the page through the Peernet™ Doc-to-Fax printer driver, which creates a TIFF file suitable for faxing through GammaLink™ API calls.

The fax agent acts as a link between the customer application and the WebFax™ component. The fax agent uses the standard Internet HTTP protocol to communicate with Web-Fax™, as well as to return status codes to the customer application. WebFax™ is the component responsible for sending the fax itself. It acts as an HTTP server and is activated when it receives a request that a document be faxed to a given number. Legal documents are documents that can be displayed with a web browser not using any special plug-in (such as Acrobat™ reader).

In one embodiment, the fax service operates on a Windows 2000 Professional™ system with the GammaLink™ fax system from Dialogic™. The third party software required includes Dialogic™ software "System Release v5.01" with SDK option, and Blackice™ Monochrome Printer Driver for NT 4.0 and Win2000.

In one embodiment, the fax service requires a Pentium III personal computer with 256M RAM. The fax service operates with a GammaLink™ CPi/400 PCI 4-channel board, or a CPi/200 PCI two channel board.

The fax service provides a SMTP option to route the fax documents requested to an external fax server/service instead of using the GammaLink™ based fax capability. The SMTP option of the fax service requires an SMTP server running on the installed system and an SMTP client program running such as Microsoft Outlook™. The SMTP option of the fax service requires the interfacing external fax server/service to extract the fax number from a subject line and to support email attachments of TIFF file format.

The fax service accepts HTTP requests from the customer application. The WebFax™ component of the fax service accepts HTTP requests of a similar format. The HTTP request must contain the required parameters and may contain optional parameters. A minimal request from the customer application to the fax agent has the form:

```
http://<hostname>/fax
service.html?faxnum=aaa&url=host.domain/name.htm
&id=ccc<&spqr=bbb>
```

The corresponding request from the fax agent to WebFax™ has the following format:

```
http://<hostname>/fax
service.html?faxnum=aaa&url=host.domain/name.htm
&id=ccc&spqr=bbb
```

The underlined fields are specific to a user request. This example also shows the required syntax.

The faxnum argument, the phone number of the target fax machine, must be first and occurs after a question mark. The other arguments can be given in any order and must be separated by ampersands.

The URL argument contains any legal URL. The request may contain one or more URL arguments for a single fax transaction, but there must be at least one. If there is more than one, they will be processed sequentially. The customer may use the first URL as a cover sheet and subsequent URLs as content.

The spqr argument specifies a security code. WebFax™ and the fax agent both calculate a value, a VPLSecurityLock object. If the values match, WebFax™ accepts the request.

The ID argument specifies a request ID that is included in the final success or failure reply from WebFax™ to the fax agent. This ID is the request ID sent by the customer application to the fax agent. The fax agent, once it gets the ID back from WebFax, can return this ID to the customer application so that the application can make a request of the messaging service to send the status alert to the correct user.

Optional arguments include:
&priority=x (where x=1, 2 or 3; 1 is the most urgent)
&interval=nnn (where nnn is the number of seconds between fax transmission attempts)
&duration=mmm (where mmm is the number of minutes to keep attempting fax transmission)
&notafaxinterval=ooo (where ooo is the number of seconds between fax transmission attempts if the previous attempt failed due to a "not a fax machine" error)
&notafaxduration=ppp (where ppp is the number of minutes to keep attempting fax transmission where attempts are failing due to a "not a fax machine" error)

URL syntax requires encoding of special characters. The fax agent returns the status of a fax to the customer application via standard HTTP request.

Several fax-related fields, to be used as default values, must be accessible in a database. These fax related fields include: the priority, retry duration, retry interval, notafax retry duration, and notafax retry interval. These fields can be defaults, but if the client software allows the caller to specify these values, then the specified values will override the system values.

The fax agent acts as a link between the customer application and the WebFax™ component. It uses the standard internet HTTP protocol to communicate with WebFax, as well as to return status codes to the customer application.

Except in the event of system failure or network errors, WebFax™ will always respond to the fax agent, and the agent will always transmit a message to the customer application indicating fax status.

When the fax agent receives a request from the customer application, it verifies license currency, and then packages the information received from the application into a request to WebFax™.

The faxnum, URL, and ID fields are sent as received from the application. The servlet validates the customer's security code, and computes a second security code, sent as the spqr parameter.

WebFax™ will examine the fax request and respond with a status code and message. If the status code indicates an error, the fax agent will notify the customer application of the error, and that will end the transaction. If the status indicates that WebFax™ successfully accepted the request, the fax agent takes no further action at that time.

If the request to WebFax™ cannot be completed (e.g., due to host shutdown or network problems), a message will be sent to the customer application indicating that the request failed for system reasons, not because it was a malformed request.

When the fax is finally transmitted, or cannot be successfully transmitted, WebFax™ will send an http request, and the status and message will be relayed to the customer application. That concludes the fax transaction.

WebFax™ replies immediately to the fax agent by transmitting a text file containing a numeric code and an explanation of the code. The standard HTTP status code of 200 should be present in the header, regardless of the contents of the text file returned. If the fax request was well formed, WebFax™ returns a file, fax service.html, containing:
    0 FAX_REQUEST_ACCEPTED
    If the request was ill-formed, fax service.html will contain:
    <nnn> <plain-text explanation>
    Where the possible codes and corresponding explanations are as follows:
    1 CANNOT_PARSE_ARGUMENTS
    2 DOCUMENT_TYPE_NOT_SUPPORTED
    3 INVALID_FAX_NUMBER
    4 NO_STATUS_AVAILABLE
    If the reply was anything other than "0 accepted", there will be no further reply from WebFax™ regarding the failed request. If the request is accepted, WebFax™ will send one final completion or failure message to the IP address of the fax agent, in the form of:
http://nnn.nnn.nnn.nnn/servlet/fax
    service?status=bbb&message=aaaaaa&id=nnn
    where
    nnn.nnn.nnn.nnn is the IP address of the machine that sent the request
    bbb (status) is a well known message status code
    aaaaaa (message) is the text associated with that code
    nnn (id) has the value originally received from the Agent in the fax request The transmitted fax consists of the contents of the Internet Explorer™ windows in which the web documents were rendered. If any document is longer than the window, the entire document will nonetheless be converted to a TIFF file and faxed. If a web document contains frames, each frame will be appended sequentially to the TIFF file as if it were a separate document; the original layout of the web page is not preserved. All such TIFF files will be sent within one fax session.

A VPLSecurityLock object is used for enhanced security for fax service. WebFax™ accepts requests via HTTP, making it vulnerable to spurious hits. Therefore, each request from customer software provides a security code, calculated using the VPLSecurityLock object. The fax agent will verify this code's validity. Each request from the fax agent to WebFax™ contains a security code that is validated by WebFax™. These two codes will probably never be the same.

Figure 30:
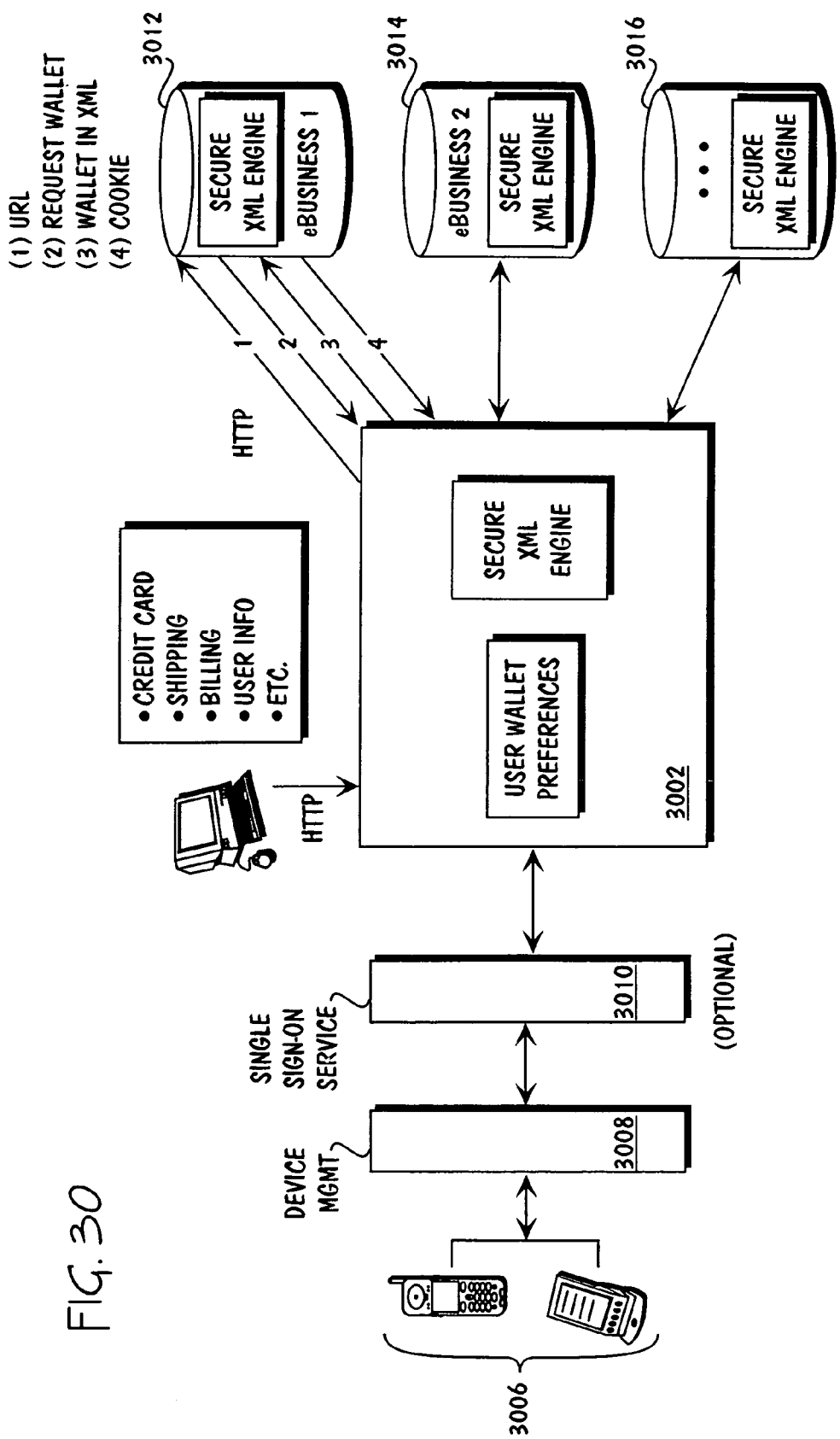
FIG. 30 is a block diagram of an embodiment of a mobile wallet service.

A mobile wallet service 3002 is illustrated in FIG. 30. The mobile wallet service 3002 lets a user securely store data and use the data to make purchases of goods or services from various parties without refilling forms with required information, such as credit card number, health club card number, or shipping address. Once the user puts the information into his or her electronic wallet using the mobile wallet service 3002, the information is automatically presented to requesting parties whenever and wherever required. In general, rather than requiring the user to enter information each time it is required by an application, the data is pre-formatted in XML and forwarded to the requesting application of the ebusiness. The ebusiness does not store the data, but sends a cookie.

The mobile wallet service 3002 is secure. If an application tries to use the mobile wallet service 3002, it must provide a previously assigned ID and password, ID and password signature, or ID and encrypted password.

Unlike traditional mobile wallet services, the mobile wallet service 3002 is an extensible system. In one embodiment, the mobile wallet service 3002 requires the partnership of ecommerce sites operated by merchants such as ebusinesses 3012, 3014, and 3016. In one embodiment, the mobile wallet service 3002 is integrated with the single sign-on service previously described. The user of the wireless device 3006 accesses the mobile wallet service 3002 through the device management service 3008 and the single sign-on service 3010. The user presents wallet information on request to the partnered sites of ebusinesses 3012, 3014, and 3016. New types of wallet information can be easily defined in the mobile wallet service 3002. This enables the support of many different application domains. The mobile wallet service 3002 also supports multiple data formats. Wallet information can be formatted in HTML, WML or XML. The wallet information is sent to requesters in either HTML or data stream.

In one embodiment, the wallet information consists of one or more wallet entities. These entities are generalized into categories, such as address, card etc. For example, a driver license contains information on the driver license card, and the address of the driver. The information is associated with types. A type is defined by: an attribute, such as banking, driving, shipping, etc.; usage, such as business, personal, etc.; and form, such as address, card, coupon, etc. This modeling of wallet information allows flexible use of the mobile wallet service 3002 in many different business domains. For example, an address can be a billing address, a shipping address, a credit card address or a health club card address. A card can be a banking card, a driver's license, or a health club card. The user can also define new wallet entity types to enable the mobile wallet service 3002 in new business domains. This modeling reduces the effort required to maintain wallet data. For example, multiple cards can share an address.

Wallet information can be presented in multiple formats upon retrieval, such as HTML, WML, or XML. This allows the user to manage wallet information using different devices and allows business providers to easily retrieve and use wallet data.

The mobile wallet service 3002 provides multiple levels of access control. Using password signature to validate a requester prevents illegal attempts to retrieve wallet information by people who know the password of that requester. Using an encrypted password to validate a requester prevents illegal attempts to retrieve wallet data by people who are able to obtain request data over a network. The mobile wallet service 3002 system also provides secure wallet data transportation in secure sockets layer (SSL) or encrypted version over hypertext transfer protocol (HTTP).

Figure 31:
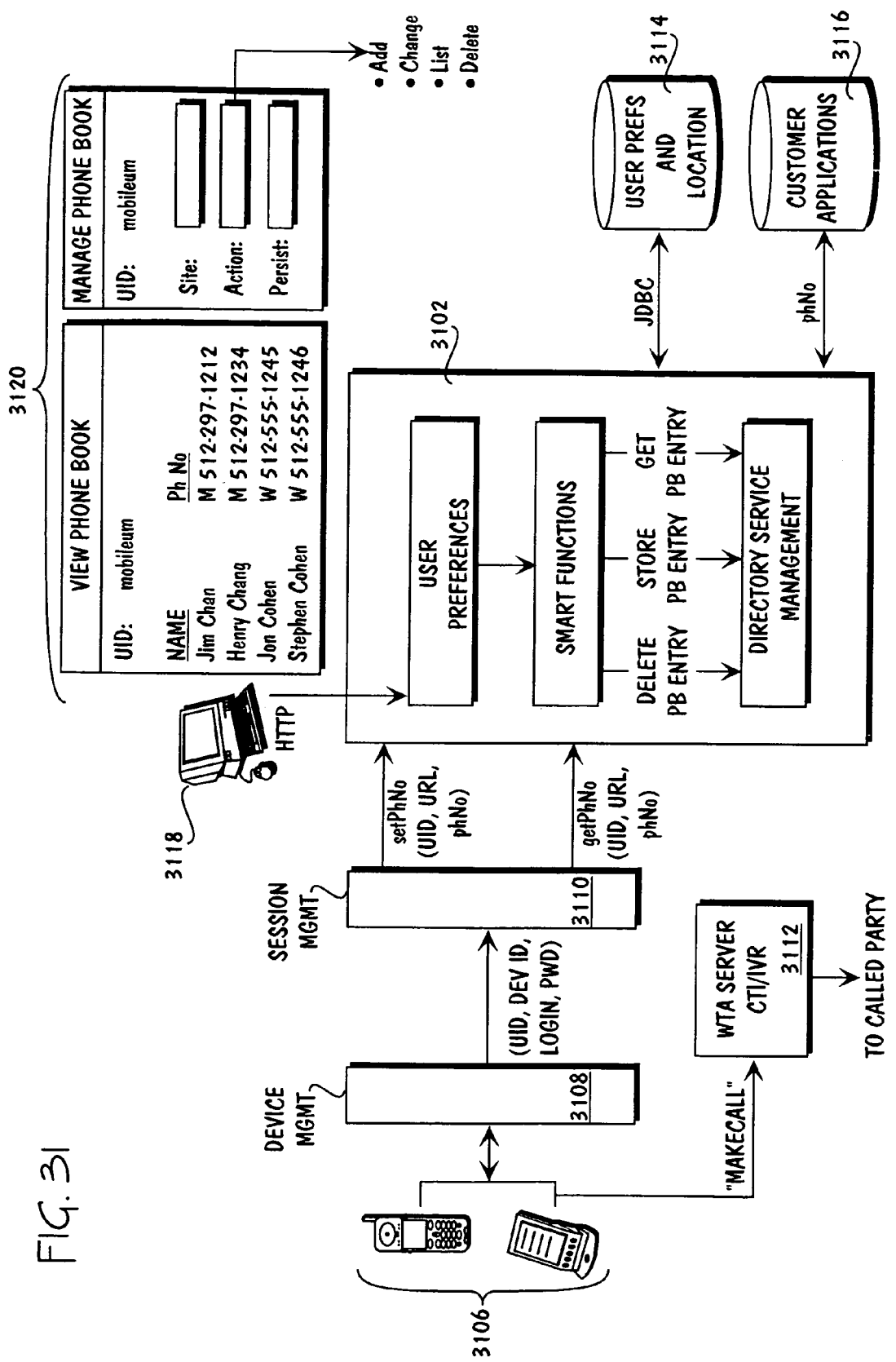
FIG. 31 is a block diagram of an embodiment of WAP-based directory service.

FIG. 31 is a block diagram showing an embodiment of a WAP-based directory service 3102. The WAP-based directory service 3102 includes a directory search method using device-based telephone book entries, and a multi-tiered directory coding algorithm for WAP access. The WAP-based directory service 3102 is accessed by the user's wireless device 3106 through the device management service 3108 and the session management service 3110. The session management service 3110 communicates with the directory service 3102, which includes user preferences and various smart functions. The directory service 3102 communicates with the enterprise databases that contain user preferences and location (3114) and customer applications (3116). Through the user interface 3120, the user can configure and use the directory service 3102.

The directory search method uses the directory service 3102 to retrieve most frequently called numbers or a short-term history list (last N calls). In one embodiment front-page listings are based upon an external location-gateway-based service. Each network-based call log entry is tagged for location identifiers such as city names or area codes. The messaging service (see FIG. 25) can be used to set up "auto-redial" or "follow-up" calls when the called number is busy or is not answered.

The directory service 3102 can be used, for example, to enable Fortune 1000 companies to provide unique WAP-based directory access to their corporate directories. The directory service 3102 provides visual access to server-side directories on both WAP-enabled terminals and non-WAP terminals. These directories can contain corporate entries, personal entries, or white pages. The entries can be telephone numbers, FAX numbers, and/or email addresses. The directory service 3102 entries can be managed (add/delete/change) either from the desktop PC 3118, or from the WAP enabled wireless device 3106. To secure these entries, access to the WAP directory can be protected by pass code. Further the WAP directory service enables services like call service, instant messaging, follow-me applications, and collaborative services like chat and conferencing.

Through the user interface 3120, names can be accessed or managed through "T9"-like syntax in which a single key click is used to represent a single letter. For example, the key sequence for "CHANG" would be "24264". The possible matches in the telephone book are presented to the user as links with soft-keys for "Call" and "Cancel". When a name is found, it is presented to the user. The user pushes "Call" to place the call. Frequently selected names are stored in the outgoing call log in a server so that when the same name is requested, that name will be presented first. This is especially useful for names that have several possible matches. Also, the name is added to the user's frequently called list. This automated option allows the user to construct a telephone book without actually having to program the entries.

In one embodiment, when a call is placed, for example by pressing the "Call" key, a URL link from the voice channel homepage provisioning service (see FIG. 14) provides the initial entry point to the WAP-based directory service 3102. Each outgoing call is logged in the user's call log. These entries are shared by future visual and speech accesses to determine the most likely entries requested by the user, particularly when there are multiple possible matches for a given request.

In one embodiment, the directory service 3102 menu has a numbered list to display entries for the frequently called list, "spell it", etc. The list contains directory numbers that are most frequently called by the user. If the current location of the user is available to the directory service, the list may be further sorted based on location. For example, if the user is from Austin and is now traveling in Pleasanton, directory entries that contain the area code for Pleasanton will be displayed first. When the user selects the call list option, a list of links is returned. Each link corresponds to a name. To place a call, the user clicks on one of these links.

Another feature of the WAP-based directory service 3102 allows the user to spell the name of the person he wants to call. Several possible names with their associated links are returned in the WML page that is returned to the user. The user selects one of the names. The WTA server 3112 logs the outgoing call. In various embodiments, the user may enter the name in one or more ways, such as: entering a T9-like syntax to represent name, e.g. 24264 for CHANG; a three character list (e.g., ABC, DEF, etc) such that the user picks an entry and the last names that are contained in the three alphabet list are returned to the user; and for a non-WAP terminal, speech recognition access is provided.

When the appropriate name is returned to the user, an option is provided to display or not to display the associated telephone number. Each name that is displayed is associated with a URL link. The user is provided with the option to place the call, or cancel. If the user chooses to place the call, a WML card with a "WTAI make call" is re-directed to the WTA server 3112. The call originated at the client completes to the CTI/IVR. The WTA server 3112, with the help of the CTI/IVR, actually places the call to the called party. The WTA server 3112 logs information of the outgoing call in the user's call log. Various enhancements include group lists and most frequently called lists maintained on a per-user basis, and selective synchronization between the WAP client and the server telephone books.

Another enhanced service in one embodiment of the architecture (see FIG. 2) includes a method for creating new user interface elements in the wireless environment using existing WML. In one embodiment, the method includes creating primitive logical operations using existing WML. Some of the user interface elements that can be created are shown in FIGS. 32A-32D. FIG. 32A shows an expanding list. FIG. 32B shows a multiple select list. FIG. 32C shows adjacent radio buttons, and FIG. 32D shows linear radio buttons. In general, these screens operate in the same way they would operate in a traditional web browser with the exception being the manner in which each interface element is selected. The user interface elements shown are an improvement over traditional wireless WAP/HDML browsers, which are severely limited in their user interaction methods and do not include check boxes, radio buttons, and expandable lists.

In one embodiment, the method for creating new user interfaces allows the user to change the state of an item in a select list. The select list, with the addition of either a text symbol or a graphical symbol, is used to display the item. Items can be selected by scrolling down and pressing a soft-key or by pressing a number on the wireless device. When an item is selected, its state is toggled. In the case of a radio button display, the state of the item that was originally selected is also toggled. For the text version the symbol is enclosed in brackets or parentheses and the symbol is presented when the item is selected. When the item is not selected, the brackets or parentheses have a space character instead of the text symbol. For the graphical version, a box is used for the multiple select list. When an item is selected the box changes to a box with an "x" through it. For radio buttons there is an empty circle graphic for non-selected items and a filled circle for selected items.

The method uses non-displaying cards and variables to create primitive logical manipulations. The state of each item is tracked by a variable, and based upon the state of the item, the deck branches to one of several non-displaying cards that toggles the state of the variable. After changing the values of the variables, the original "display" card is presented to the user. To the user it simply appears that the display is toggling between values.

Another feature is the embedding of heading titles into a select list to make it appear that there are multiple lists on a single WML page. This is done by using a carriage return on the last select item in a section of the page and appending the title of the next heading onto the end of that select list item. This appears visually as a separate heading, when in reality it is part of the last select item. This is useful for breaking up a card so that multiple, independent items can be presented. A card can be made up of a multiple select list and a set of radio buttons. The multiple select list and the set of radio buttons behave to the user as if they were separate "items", but they are all part of the same WML select list.

In one embodiment, the method for creating new user interfaces is an enhancement to XML based template generation (see FIG. 21). It is an additional service that expands the capabilities for developing new WML sites.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," and words of similar import, when used in this application, shall refer to this application as a whole and not to any particular portions of this application.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings of the invention provided herein can be applied to other communications systems, not only for the system described above.

The elements and acts of the various embodiments described above can be combined to provide further embodiments. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims should not be construed to limit the invention to the specific embodiments disclosed in the specification, unless the above description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A method for conducting a communication session, the method comprising:
   during the communication session, displaying a menu on a wireless device for allowing a user of the wireless device to choose from the menu an actionable data that initiates an action in a channel receiving the actionable data, thereby reaching a current point in a menu structure, the menu being part of a configurable, consistent user interface that facilitates the user to access a network;
   during the communication session, triggering a wireless data session with a wireless data channel from a voice session, including pushing data to the wireless data channel and pulling data from the wireless data channel;
   during the communication session, triggering a voice session with a voice channel from a wireless data session, including pushing data to the voice channel and pulling data from the voice channel; and
   during the communication session, facilitating the communication session via a call service that communicates with a customer application and an interactive voice response (IVR) application to conduct the wireless data session and the voice session during the communication session;
   wherein triggering the wireless data session includes transmitting one or more of Automatic number identification (ANI) data, dialed number identification service (DINS) data, and unique identifier (UID) data via a wireless device;
   wherein, during the communication session, data is shared between the wireless data channel and the voice channel;
   wherein the data being pushed and pulled includes VoiceXML data, hypertext transfer protocol (HTTP) data, wireless application protocol (WAP) data, short message service (SMS) data, and wireless markup language (WML) data,
   wherein the data being pushed and pulled includes the actionable data, and
   wherein the actionable data is executed by an destination channel at the current point in the menu structure.

2. The method of claim 1, wherein facilitating the communication session via the call service includes:
   communicating with the customer application to receive a specification of data to be pushed or pulled during the communication session;
   performing data formatting as required on data to be pushed or pulled during the communication session; and
   communicating with the interactive voice response (IVR) application, including transferring formatted data to the IVR application for delivery to a wireless device and receiving data from the wireless device via the IVR application.

3. The method of claim 2, wherein the specification of data is selected before the communication session, and wherein the specification of data is associated with an identifier of the wireless device.

4. The method of claim 1, further comprising:
   after the initiation of a voice session from a wireless device, receiving an identifier for the wireless device;
   terminating the voice session; locating a homepage uniform resource locator (URL) using the identifier; and
   sending the homepage URL to a messaging service;
   wherein the messaging service sends an actionable alert to the wireless device; and
   wherein the homepage URL is embedded in the actionable alert, such that responding to the actionable alert using the wireless device initiates a data session with the homepage URL.

5. The method of claim 1, further comprising:
   providing a facsimile service.

6. The method of claim 5, wherein providing the facsimile service comprises:
   receiving previously scheduled facsimile data from a customer application;
   sending the facsimile data to one or more previously designated recipient facsimile machines;
   receiving a request for specific facsimile data from a wireless device during a data session;
   receiving a destination facsimile number from the wireless device; and
   sending the facsimile data to the destination facsimile number.

7. The method of claim 6, wherein the data session is a WAP session.

8. A method for wireless network communications, the method comprising:
   during a communication session, displaying a menu on a wireless device for allowing a user of the wireless device to choose from the menu an actionable data that initiates an action in a channel receiving the actionable data, thereby reaching a current point in a menu structure, the menu being part of a configurable, consistent user interface that facilitates the user to access a network;
   during the communication session, triggering a wireless data session with a wireless data channel from a voice session by choosing the actionable data from the menu, including pushing data to the wireless data channel and pulling data from the wireless data channel;
   during the communication session, triggering a voice session with a voice channel from a wireless data session by choosing the actionable data from the menu, including pushing data to the voice channel and pulling data from the voice channel, and
   toggling between a data channel and a voice channel in one communication session;
   wherein during the communication session, data is shared between the wireless data channel and the voice channel,
   wherein the communication session is facilitated via a call service that communicates with a customer application and an interactive voice response (IVR) application to conduct the wireless data session and the voice session during the communication session,
   wherein the data being pushed and pulled includes the actionable data, and
   wherein the actionable data is executed by an destination channel at the current point in the menu structure.

9. The method for wireless network communications of claim 8, wherein triggering a wireless data session includes transmitting automatic number identification (ANI) data, dialed number identification service (DINS) data, and unique identifier (UID) data via a wireless device.

10. The method for wireless network communications of claim 8, wherein the data being pushed and pulled includes VoiceXML data, hypertext transfer protocol (HTTP) data, wireless application protocol (WAP) data, short message service (SMS) data, and wireless markup language (WML) data.

11. The method for wireless network communications of claim 8, wherein the data being pushed and pulled includes actionable data that initiates an action in a channel receiving the actionable data.

12. The method for wireless network communications of claim 8, further comprising:
performing navigating functions on data that was pushed or pulled from the voice channel or the data channel, the navigating functions including at least one selected from a group consisting of fast forward, rewind, pause, and delete.

13. A method for wireless network communications, the method comprising:
during a communication session, displaying a menu on a wireless device for allowing a user of the wireless device to choose from the menu an actionable data that initiates an action in a channel receiving the actionable data, thereby reaching a current point in a menu structure, the menu being part of a configurable, consistent user interface that facilitates the user to access a network;
during the communication session by choosing the actionable data from the menu, triggering a wireless data session with a wireless data channel from a voice session, including pushing data to the wireless data channel and pulling data from the wireless data channel; and
during the communication session by choosing the actionable data from the menu, triggering a voice session with a voice channel from a wireless data session, including pushing data to the voice channel and pulling data from the voice channel;
wherein during the communication session, data is shared between the wireless data channel and the voice channel,
wherein the communication session is facilitated via a call service that communicates with a customer application and an interactive voice response (IVR) application to conduct the wireless data session and the voice session during the communication session,
wherein the data being pushed and pulled includes the actionable data, and
wherein the actionable data is executed by a destination channel at the current point in the menu structure.

14. A system for wireless network communications, the system comprising:
at least one network coupled among two or more wireless communication devices and at least one customer application;
two or more components coupled to the at least one network, the two or more components being selected from a group consisting of a homepage provisioning service component, a computer telephony integration/interactive voice response (CTI/IVR) service, a facsimile service, a call service, a facsimile service, and a directory service, wherein the wireless communication devices access the components during a communication session, and wherein the communication session includes:
displaying a menu on a wireless communication device for allowing a user of the wireless device to choose from the menu an actionable data that initiates an action in a channel receiving the actionable data, thereby reaching a current point in a menu structure, the menu being part of a configurable, consistent user interface that facilitates the user to access a network;
triggering a wireless data session with a wireless data channel from a voice session, including pushing data to the wireless data channel and pulling data from the wireless data channel; and
triggering a voice session with a voice channel from a wireless data session, including pushing data to the voice channel and pulling data from the voice channel, wherein during the communication session, data is shared between the wireless data channel and the voice channel,
wherein the communication session is facilitated via a call service that communicates with the at least one customer application and an interactive voice response (IVR) application to conduct the wireless data session and the voice session during the communication session,
wherein the data being pushed and pulled includes the actionable data, and
wherein the actionable data is executed by a destination channel at the current point in the menu structure.

15. The system of claim 14, wherein triggering a wireless data session includes transmitting automatic number identification (ANI) data, dialed number identification service (DNIS) data, and unique identifier (UID) data via a wireless communication device.

16. The system of claim 14, wherein the data pushed and pulled includes VoiceXML data, hypertext transfer protocol (HTTP) data, wireless application protocol (WAP) data, short message service (SMS) data, and wireless markup language (WML) data.

17. The system of claim 14, wherein the homepage provisioning service component includes:
after the initiation of a voice session from a wireless communication device, receiving an identifier for the wireless communication device;
terminating the voice session;
locating a homepage uniform resource locator (URL) using the identifier; and
sending the homepage URL to a messaging service;
wherein the messaging service sends an actionable alert to the wireless communication device, and wherein the homepage URL is embedded in the actionable alert such that responding to the actionable alert using the wireless communication device initiates a data session with the homepage URL.

18. A computer-readable medium having instructions stored thereon which are executable by an electronic device for electronically conducting a communication session by performing steps comprising:
during the communication session, displaying a menu on a wireless device for allowing a user of the wireless device to choose from the menu an actionable data that initiates an action in a channel receiving the actionable data, thereby reaching a current point in a menu structure, the menu being part of a configurable, consistent user interface that facilitates the user to access a network;
during a communication session between two or more devices, trigger a wireless data session with a wireless data channel from a voice session, including pushing data to the wireless data channel and pulling data from the wireless data channel;
during the communication session, trigger a voice session with a voice channel from a wireless data session, including pushing data to the voice channel and pulling data from the voice channel; and during the communication session, toggle between a data channel and a voice channel;
wherein during the communication session, data is shared between the wireless data channel and the voice channel,
wherein the communication session is facilitated via a call service that communicates with a customer application and an interactive voice response (IVR) application to conduct the wireless data session and the voice session during the communication session,
wherein the data being pushed and pulled includes the actionable data, and
wherein the actionable data is executed by a destination channel at a of the menu structure.

19. The computer-readable medium of claim 18, wherein triggering a wireless data session includes transmitting automatic number identification (ANI) data, dialed number identification service (DNIS) data, and unique identifier (UID) data via a wireless device.

20. The computer-readable medium of claim 18, wherein the data pushed and pulled includes VoiceXML data, hypertext transfer protocol (HTTP) data, wireless application protocol (WAP) data, short message service (SMS) data, and wireless markup language (WML) data.

21. The computer-readable medium of claim 18, further storing instructions for:
performing navigating functions on data that was pushed or pulled from the voice channel or the data channel, wherein the navigating functions include at least one selected from a group consisting of fast forward, rewind, pause, and delete.

22. A computer-readable medium having instructions stored thereon which are executable by an electronic device for electronically conducting a communication session by performing steps comprising:
during the communication session, displaying a menu on a wireless device for allowing a user of the wireless device to choose from the menu an actionable data that initiates an action in a channel receiving the actionable data, thereby reaching a current point in a menu structure, the menu being part of a configurable, consistent user interface that facilitates the user to access a network;
during a communication session between two or more devices, trigger a wireless data session with a wireless data channel from a voice session, including pushing data to the wireless data channel and pulling data from the wireless data channel; and
during the communication session, trigger a voice session with a voice channel from a wireless data session, including pushing data to the voice channel and pulling data from the voice channel;
wherein during the communication session, data is shared between the wireless data channel and the voice channel,
wherein the communication session is facilitated via a call service that communicates with a customer application and an interactive voice response (IVR) application to conduct the wireless data session and the voice session during the communication session,
wherein the data being pushed and pulled includes the actionable data, and
wherein the actionable data is executed by a destination channel at the current point of the menu structure.

23. A wireless communication apparatus, comprising:
means for displaying a menu on a wireless device for allowing a user of the wireless device to choose from the menu, during the communication session, an actionable data that initiates an action in a channel receiving the actionable data, thereby reaching a current point in a menu structure, the menu being part of a configurable, consistent user interface that facilitates the user to access a network;
means for triggering a wireless data session with a wireless data channel from a voice session;
means for triggering a voice session with a voice channel from a wireless data session; and
call service means for facilitating the communication session, including:
means for communicating with a customer application to receive a specification of data to be pushed or pulled during the communication session;
means for performing data formatting as required on data to be pushed or pulled during the communication session; and
means for communicating with an interactive voice response (IVR) application, including transferring formatted data to the IVR application for delivery to a wireless device and receiving data from the wireless device via the IVR application;
wherein, during the communication session, data is shared between the wireless data channel and the voice channel,
wherein the data to be pushed and pulled includes the actionable data, and
wherein the actionable data is executed by a destination channel at a current point of the menu structure.

* * * * *